(12) United States Patent
Bai et al.

(10) Patent No.: US 10,174,268 B2
(45) Date of Patent: *Jan. 8, 2019

(54) MITIGATION OF HARMFUL COMBUSTION EMISSIONS USING SORBENT CONTAINING ENGINEERED FUEL FEED STOCKS

(71) Applicant: Accordant Energy, LLC, Rutland, VT (US)

(72) Inventors: Dingrong Bai, Rutland, VT (US); Paula Calabrese, Rutland, VT (US)

(73) Assignee: Accordant Energy, LLC

( * ) Notice: Subject to any disclaimer, the term of this patent is extended or adjusted under 35 U.S.C. 154(b) by 0 days.

This patent is subject to a terminal disclaimer.

(21) Appl. No.: 15/271,529

(22) Filed: Sep. 21, 2016

(65) Prior Publication Data

US 2017/0073599 A1    Mar. 16, 2017

Related U.S. Application Data

(63) Continuation of application No. 14/048,907, filed on Oct. 8, 2013, now Pat. No. 9,487,722, which is a
(Continued)

(51) Int. Cl.
*C10L 5/00* (2006.01)
*C10L 5/48* (2006.01)
(Continued)

(52) U.S. Cl.
CPC ............ *C10L 5/48* (2013.01); *C10L 5/04* (2013.01); *C10L 5/406* (2013.01); *C10L 5/46* (2013.01);
(Continued)

(58) Field of Classification Search
CPC .... C10L 5/48; C10L 5/406; C10L 5/46; C10L 9/10; C10L 10/02; C10L 5/04;
(Continued)

(56) References Cited

U.S. PATENT DOCUMENTS

| | | |
|---|---|---|
| 3,403,643 A | 10/1968 | Denig |
| 3,642,458 A | 2/1972 | Hess et al. |

(Continued)

FOREIGN PATENT DOCUMENTS

| | | |
|---|---|---|
| CA | 2026828 | 4/1991 |
| CH | 552523 | 8/1974 |

(Continued)

OTHER PUBLICATIONS

Hasselriis, F., "Refuse-Derived Fuel Processing," Butterworth Publishers, 1984, pp. 275-298.
(Continued)

*Primary Examiner* — Cephia D Toomer
(74) *Attorney, Agent, or Firm* — Cooley LLP

(57) ABSTRACT

The invention relates to the use of engineered fuel feedstocks to control the emission of sulfur-based, chlorine-based, nitrogen-based, or mercury-based pollutants, such as $SO_2$, $SO_3$, $H_2SO_4$, NO, $NO_2$, HCl, and Hg that are generated during the combustion of fossil fuels, such as coal. Disclosed are novel engineered fuel feedstocks, feedstocks produced by the described processes, methods of making the fuel feedstocks, methods of producing energy from the fuel feedstocks, and methods of generating electricity from the fuel feedstocks.

20 Claims, 13 Drawing Sheets

Related U.S. Application Data continuation of application No. 13/754,343, filed on Jan. 30, 2013, now Pat. No. 8,585,787, which is a continuation of application No. PCT/US2013/023498, filed on Jan. 28, 2012.

(60) Provisional application No. 61/632,825, filed on Jan. 26, 2012.

(51) Int. Cl.

| | | |
|---|---|---|
| *C10L 5/40* | (2006.01) | |
| *C10L 5/46* | (2006.01) | |
| *C10L 9/10* | (2006.01) | |
| *C10L 10/02* | (2006.01) | |
| *C10L 5/04* | (2006.01) | |
| *C10L 10/04* | (2006.01) | |
| *C10L 9/12* | (2006.01) | |
| *C10L 10/00* | (2006.01) | |
| *C10L 5/36* | (2006.01) | |

(52) U.S. Cl.
CPC ............... *C10L 9/10* (2013.01); *C10L 9/12* (2013.01); *C10L 10/00* (2013.01); *C10L 10/02* (2013.01); *C10L 10/04* (2013.01); *C10L 5/363* (2013.01); *C10L 2200/025* (2013.01); *C10L 2200/029* (2013.01); *C10L 2200/0209* (2013.01); *C10L 2200/0213* (2013.01); *C10L 2200/0259* (2013.01); *C10L 2230/02* (2013.01); *Y02E 50/10* (2013.01); *Y02E 50/30* (2013.01)

(58) Field of Classification Search
CPC .. C10L 10/04; C10L 9/12; C10L 10/00; C10L 5/363; C10L 2200/0209; C10L 2200/0259; C10L 2200/0213; C10L 2230/02; C10L 2200/025; C10L 2200/029; Y02E 50/10; Y02E 50/30
See application file for complete search history.

(56) References Cited

U.S. PATENT DOCUMENTS

| | | |
|---|---|---|
| 3,650,711 A | 3/1972 | Unick et al. |
| 3,759,196 A | 9/1973 | Spaite |
| 3,790,091 A | 2/1974 | Law et al. |
| 3,846,096 A | 11/1974 | Malian et al. |
| 3,905,336 A | 9/1975 | Gamble et al. |
| 3,910,775 A | 10/1975 | Jackman |
| 3,950,143 A | 4/1976 | Pyle |
| 3,961,913 A | 6/1976 | Brenneman et al. |
| 4,015,951 A | 4/1977 | Gunnerman |
| 4,026,678 A | 5/1977 | Livingston |
| 4,049,391 A | 9/1977 | Marsh |
| 4,052,173 A | 10/1977 | Schultz |
| 4,072,273 A | 2/1978 | Reiniger |
| 4,078,902 A | 3/1978 | Olson |
| 4,152,119 A | 5/1979 | Schulz |
| 4,153,514 A | 5/1979 | Garrett et al. |
| 4,193,206 A | 3/1980 | Maffet |
| 4,201,551 A | 5/1980 | Lvshkow et al. |
| 4,225,457 A | 9/1980 | Schulz |
| 4,229,183 A | 10/1980 | Eneroth et al. |
| 4,230,460 A | 10/1980 | Maust, Jr. |
| 4,236,897 A | 12/1980 | Johnston |
| 4,249,471 A | 2/1981 | Gunnerman |
| 4,265,636 A | 5/1981 | Frankiewicz |
| 4,303,412 A | 12/1981 | Baikoff et al. |
| 4,308,033 A | 12/1981 | Gunnerman |
| 4,381,718 A | 5/1983 | Carver et al. |
| 4,395,265 A | 7/1983 | Reilly et al. |
| 4,398,917 A | 8/1983 | Reilly |
| 4,405,331 A | 9/1983 | Blaustein et al. |
| 4,440,635 A | 4/1984 | Reiniger |
| 4,445,906 A | 5/1984 | Riemann et al. |
| 4,472,245 A | 9/1984 | Halm et al. |
| 4,476,816 A | 10/1984 | Cannon et al. |
| 4,515,601 A | 5/1985 | Charters |
| 4,529,407 A | 7/1985 | Johnston et al. |
| 4,588,568 A | 5/1986 | Pollmann et al. |
| 4,613,339 A | 9/1986 | Gunnerman et al. |
| 4,624,417 A | 11/1986 | Gangi et al. |
| 4,624,419 A | 11/1986 | Hevesi et al. |
| 4,758,244 A | 7/1988 | Harvey et al. |
| 4,787,917 A | 11/1988 | Leclerc de Bussy |
| 4,824,441 A | 4/1989 | Kindig |
| 4,828,577 A | 5/1989 | Markham, Jr. et al. |
| 4,867,755 A | 9/1989 | Majid et al. |
| 4,875,905 A | 10/1989 | Somerville et al. |
| 4,886,519 A | 12/1989 | Hayes et al. |
| 5,067,317 A | 11/1991 | Kasper |
| 5,125,931 A | 6/1992 | Schulz |
| 5,250,080 A | 10/1993 | Michelena et al. |
| 5,284,497 A | 2/1994 | Egiebor et al. |
| 5,342,418 A | 8/1994 | Jesse |
| 5,368,617 A | 11/1994 | Kindig |
| 5,369,947 A | 12/1994 | Dummersdorf et al. |
| 5,387,267 A | 2/1995 | Warf et al. |
| 5,421,837 A | 6/1995 | Michelena et al. |
| 5,429,645 A | 7/1995 | Benson et al. |
| 5,431,702 A | 7/1995 | Schulz |
| 5,441,990 A | 8/1995 | Robin et al. |
| 5,470,361 A | 11/1995 | Linke et al. |
| 5,562,743 A | 10/1996 | Daugherty et al. |
| 5,591,417 A | 1/1997 | Buchanan et al. |
| 5,643,342 A | 7/1997 | Andrews |
| 5,707,417 A | 1/1998 | Yokoyama et al. |
| 5,711,771 A | 1/1998 | Brown |
| 5,755,836 A | 5/1998 | Beyer |
| 5,797,972 A | 8/1998 | Schulz |
| 5,888,256 A | 3/1999 | Morrison |
| 5,916,826 A | 6/1999 | White |
| 5,980,595 A | 11/1999 | Andrews |
| 6,000,639 A | 12/1999 | Ganguli |
| 6,001,143 A | 12/1999 | Rees et al. |
| 6,048,374 A | 4/2000 | Green |
| 6,149,694 A | 11/2000 | Redden, Jr. et al. |
| 6,152,306 A | 11/2000 | Miller |
| 6,152,974 A | 11/2000 | Delpiano et al. |
| 6,165,238 A | 12/2000 | Parkinson et al. |
| 6,214,064 B1 | 4/2001 | Boss et al. |
| 6,352,956 B1 | 3/2002 | Kienow et al. |
| 6,401,635 B1 | 6/2002 | Nieminen et al. |
| 6,409,798 B1 | 6/2002 | Nieminen et al. |
| 6,423,878 B2 | 7/2002 | Reverso |
| 6,506,223 B2 | 1/2003 | White |
| 6,522,994 B1 | 2/2003 | Lang |
| 6,582,486 B1 | 6/2003 | Delpiano et al. |
| 6,635,093 B1 | 10/2003 | Schoen et al. |
| 6,692,544 B1 | 2/2004 | Grillenzoni |
| 6,780,210 B2 | 8/2004 | Boss et al. |
| 6,790,383 B2 | 9/2004 | Kim et al. |
| 7,028,478 B2 | 4/2006 | Prentice, III |
| 7,247,285 B2 | 7/2007 | Zauderer |
| 7,252,691 B2 | 8/2007 | Philipson |
| 7,276,217 B2 | 10/2007 | Radway et al. |
| 7,314,002 B2 | 1/2008 | Dupuis |
| 7,334,345 B2 | 2/2008 | Lasonde |
| 7,431,156 B2 | 10/2008 | Carlsson |
| 7,468,170 B2 | 12/2008 | Comrie |
| 7,507,083 B2 | 3/2009 | Comrie |
| 7,674,442 B2 | 3/2010 | Comrie |
| 7,758,827 B2 | 7/2010 | Comrie |
| 7,776,301 B2 | 8/2010 | Comrie |
| 7,955,577 B2 | 6/2011 | Comrie |
| 7,988,939 B2 | 8/2011 | Comrie |
| 8,157,874 B2 | 4/2012 | Bohlig et al. |
| 8,157,875 B2 | 4/2012 | Bohlig et al. |
| 8,192,512 B2 | 6/2012 | Bohlig et al. |
| 8,192,513 B2 | 6/2012 | Bohlig et al. |
| 8,349,034 B2 | 1/2013 | Calabrese et al. |
| 8,382,862 B2 | 2/2013 | Bohlig et al. |
| 8,382,863 B2 | 2/2013 | Bohlig et al. |

(56) References Cited

U.S. PATENT DOCUMENTS

| | | |
|---|---|---|
| 8,444,721 B2 | 5/2013 | Bai |
| 8,523,962 B2 | 9/2013 | Bohlig et al. |
| 8,585,787 B2 | 11/2013 | Bai et al. |
| 8,617,264 B2 | 12/2013 | Bohlig et al. |
| 8,828,105 B2 | 9/2014 | Calabrese et al. |
| 8,852,302 B2 | 10/2014 | Bai |
| 8,906,119 B2 | 12/2014 | Bohlig et al. |
| 8,999,014 B2 * | 4/2015 | Bai .......................... C10L 9/08 44/589 |
| 9,062,268 B2 | 6/2015 | Bai |
| 9,126,204 B1 | 9/2015 | Toberman et al. |
| 9,181,508 B2 | 11/2015 | Bohlig et al. |
| 9,487,722 B2 | 11/2016 | Bai et al. |
| 9,523,051 B2 | 12/2016 | Bai et al. |
| 9,752,086 B2 | 9/2017 | Bohlig et al. |
| 2002/0025285 A1 | 2/2002 | Comparato et al. |
| 2002/0184816 A1 | 12/2002 | Philipson |
| 2003/0106467 A1 | 6/2003 | Jones, Jr. |
| 2004/0050678 A1 | 3/2004 | Takahashi et al. |
| 2004/0141891 A1 | 7/2004 | Abe et al. |
| 2004/0237405 A1 | 12/2004 | Takeuchi et al. |
| 2004/0244289 A1 | 12/2004 | Morozumi et al. |
| 2005/0050799 A1 | 3/2005 | Buchanan et al. |
| 2005/0074380 A1 | 4/2005 | Boren et al. |
| 2006/0053791 A1 | 3/2006 | Prentice, III |
| 2006/0096163 A1 | 5/2006 | Dickinson et al. |
| 2006/0112616 A1 | 6/2006 | Noll et al. |
| 2006/0120933 A1 | 6/2006 | Boardman et al. |
| 2006/0123697 A1 | 6/2006 | Jansen |
| 2006/0194990 A1 | 8/2006 | Miyoshi et al. |
| 2006/0228294 A1 | 10/2006 | Davis et al. |
| 2006/0254957 A1 | 11/2006 | Bohlig et al. |
| 2006/0265954 A1 | 11/2006 | Dogru et al. |
| 2007/0004809 A1 | 1/2007 | Lattner et al. |
| 2007/0006526 A1 | 1/2007 | Cullen |
| 2007/0140943 A1 | 6/2007 | Comrie |
| 2007/0173673 A1 | 7/2007 | Fujimoto et al. |
| 2007/0204512 A1 | 9/2007 | Self et al. |
| 2007/0261295 A1 | 11/2007 | Tolmie |
| 2008/0014112 A1 | 1/2008 | Lee et al. |
| 2008/0060519 A1 | 3/2008 | Maly et al. |
| 2008/0110090 A1 | 5/2008 | Zawadzki et al. |
| 2008/0121142 A1 | 5/2008 | Comrie et al. |
| 2008/0193351 A9 | 8/2008 | Boardman et al. |
| 2008/0233029 A1 | 9/2008 | Fan et al. |
| 2008/0237093 A1 | 10/2008 | Bohlig et al. |
| 2008/0286703 A1 | 11/2008 | Comrie et al. |
| 2008/0290006 A1 | 11/2008 | Duffy et al. |
| 2009/0020405 A1 | 1/2009 | Fan et al. |
| 2009/0056205 A1 | 3/2009 | Gauthier et al. |
| 2009/0056206 A1 | 3/2009 | Gauthier et al. |
| 2009/0099038 A1 | 4/2009 | Deisseroth et al. |
| 2010/0018113 A1 | 1/2010 | Bohlig et al. |
| 2010/0031560 A1 | 2/2010 | Calabrese et al. |
| 2010/0144905 A1 | 6/2010 | Reaveley et al. |
| 2010/0218419 A1 | 9/2010 | Bai |
| 2010/0263577 A1 | 10/2010 | Nijhawan |
| 2010/0323308 A1 | 12/2010 | Comrie |
| 2011/0099890 A1 | 5/2011 | Bohlig et al. |
| 2011/0209393 A1 | 9/2011 | Bohlig et al. |
| 2011/0209394 A1 | 9/2011 | Bohlig et al. |
| 2011/0209395 A1 | 9/2011 | Bohlig et al. |
| 2011/0209396 A1 | 9/2011 | Bohlig et al. |
| 2011/0209397 A1 | 9/2011 | Bohlig et al. |
| 2011/0209398 A1 | 9/2011 | Bohlig et al. |
| 2011/0209399 A1 | 9/2011 | Bohlig et al. |
| 2012/0210633 A1 | 8/2012 | Bohlig et al. |
| 2012/0304536 A1 | 12/2012 | Bai |
| 2013/0097921 A1 | 4/2013 | Calabrese et al. |
| 2013/0298454 A1 | 11/2013 | Bai |
| 2014/0096441 A1 | 4/2014 | Bai et al. |
| 2014/0157659 A1 | 6/2014 | Bohlig et al. |
| 2015/0096222 A1 | 4/2015 | Calabrese et al. |
| 2015/0197698 A1 | 7/2015 | Bohlig et al. |
| 2016/0002546 A1 | 1/2016 | Bai |
| 2016/0108328 A1 | 4/2016 | Bohlig et al. |
| 2017/0114292 A1 | 4/2017 | Bai et al. |
| 2017/0137729 A1 | 5/2017 | Bai et al. |

FOREIGN PATENT DOCUMENTS

| | | |
|---|---|---|
| CN | 1224683 C | 10/2005 |
| CN | 1914463 | 2/2007 |
| CN | 101215490 | 7/2008 |
| CN | 101360548 | 2/2009 |
| CN | 101495603 | 7/2009 |
| DE | 3409862 | 9/1985 |
| DE | 69314835 | 3/1998 |
| EP | 0325309 | 7/1989 |
| EP | 0423859 | 4/1991 |
| EP | 0512721 | 11/1992 |
| EP | 0566419 | 10/1993 |
| EP | 0568345 | 2/1997 |
| EP | 1072671 | 1/2001 |
| EP | 1167494 | 1/2002 |
| EP | 1083212 B1 | 11/2004 |
| EP | 2298082 | 3/2011 |
| EP | 2134820 B1 | 9/2011 |
| EP | 2307531 B1 | 2/2012 |
| FR | 2818657 | 6/2002 |
| JP | S58-061181 | 4/1983 |
| JP | H05-132683 | 5/1993 |
| JP | H07-179871 | 7/1995 |
| JP | H10-235313 | 9/1998 |
| JP | H10-244237 | 9/1998 |
| JP | 2003-253037 | 9/2003 |
| JP | 2005-290129 | 10/2005 |
| JP | 2008-106270 | 5/2008 |
| JP | 2011-526323 | 10/2011 |
| KR | 20000012536 | 3/2000 |
| WO | WO 2000/000574 | 1/2000 |
| WO | WO 2000/000575 | 1/2000 |
| WO | WO 2002/051969 | 7/2002 |
| WO | WO 2005/097684 | 10/2005 |
| WO | WO 2006/053020 | 5/2006 |
| WO | WO 2006/099611 | 9/2006 |
| WO | WO 2007/084509 | 7/2007 |
| WO | WO 2007/123510 | 11/2007 |
| WO | WO 2007/147244 | 12/2007 |
| WO | WO 2008/100243 | 8/2008 |
| WO | WO 2008/107042 | 9/2008 |
| WO | WO 2009/158539 | 12/2009 |
| WO | WO 2009/158540 | 12/2009 |
| WO | WO 2010/013202 | 2/2010 |
| WO | WO 2011/078928 | 6/2011 |
| WO | WO 2011/084730 | 7/2011 |
| WO | WO 2013/113026 | 8/2013 |

OTHER PUBLICATIONS

Even, J. C. et al., "Evaluation of the Ames Solid Waste Recovery System, Part I, Summary of Environmental Emissions: Equipment, Facilities, and Economic Evaluations," EPA-600/2-77-205 (Nov. 1977).

Fiscus, D. E. et al., "Evaluation of the Performance of the Disc Screens Installed at the City of Ames, Iowa Resource Recovery Facility," Proc. ASME National Waste Processing Conf., Washington, DC, 1980.

Fiscus, D. E. et al., "Study of Existing RDF-Cofiring Experience, vol. 3: Phase II Final Report," ANL/CNSV-TM-134, vol. 3, Oct. 31, 1983.

Refuse Derived Fuel, Current Practice and Perspectives (B4-3040/2000/306517/MAR/E3) Final Report No. CO 5087-4, Jul. 2003.

Garg, A. et al., "Wastes as Co-Fuels: the Policy Framework for Solid Recovered Fuel (SRF) in Europe, with UK Implications," Environ. Sci. Technol., 41(14):4868-4874 (2007).

Raghunathan, K. et al., "Prevention of PCDD/PCDF Formation by Coal Co-Firing," U.S. Environmental Protection Agency, Air Pollution Prevention and Control Division (1998), pp. 779-793.

Canova, J. H., "Testing and Evaluating the Combustion Characteristics of Waste Fuels," (1992), 120 pages.

(56) References Cited

OTHER PUBLICATIONS

Fritsky, K. J. et al., "Methodology for Modeling the Devolatilization of Refuse-Derived Fuel from Thermogravimetric Analysis of Municipal Solid Waste Components," J. Air & Waste Manage. Assoc. 44:9, 1116-1123 (1994).
U.S. Environmental Protection Agency, Cement Sector, Trends in Beneficial Use of Alternative Fuels and Raw Materials, Oct. 2008, 117 pages.
European Search Report for European Application No. 17166365.1, dated Jun. 13, 2017, 8 pages.
Supplementary European Search Report for European Application No. 16206883.7, dated May 10, 2017, 6 pages.
Boavida, D. et al., "Co-combustion of coal and non-recyclable paper and plastic waste in a fluidised bed reactor," Fuel, 82 (2003) 1931-1938.
Cozzani, V. et al., "Devolatilization and pyrolysis of refuse derived fuels: characterization and kinetic modelling by a thermogravimetric and calorimetric approach," Fuel, 74(6):903-912 (1995).
Fisher, M. M. et al., "Processed engineered fuels derived from paper and plastic—Techno-economic factors and regulatory issues in a competitive market," Proceedings of Fifth Annual North American Waste-to-Energy Conference, Research Triangle Park, North Carolina, Apr. 22-25, 1997, pp. 475-488.
Hasselriis, F., "Refuse-Derived Fuel Processing," Butterworth Publishers, 1984, pp. 1-340.
Kreith, F. et al. (eds.), "The CRC Handbook of Mechanical Engineering," Second Edition, Jan. 2004, CRC Press, Chapter 7, p. 7-32.
Pinto, F. et al., "Pyrolysis of plastic wastes. 1. Effect of plastic waste composition on product yield," Journal of Analytical and Applied Pyrolysis, 51(1-2):39-55 (Jul. 1999).
Sorum, L. et al., "Pyrolysis characteristics and kinetics of municipal solid wastes," Fuel, 80(9):1217-1227 (Jul. 2001).
Tomczyck, L., "Engineered Fuel: Renewable Fuel of the Future?," Solid Waste Technologies, Jan./Feb. 1997, 10 pages.
Wu, C-H et al., "On the thermal treatment of plastic mixtures of MSW: Pyrolysis kinetics," Waste Management, vol. 13, Jan. 1993, pp. 221-235.
Supplementary European Search Report for European Application No. 09771071.9, dated May 21, 2012, 7 pages.
International Search Report and Written Opinion for International Application No. PCT/US2009/048718, dated Aug. 13, 2009.
Supplementary European Search Report for European Application No. 09771072.7, dated May 21, 2012.
International Search Report and Written Opinion for International Application No. PCT/US2009/048719, dated Sep. 16, 2009.
International Search Report and Written Opinion for International Application No. PCT/US2010/061228, dated Feb. 22, 2011.
Search Report for Chinese Patent Application No. 201080064580.0, dated Mar. 21, 2014.
Supplementary European Search Report for European Application No. 10839960.1, dated Oct. 4, 2013, 8 pages.
International Search Report and Written Opinion for International Application No. PCT/US2010/057351, dated Feb. 2, 2011.
International Search Report and Written Opinion for International Application No. PCT/US2012/022786, dated May 1, 2012, 8 pages.
Supplementary European Search Report for European Application No. 13740783.9, dated Jul. 9, 2015, 8 pages.
International Search Report and Written Opinion for International Application No. PCT/US2013/023498, dated Aug. 7, 2013, 12 pages.
Arena, U. et al., "Gasification of a Plastic Waste in a Pilot Fluidized Bed Reactor," 7 pages, 10th Conference on Process Integration, Modelling and Optimisation for Energy Saving and Pollution Reduction, Ischia Island, Gulf of Naples, Jun. 24-27, 2007.

Aznar et al., "Plastic waste elimination by co-gasification with coal and biomass in fluidized bed with air in pilot plant," Fuel Processing Technology 87(5):409-420 (2006).
Blasi, "Influence of physical properties on biomass devolitization characteristics," Fuel, 76(10):957-964 (1997).
Bourgois et al., "Characterization and analysis of torrefied wood," Wood Sci. Technol., 22:143-155 (1988).
Buckley, T. J. et al., "Evaluation of data on higher-heating values and elemental analysis for refuse derived fuels," National Waste Processing Conf., PA, USA pp. 16-24 (1988), discussions and author's reply.
Buckley, T. J. et al., "Evaluation of data on higher-heating values and elemental analysis for refuse derived fuels," National Waste Processing Conf., PA, USA pp. 77-84 (1988).
Phyllis Database, "Elemental content," [online], URL: <http://www.ecn.nl/phyllis/>, (1998), 5 pages.
BIOBIB, "paper," "waste, domestic organic waste from the municipal collection," "douglas fir," and "wood, sawdust," 12 pages, from BIOBIB a Data Base for Biofuels (www.vt.tuwien.ac.at/biobib/biobib.html information available online 2007 and earlier).
Frost, M., "Tires as a fuel supplement: feasibility study," 1992, pp. 1-120.
Prins, M. J. et al., "From coal to biomass gasification: Comparison of thermodynamic efficiency," Energy 32:1248-1259 (2007).
Ragland, K. W. et al., "Properties of wood for combustion analysis," Bioresource Technology, 37(2):161-168 (1991).
Monti, A. (ed.), Green Energy and Technology, Switchgrass: A Valuable Biomass Crop for Energy, pp. 170-171 (2012).
Sami, M., "Co-Firing of Coal and Biomass Fuel Blends," Progress in Energy and Combustion Science, 27(2):171-214 (2001).
Sun, M., "Study on the preparation of RDF by mixing waste of high calorific value and biomass and the combustion characteristic thereof," Chinese Master's Dissertations Full-Text Database, Engineering Technology, Edition I, vol. 10, p. B027-214 (Oct. 15, 2009).
UNEP: "Waste characterization and quantification with projections for future," Developing Integrated Solid Waste Management Plan, Jan. 1, 2009, pp. 1-27, Osaka Japan, Retrieved from the Internet: <URL: http://www.unep.or.jp/ietc/Publications/spc/ISWMPlan_Vol1.pdf> [retrieved on Sep. 20, 2013], 77 pages.
Xie, Q. et al., Municipal Solid Waste Energy Utilization Technology, Chemical Industry Press, First Edition (2004), pp. 78-80.
European Search Report and Search Opinion for European Application No. 17163242.5, dated Aug. 1, 2017, 8 pages.
Complaint for Patent Infringement filed by *Accordant Energy, LLC, Accordant Energy, LLC* v. *Vexor Technology, Inc. et al.*, in The United States District Court for the Northern District of Ohio Eastern Division, Civil Action No. 1:17-cv-411, filed Feb. 28, 2017, 21 pages.
Amended Answer and Counterclaims filed by *Vexor Technology, Inc. and Vexor Technology, LLC, Accordant Energy, LLC* v. *Vexor Technology, Inc. et al.*, in The United States District Court for the Northern District of Ohio Eastern Division, Civil Action No. 1:17-cv-411, filed May 18, 2017, 49 pages.
Ghani, "Co-combustion of biomass fuels with coal in a fluidised bed combustor," Diss. University of Sheffield, May 2005, 213 pages.
Psomopoulos, C. S. et al., "Waste to energy: A review of the status and benefits in U.S.A.", Proceedings of the International Conference on Environmental Management, Engineering, Planning and Economics, Skiathos, Greece, Jun. 24-28, 2007, pp. 1901-1906.
Psomopoulos, C. S. et al., "Residue derived fuels production in Greece: an alternative fuel for the power generation sector based in EU and international experience," Sixth Mediterranean Conference and Exhibition on Power Generation, Transmission and Distribution, IET Hellas (MedPower 2008), Thessaloniki. 2008.
Kilgroe, J. Municipal-waste combustion study: combustion control of organic emissions. Final report. No. PB-87-206090/XAB. Energy and Environmental Research Corp., Irvine, CA (USA), 1987.

\* cited by examiner

MITIGATION OF HARMFUL COMBUSTION EMISSIONS USING SORBENT CONTAINING ENGINEERED FUEL FEED STOCKS

RELATED APPLICATION INFORMATION

This application is a continuation of U.S. application Ser. No. 14/048,907, now U. S. Pat. No. 9,487,722, filed on Oct. 8, 2013, which is a continuation of U.S. application Ser. No. 13/754,343, now U. S. Pat. No. 8,585,787, filed on Jan. 30, 2013, which is a continuation of PCT Application Ser. No. PCT/US13/23498 filed on Jan. 28, 2013, which claims priority from U.S. Provisional Application No. 61/632,825 filed Jan. 26, 2012. This application is related to U.S. Ser. No. 12/492,093, now U.S. Pat. No. 8,349,034, filed on Jun. 25, 2009, U.S. Ser. Nos. 12/492,096, and 12/491,650, now U.S. Pat. No. 9,217,188, filed on Jun. 25, 2009. All the disclosures of each of the foregoing applications are incorporated herein by reference in their entireties for all purposes.

FIELD OF THE INVENTION

The present invention relates to alternative fuels and their use in the mitigation of criteria, toxic, and hazardous air pollutants. In particular, the invention relates to engineered fuel feedstocks, and methods of co-firing such engineered fuel feedstocks with coal to control emission profiles, for corrosion prevention, and for operational performance improvements during combustion processes. The engineered fuel feedstocks described herein comprise processed municipal solid waste, and sorbent.

BACKGROUND OF THE INVENTION

Sources of fossil fuels useful for heating, transportation, and the production of chemicals as well as petrochemicals are becoming increasingly more scarce and more expensive. Industries such as those producing energy and petrochemicals are actively searching for cost-effective engineered-fuel alternatives for use in generating those products and many others. Additionally, due to the ever increasing costs of fossil fuels, transportation costs for moving fuels for production of energy and petrochemicals is rapidly escalating.

Energy and petrochemical producing industries, and others, have relied on the use of fossil fuels, such as coal, oil and natural gas, for use in combustion processes for the production of energy (heat and electricity). Combustion is a thermochemical processes that releases the energy stored within the fuel source. Combustion takes place in a reactor in the presence of air or oxygen. A boiler is a type of a reactor that is used for heating water to generate steam. Traditional power plants use a boiler to generated steam which is used to power turbines for producing electricity.

The nature of the combustion of fuel causes significant amounts of pollutants to be released from the fuel and transferred into the produced gas. The pollutants in the gas are released into the environment unless they are captured or treated. Fuels often contain multiple chemical elements in different proportions that could give rise to various environmental or technological problems during or after they are used as an energy source. Such chemical elements include sulfur, halogens (e.g., Cl, F), nitrogen, and trace heavy metals including mercury (Hg). As described herein, the higher content of sulfur, chlorine, or fluorine causes serious corrosion of system equipment and creates the hazardous air pollutants. Trace elements may also be a threat to the environment or to human health (e.g., Hg, Cd, Pb, As, Cr, Se), may cause additional corrosion problems (e.g., Na, K), or may pollute or poison any catalysts (mainly As) or sorbents (e.g., powdered activate carbon) or catalysts (e.g., SCR) used downstream. For example, the combustion of fossil fuels such as coal, oil and natural gas in an oxidizing atmosphere creates $NO_x$, a precursor to ground level ozone which can trigger asthma attacks. Combustion of fossil fuels is also the largest single source of sulfur dioxide ($SO_2$), which in turn produces very fine sulfates particulates. Fine particle pollution from U.S. power plants has been estimated to cut short the lives of over 30,000 people each year. Furthermore, hundreds of thousands of Americans suffer from asthma attacks, cardiac problems and upper and lower respiratory problems associated with fine particles from power plants. To avoid or minimize problems associated with these elements, and/or products formed from these elements that may be liberated or produced during or after the combustion processes, one or more suitable technologies are needed to reduce their emission and release into the environment.

Primary sources of $SO_2$ emissions are industrial operations such as power plants (e.g., coal or oil fired). In the U.S., the emissions from these industrial operations must follow Environmental Protection Agency ("EPA") regulations set by the 1990 Clean Air Act Amendment. As new coal burning power generation facilities are being constructed, there has been a renewed interest in economical methods of reducing $SO_2$ emissions. (Wu, C., Khang, S.-J., Keener, T. C., and Lee, S.-K., Adv. Environ. Research, 8, 655-666, 2004). It is reported that more than 250 techniques for flue gas desulfurization (FGD) have been proposed or developed on a worldwide basis (Oxley, J. H., Rosenberg, H. S., Barrett, R. E., *Energy Eng.* 88, 6, 1991). However, relatively few of those processes are currently in use because of low efficiency (Makansi, J., Power, 137, 23-56, 1993).

Power plants are the largest source of airborne mercury emissions in the U.S. Eventually the mercury in the air passes into the water, where it is converted into methylmercury ($CH_3Hg^+$), and enters the food chain. Methylmercury is a neurotoxin which accumulates in the body and primarily results from consuming contaminated fish and seafood. Regulatory agencies like the Food and Drug Administration (FDA) have issued guidance to reduce exposure methylmercury by limiting consumption of certain types of fish, but prior to 2012, there have been no federal regulations curtailing the emissions of mercury and other toxic pollutants.

In response to growing concern about emissions from traditional, fossil fuel-burning power plants, the EPA has required that emissions of criteria pollutants, such as oxides of nitrogen and sulfur ($NO_x$ and $SO_x$), and toxic pollutants like mercury (Hg), be drastically reduced. In response, power plants have begun expensive retrofitting operations in order to reduce these emissions. However, as discussed in greater detail below, these mitigation strategies have had their own unintended consequences and have led to the production and emission of additional pollutants, such as sulfur trioxide ($SO_3$) and sulfuric acid ($H_2SO_4$).

In addition to fossil fuels, municipal solid waste (MSW) is source of fuel for combustion. Fuels derived from MSW with minimal processing to remove some of the metals are often called refuse-derived fuels (RDF), or in some cases called solid-recovered fuels (SRF). The drawbacks accompanying combustion of MSW include the drawbacks of combustions of fossil fuels as described above, including the production of pollutants such as $NO_x$, $SO_x$, HCl, Hg, and particulates that damage the environment and are harmful to humans. In addition to these drawbacks, corrosion and operational problems can arise from the combustion of MSW.

Fuels and waste that contain significant amounts of sulfur and/or chlorine are not desirable for combustion reactions because they can produce toxic or corrosive byproducts. Significant amounts are defined as an amount that when added to a fuel feedstock causes the final feedstock to have more than 2% sulfur and more than 1% chlorine. For example, materials such as unprocessed MSW, RDF, high-sulfur containing coal, used tires, carpet, rubber, and certain plastics such as PVC, when combusted, release unacceptable amounts of harmful sulfur and/or chlorine-based gases. For this reason, these materials are typically avoided, or have to be pretreated to remove the pollutants before being used as fuels.

Another source of fuels is from biomass. Biomass fuels are living and recently dead biological material that can be used as fuel or for industrial production. Usually biomass fuels are derived from plant matter, but they do not include coal and petroleum. Biomass fuels may also include biodegradable wastes that can be burned. Nonlimiting examples and types of biomass fuels include woods, switch grass, yard wastes, plants, including miscanthus, switch grass, hemp, corn, poplar, willow, sugarcane and oil palm (palm oil), coconut shells, and shells of nuts. Some consider the use of biomass fuels as $CO_2$-neutral, which may be desirable for power plant operators, since the biological material stored carbon during its lifetime, and combustion simply completes the carbon cycle by returning the carbon to the environment.

Literature has extensively reported that chlorine-induced corrosion of high temperature surfaces in boilers is one of the most costly problems in the industry. This problem can result in downtime and periodic total shutdown of plants, which accounts for a significant fraction of the operating and maintenance cost. The corrosion leads to replacement of super-heater pendants as often as once a year in some units or require the use of more costly alloyed materials to either shield the metal surfaces or serve as a replacement tube material.

The corrosion problem is more severe when biomass and waste derived fuels are used due to the fact that the ash of the biomass and waste fuels has a very different composition and different melting characteristics than ash from coal. This difference in ash composition results in corrosion and chloride salt deposits on the super heater tubes and other parts of the heat transfer process units. The corrosion from chlorine begins at steam temperatures in the super-heater of approximately 480° C. (900° F.), and increases as the temperature increases up to approximately 500-600° C. (930-1,100° F.). This limits the super heated steam temperature in biomass to energy and waste to energy plants and consequently limits the power generating efficiency of biomass to energy and waste to energy plants as compared to coal-fired plants.

To prevent corrosion and control pollutants systems that have previously been developed or implemented for flue gas cleaning in combustion processes focus on the control of these pollutants in the actual fuel itself (i.e., by limiting the use fuels containing relatively high amounts of sulfur, nitrogen, heavy metals, or other pollutants and/or pollutant precursors) or by controlling the release of pollutants into the atmosphere by post-combustion treatment of the flue gas stream. For example, one pollution control strategy includes the addition of sorbents to a flue gas stream. Sorbents such as hydrated lime, calcium carbonate, sodium sesquicarbonate, sodium bicarbonate, and magnesium oxide have been injected into combustion exhaust stack gases in an effort to clean the exit gases of chlorine and sulfur containing pollutants (see, e.g., U.S. Pat. Nos. 6,303,083; 6,595,494; 4,657,738; and 5,817,283, the relevant portions of each of which are incorporated herein by reference).

However, dry sorbents optimally work at temperatures of about 800° C. to about 1,100° C. and thus have mostly been used in the exhaust stream of combustion units. Further, if sorbents such as limestone are used at temperatures below 800° C., less than 20% conversion or adsorption of the pollutants by the sorbent typically occurs, resulting in release of a substantial fraction of toxic products produced in the combustion process and/or incomplete or inefficient use of the sorbent. Accordingly, these sorbents are often prepared in slurry form and used in semi-dry/wet and wet scrubbers, which improves sorbent adsorption and/or conversion of pollutants. However, semi-dry/wet and wet scrubbers typically require more complicated process systems and operate with concomitant water consumption, leading to higher capital and operational costs.

Furnace Sorbent Injection

FIG. 1 is a schematic diagram showing an exemplary conventional coal combustion reactor comprising a furnace sorbent injection system (FSI), which is one type of sorbent system for removing pollutants from a combustion reactor exhaust stream. Pulverized or ground coal particles, typically entrained in a primary air stream, are introduced into the primary combustion zone of the combustion reactor. The primary combustion zone typically operates with an air equivalence ratio (AR) of about 0.8-1.15 (e.g., an oxygen lean to rich condition), and at a temperature of about 1,300-1,650° C. In some cases, as shown in FIG. 1, a secondary air stream may also be introduced to provide additional combustion air. The combustion products from the primary combustion zone pass into a burnout zone where the temperature is about 1,150-1,300° C. Additional air is introduced into the burnout zone to increase the AR to about 1.20 and accordingly, promote combustion of incompletely combusted fuel carried upward from the primary combustion zone. The effluent from the burnout zone then passes further up the flue of the combustion reactor to a convection zone where a sorbent is injected into the flue gas stream to adsorb $SO_2$ produced in the combustion reaction.

Several problems may occur in conventional furnace sorbent injection systems. For example, high flue gas temperatures may promote sorbent sintering due to partial or complete melting of injected sorbent particles. For calcium-based sorbents, when the temperature greater than about 1,100° C., sintering of the sorbent particles increases drastically. Such sintering may block pores or channels in the sorbent particles, thus reducing the total effective surface area of the sorbent particles available to react with $SO_2$, other oxides of sulfur, or other pollutants produced in the combustion reaction. High temperatures can also increase the thermal instability of desulfurization products. For example, when calcium-based sorbents are use in furnace sorbent injection processes, and the temperature is greater than about 1,050° C., $CaSO_4$, for example, starts to decompose (e.g., $CaSO_4 \rightarrow CaO+SO_2+\frac{1}{2}O_2$). Conversely, lower temperatures in furnace sorbent injection operations typically result in incomplete sorbent calcination, and accordingly, low sorbent reaction rates. As a result of these competing high and low temperature limitations, sorbent-injection ports in furnace sorbent injection operations must be located downstream of the coal burners in a region where the temperature is optimal for $SO_2$ removal.

Another problem that can be encountered in typical dry and furnace sorbent injection processes is achieving sufficient residence time of sorbents to remove $SO_2$. Sufficient residence time is necessary to allow the sorbent particles to contact the flue gases and allow for complete calcination and sulfation of the sorbent particles. However, at typical convection zone flue gas temperatures of about 700° C. to about 1,100° C., a 2 to 3 second (or longer) residence time is required for most sorbents to achieve complete calcination and sulfation of the sorbent. For typical pulverized coal boilers, residence time of injected sorbent in the convection zone is about 1 to 2 seconds, and complete calcination and sulfation of the sorbent cannot be achieved, resulting in incomplete sorbent use and less than optimal capture of $SO_2$.

Another problem is the cost of the dry and furnace sorbent injection systems. After the sorbent is injected into the boiler or ductwork, the sorbent reacts with pollutant in the flue gas to form a solid compound that is then removed in the particulate collection devices downstream—an electrostatic precipitator or fabric filter. While this technology can eliminate the pollutants like $SO_3$ emissions, the cost for installation and use of sorbent injection is significant and varies with the plant size and the type of reagent. Based on data from the EPA's Integrated Planning Model v4.10, the capital cost of a typical 500 MW plant can be $45,000,000 or even higher, with an annual operating and maintenance costs of over $50,000,000.

Still another problem that can be encountered in typical furnace sorbent injection processes is achieving uniform sorbent distribution across the furnace cross-sectional area when injecting sorbent. Such uniform distribution is important for achieving effective sorbent-$SO_2$ contact and concomitant $SO_2$ removal from the flue gas stream. However, it is difficult to practically achieve uniform sorbent distribution when injecting sorbents into a flue gas stream in FSI operations due to large furnace cross-sectional area and often complex geometric configurations of reactors. Non-uniform sorbent distribution in FSI processes may lead to incomplete mixing of injected sorbent with flue gas, resulting in lower $SO_2$ removal efficiency and inefficient sorbent use.

Another consideration in FSI processes includes the reacting environment into which the sorbent is injected. For example, reducing or oxidizing conditions in the effluent stream may have a significant impact on $SO_2$ removal efficiencies. In circumstances where the effluent stream is oxygen-rich (e.g., oxidizing conditions), the majority of fuel-bound sulfur is converted to $SO_2$ with minor amounts of $SO_3$. However, certain by-products of desulfurization, including various sulfates ($SO_4^{2-}$), may be unstable at low temperatures relative to sulfides ($SO_3^{2-}$). For example, $CaSO_4$ begins to decompose at about 1,050° C. Accordingly, certain desulfurization products produced via reaction with sulfur sorbents under oxidizing conditions may be unstable and decompose, regenerating sulfur oxides. Furthermore, oxidizing conditions typically promote the conversion of fuel-bound nitrogen to $NO_x$.

Alternatively, when combustion is conducted under reducing conditions (e.g., fuel-rich conditions), fuel-bound sulfur is converted to $H_2S$ (with trace amounts of COS), and fuel-bound nitrogen is converted to $N_2$, with minor amounts of $NH_3$. The by-products of desulfurization via sorbent injection into the flue gas stream under reducing conditions, such as various sulfides (e.g., CaS), are generally stable at higher temperatures relative to oxides of sulfur produced under oxidizing conditions. For example, CaS has a melting temperature of about 2,525° C. At higher temperatures under oxidizing conditions, sulfur adsorption by injected sorbent falls off dramatically, and NOx production increases. Conversely, under reducing conditions, nitrogen oxide production is very low, and sulfide production is favored. However, undesirable $H_2S$ formation is also favored under reducing conditions. Thus, flue gas sorbent injection must balance reacting conditions (e.g., oxidizing or reducing conditions) and reaction temperatures, and an optimal balance can be difficult to achieve.

Stated Flue Gas Desulfurization

Another known strategy for mitigation of SOx production in combustion processes is staged desulfurization. In this process, pulverized or ground coal particles, typically entrained in a primary air stream, are introduced into the primary combustion zone of the combustion reactor. The primary combustion zone typically operates with an air equivalence ratio (AR) of about 0.7-0.8 (e.g., a fuel rich condition), and at a temperature of about 1,500° C. A sorbent (in this case, a calcium-based sorbent at a stoichiometric ratio of Ca:S of about 1.0 to 1.5) is also introduced into the primary combustion zone, either separately from the pulverized coal, or commingled with the pulverized coal stream.

The combustion products from the primary combustion zone pass into a burnout zone where the temperature is about 1,300° C. Additional air is introduced into the burnout zone to increase the AR to about 1.20 and accordingly, promote combustion of incompletely combusted fuel carried upward from the primary combustion zone. The effluent from the burnout zone then passes further up the flue of the combustion reactor to a convection zone where a sorbent is injected into the flue gas stream at a temperature of about 1,100° C., to adsorb $SO_2$ produced in the combustion reaction. The convection zone typically is operated at an AR of about 1.1 to 1.2, and sorbent is injected at a stoichiometric ratio of Ca:S of about 2.0 to 2.5.

However, like dry sorbent injection processes, there are several problems with staged desulfurization. For example, sorbent injected into the primary combustion zone may be sintered due to the relatively high temperature in the primary combustion zone. In addition, sorbent injected to convection zone has extremely short residence time. Further, as with dry sorbent injection, it may be difficult to achieve uniform distribution of sorbents since both sorbent and fuel particles may flow differently, or occur segregation, since they have different sizes and densities. Finally, staged desulfurization provides limited reduction of $NO_x$ produced in the combustion process.

One strategy for reducing $NO_x$ emissions is to employ a "reburn" process. In this process, pulverized or ground coal particles, typically entrained in a primary air stream, are introduced into the primary combustion zone of the combustion reactor. The primary combustion zone typically operates with an AR of about 1.05-1.10 (e.g., an oxidizing condition), and at a temperature of about 1,500° C. In some cases, a secondary air stream may also be introduced with the coal/sorbent/primary air mixture to provide additional combustion air. Fuel bound nitrogen reacts with oxygen to from $NO_x$.

The combustion products from the primary combustion zone then pass into a reburn zone. A reburn fuel, typically natural gas, oil, propane, etc., is introduced into the reburn zone. This provides a slightly fuel rich, reducing environment (e.g., AR=0.8-0.95) wherein $NO_x$ generated in the primary combustion zone reacts with the reburn fuel induced radicals and reduces $NO_x$ to molecular nitrogen. The effluent stream from the reburn zone then passes into a burnout zone where the temperature is about 1,300° C. Additional air is introduced into the burnout zone to increase the AR to about 1.20 to promote combustion of incompletely combusted fuel and/or combustion products (e.g., CO) carried upward from the primary combustion zone. The effluent from the burnout zone then passes further up the flue of the combustion reactor to a convection zone where a sorbent is injected into the flue gas stream at a temperature of about 1,100° C. to adsorb $SO_2$ produced in the combustion reaction.

By employing reburn technology, high levels of $NO_x$ reduction (e.g., about 50-70%) can be achieved. Further, when a reburn process is coupled with SNCR, significant levels of $NO_x$ control (e.g., greater than about 75%) can be achieved. However, reburn processes do not address the $SO_2$ control issues described above with respect to FGD and staged desulfurization, including the balance of temperature, reaction conditions in each zone, etc. In addition, when either a combustion zone or a reburn zone are maintained at reducing conditions (e.g., AR<1), ash slagging in the combustion reactor may become significant and since ash slagging typically occurs at lower temperatures (~100-300° F.) under reducing conditions relative to ash slagging under oxidizing conditions (e.g., AR>1).

FGD technologies like direct sorbent injection and staged desulfurization have been successful at reducing some harmful air pollutants. However, new rules and regulations have tighten the limits on pollutants released into the atmosphere, and require many power plant operators to further reduce their harmful boiler emissions. Once such rule is the U.S. Environmental Protection Agency's (EPA's) Cross State Air Pollution Rule (CSAPR), incorporated herein by reference in its entirety for all purposes, currently requires that on average power plant $SO_2$ emissions are reduced to 73% and $NO_x$ emissions are reduced to 54% of 2005 emission levels by 2014. To comply CSAPR, the use of other FGD technologies like wet flue gas desulfurization and selective catalytic reduction (SCR) at coal-fired power plants is expected to increase significantly over the next decade. The EPA estimates that, by year 2020, the total FGD capacity is projected to increase from the current 100 gigawatts (GW) to 231 GW. The majority of this additional FGD capacity will likely use wet FGD technologies. In addition, the EPA has estimated that a total of approximately 154 GW of SCR will have been installed on U.S. coal-fired power plants by 2020.

In 2012, the EPA issued new standards for Mercury and Air Toxics Standards (MATS), incorporated herein by reference in its entirety for all purposes, which require many coal and oil power plants to substantially reduce mercury and other toxic emissions. Prior to the MATS, there had been no federal standards requiring power plants to limit their emissions of mercury and other heavy metals. In 2007, the EPA projected that the annual incremental compliance cost of MATS for power plants would be $9.4 billion in 2015. Due to these costs, the EPA expects 4.7 GW of coal-fired capacity to shutdown since they would be uneconomic under MATS. DOE testing has shown that some power plants may not be able to achieve the required reductions in mercury with dry sorbent injection systems alone for several reasons. First, $SO_3$ interferes with mercury's ability to bind with carbon sorbents reducing the effectiveness of some dry sorbent injection systems. Second, the use of hot-side electrostatic precipitators (ESPs) has the unintentional side effect of reducing the amount of mercury that can bind to sorbents and be collected as particulate matter. Third, it is difficult for dry sorbent injection systems to thoroughly treat flue gas from boilers combusting coal that is high in elemental mercury, and without installing an additional baghouse, it would be impossible to achieve over 90% mercury reduction required by MATS, especially for sub-bituminous or high sulfur coals.

Meeting these new emission standards has unintentional side effects. While an increase in the use of wet FGD and SCR controls will significantly reduce $SO_2$ and $NO_x$ emissions, it will unfortunately make stack opacity a more prevalent problem. As described in greater detail below, the reason for the increase in stack opacity is a result of the increase in $SO_3$ due to the further oxidation of $SO_2$. This phenomenon that has already been experienced in coal-fired plants retrofitted with SCR and/or wet FGD controls, and is particularly problematic in plants that burn high sulfur containing bituminous coals.

Condensed $SO_3$ or its hydrated acidic form, sulfuric acid ($H_2SO_4$), is one of the major contributors to stack opacity problems—a phenomenon commonly known as "blue plume." Estimates are that 75% to 85% of bituminous coal-fired plants with SCR and/or wet FGD systems are likely to produce enough $SO_3$ vapor and aerosol mist to make their emissions opaque. For example, in 2000 following the installation of SCR units at American Electric Power's 2,600-MW General Gavin Plant in Ohio, a notable instance of blue plume occurred because the plant's $SO_3$ emissions doubled because of the SCR. This increase is attributed to the further oxidization of $SO_2$ by the catalysts packed in the SCR unit. The SCRs use oxidative catalysts, for example titanium dioxide, vanadium pentoxide, and other titanium-vanadium catalysts, that promotes convertion of $SO_2$ to $SO_3$.

The visible consequences of sulfuric acid aerosol emissions are not the only problem associated with $SO_3$ in flue gas. It also results in several adverse health, environmental, and aesthetic consequences and produces significant operational and maintenance disadvantages for operators of coal-fired power plants. In sufficient concentration, $SO_3$ can increase corrosion and fouling of equipment and components downstream of the furnace or boiler, including but not limited too, the ductwork, air heater, ESP, or fabric filter (FF), and the smoke stack itself. Further, the increased $SO_3$ can also decrease the efficiency and diminish the overall plant heat rate. With higher $SO_3$ levels in flue gas exiting furnace or boiler and/or SCR, the air heater is forced to be operated at a gas outlet temperature far above the acid dew point temperature, which means the heat recovery by the air heater will be lower, consequently lowering the plant's thermal efficiency. At the same time, the resultant higher flue gas volumetric flow due to higher flue gas temperature will lower ESP/FF particulate removal efficiency, further contributing to stack opacity issues. The higher flue gas volumetric flow will also lead to more electric power consumption by induced draft (ID) fans. Also the SCR catalytic surfaces can be blinded by excess arsenic and mercury that will also be present with excess $SO_3$.

Raising the air heater operation temperature at least 20-30° F. above the acid dew point can avoid $SO_3$ condensation, but the consequence is that it will reduce the plant efficiency. Alternatively, reheating the flue gas before it is discharged to the stack can also reduce the blue plume risk, but significant consumption of energy is required to do so. Moreover, these strategies only solve the blue plume caused visibility issue, they do not help reduce $SO_3$ emissions to the atmosphere and associated air pollution issues.

Though the specific $SO_3$ concentration at which visible effects are seen varies with atmospheric conditions and stack characteristics, it is generally accepted that if the $SO_3$ concentration is less than about 5 to about 10 ppm, there will be no visual discoloration effects. Experience from the power industry also indicates that reducing the $SO_3$ concentration in the flue gas to low levels (<10 ppm) prior to the air heater will reduce the likelihood of downstream component corrosion and fouling. Reducing the $SO_3$ concentrations at furnace or boiler outlet from a typical 30 ppm to about 5 ppm would allow the air heater to operate at least 35° F. lower in gas outlet temperature. This would result in an about 1% increase in heat rate (or plant efficiency), which would be worth about $2,233,800 (for a 500 MW plant with 85% operation factor and power rate at $60/MWh).

Therefore, there is a need for innovative, efficient and cost-effective methods to mitigate harmful air pollutants and related environmental, economical and operational issues associated with coal-fired power plants.

There is also a need for new systems and methods for reducing pollutants, particularly $SO_x$, $NO_x$, HCl, and Hg produced in combustion processes in an integrated fashion to provide maximum pollutant removal and avoid at least some of the problems associated with conventional $SO_x$, $NO_x$, HCl, and Hg reduction technologies.

SUMMARY OF THE INVENTION

It is an object of the present invention to provide methods of burning engineered fuel feedstocks comprising one or more components from a processed MSW waste stream and sorbent which allow the use of fuels that contain significant levels of sulfur for combustion applications without violating the regulatory sulfur emission limits.

It is a further object of the present invention to provide methods of burning engineered fuel feedstocks comprising one or more components from a processed MSW waste stream and comprising one or more sorbents that can be used to control one or more sulfur-based pollutants.

It is an additional object of the present invention to provide methods of co-firing coal and an engineered fuel feedstock comprising one or more components from a processed MSW waste stream and comprising one or more sorbents that can be used to control one or more sulfur-based pollutants.

It is an object of the present invention to provide engineered fuel feedstocks comprising one or more components from a processed MSW waste stream and comprising sorbent which allow the use of fuels that contain significant levels of sulfur for combustion applications.

It is a further object of the present invention to provide engineered fuel feedstocks comprising one or more components from a processed MSW waste stream and comprising one or more sorbents that can be used to control one or more sulfur-based pollutants.

It is an object of the present invention to provide methods of burning engineered fuel feedstocks comprising one or more components from a processed MSW waste stream and comprising sorbents which allow the use of fuels that contain significant levels of nitrogen for combustion applications.

It is a further object of the present invention to provide methods of burning engineered fuel feedstocks comprising one or more components from a processed MSW waste stream and comprising one or more sorbents that can be used to control one or more nitrogen-based pollutants.

It is an additional object of the present invention to provide methods of co-firing coal and an engineered fuel feedstock comprising one or more components from a processed MSW waste stream and comprising one or more sorbents that can be used to control one or more nitrogen-based pollutants.

It is an object of the present invention to provide engineered fuel feedstocks comprising one or more components from a processed MSW waste stream and comprising sorbents which allow the use of fuels that contain significant levels of nitrogen for combustion applications.

It is a further object of the present invention to provide engineered fuel feedstocks comprising one or more components from a processed MSW waste stream and comprising one or more sorbents that can be used to control one or more nitrogen-based pollutants.

It is an object of the present invention to provide methods of burning engineered fuel feedstocks comprising one or more components from a processed MSW waste stream and comprising sorbents which allow the use of fuels that contain mercury for combustion applications meeting or exceeding the regulatory mercury emission limits.

It is a further object of the present invention to provide methods of burning engineered fuel feedstocks comprising one or more components from a processed MSW waste stream and comprising one or more sorbents that can be used to control mercury pollutant.

It is an additional object of the present invention to provide methods of co-firing coal and an engineered fuel feedstock comprising one or more components from a processed MSW waste stream and comprising one or more sorbents that can be used to control mercury pollutant.

It is an object of the present invention to provide engineered fuel feedstocks comprising one or more components from a processed MSW waste stream and comprising sorbents which allow the use of fuels that contain significant levels of mercury for combustion applications.

It is a further object of the present invention to provide engineered fuel feedstocks comprising one or more components from a processed MSW waste stream and comprising one or more sorbents that can be used to control one or more mercury-based pollutants.

It is an object of the present invention to provide methods of burning engineered fuel feedstocks comprising one or more components from a processed MSW waste stream and comprising sorbents which allow the use of fuels that contain levels of chlorine for combustion applications.

It is a further object of the present invention to provide methods of burning engineered fuel feedstocks comprising one or more components from a processed MSW waste stream and comprising one or more sorbents that can be used to control one or more chlorine-based pollutants.

It is an additional object of the present invention to provide methods of co-firing coal and an engineered fuel feedstock comprising one or more components from a processed MSW waste stream and comprising one or more sorbents that can be used to control one or more chlorine-based pollutants.

It is an object of the present invention to provide engineered fuel feedstocks comprising one or more components from a processed MSW waste stream and comprising sorbent which allow the use of fuels that contain significant levels of chlorine for combustion applications.

It is a further object of the present invention to provide engineered fuel feedstocks comprising one or more components from a processed MSW waste stream and comprising one or more sorbents that can be used to control one or more chlorine-based pollutants.

It is a further object of the present invention to provide engineered fuel feedstocks comprising one or more components from a processed MSW waste stream and comprising one or more sorbents that can be used to control a specific pollutant, or preferably a number of pollutants at the same time. In order to achieve multiple pollutant control, a multi-functional sorbent is ideally required; alternatively, multiple sorbents could be utilized with each sorbent being selected to treat for a particular element or for a particular purpose. Selection of sorbents is dependent on a various considerations, including, but not limited to, the following: (i) fuel characteristics, essentially what type and amount of the pollutants need to be controlled by sorbent(s); (ii) operating conditions, such as reducing or oxidizing environment, temperature, pressure, and conversion technologies (e.g., fixed bed, dense fluidized bed, circulating fluidized bed, etc.); (iii) reactivity of the sorbent and characteristics of the by-products, e.g., stability, melting point, boiling point, and toxicity; (iv) economic effectiveness; and (v) the properties of the sorbent that result in reduced slagging or fouling of the downstream collectors or increased the operational efficiency.

It is an object of this invention to avoid costly, capital expenditures related to the use of sorbents by using engineered fuel feedstocks comprising one or more components from a processed MSW waste stream and comprising sorbent. Because the sorbent is part of the engineered fuel feedstock, there is no need to have the sorbent handling systems that are normally required for dry and furnace sorbent injection systems (storage, delivery, atomizing, etc.). Also, the products of the sorbent/pollutant reaction mostly remain in the bottom ash in fluidized bed boilers, therefore the particulate, or dust, load on downstream collectors (i.e., electrostatic precipitator, baghouse, particulate matter scrubber) would be reduced, resulting savings in capital, operation and maintenance costs otherwise required for these devices. In pulverized coal boilers, the products of the sorbent/pollutant reaction mostly remain in the fly ash, where existing downstream collectors become more effective at removing pollutants that would otherwise pass through and out the stack. Adsorbing more flue gas pollutants in the sorbent eliminates the need for additional capital expenditures for wet scrubbers to comply with increasingly stringent emissions standards.

The present disclosure describes an engineered fuel feedstock comprising one or more components derived from a processed MSW waste stream and at least one sorbent, the engineered fuel feedstock possessing a range of chemical or molecular characteristics which make it useful for a variety of combustion purposes. In some embodiments, the engineered fuel feedstock comprises at least 2 or more sorbents. The combined engineered fuel feedstock and sorbent can be in the form of loose material, densified cubes, briquettes, pellets, honeycomb, or other suitable shapes and forms. Algorithms for engineering fuels without sorbents are disclosed in U.S. patent application Ser. Nos. 12/492,096 and 12/492,093, the contents of each of which are incorporated herein by reference in their entirety.

It is a further object of the present invention to provide an engineered fuel feedstock for co-firing with other fuels such as coal as a means to control emissions. This control is required because of the more and more stringent state and federal air emissions standards. The vast majority of coal-fired power plants in the U.S. will be forced by these rules into a critical decisions, i.e., either spending multi-million dollars to retrofit their emission control systems to meet compliance, or simply shutdown the power plant to avoid that expense. The use of engineered fuel feedstocks of the present invention will not only avoid the above retrofit cost, but would also allow the plant to extend its operational life, thereby avoiding costly retrofit upgrades for emission control and extending the useful life of an existing power generation plant that would not normally comply with stringent emission control regulations, such as the new EPA cross state air pollution rule.

It is an object of the present invention to provide an engineered fuel feedstock, comprising one or more components derived from a processed MSW waste stream and at least one sorbent, wherein the engineered fuel feedstock when combusted produces less sulfur emissions as compared to the known level of sulfur emissions of at least one other fuel when combusted. In some embodiments, the engineered fuel feedstock comprises at least 2 or more sorbents.

It is an object of the present invention to provide an engineered fuel feedstock, comprising one or more components derived from processed MSW waste stream and at least one sorbent, wherein the engineered fuel feedstock when combusted produces less nitrogen emissions as compared to the known level of nitrogen emissions of at least one other fuel when combusted. In some embodiments, the engineered fuel feedstock comprises at least 2 or more sorbents.

It is an object of the present invention to provide an engineered fuel feedstock, comprising one or more components derived from processed MSW waste stream and at least one sorbent, wherein the engineered fuel feedstock when combusted produces less chlorine emissions as compared to the known level of chlorine emissions of at least one other fuel when combusted. In some embodiments, the engineered fuel feedstock described above comprises at least 2 or more sorbents.

It is an object of the present invention to provide an engineered fuel feedstock, comprising one or more components derived from processed MSW waste stream and at least one sorbent, wherein the engineered fuel feedstock when combusted produces less mercury emissions as compared to the known level of mercury emissions of at least one other fuel when combusted. In some embodiments, the engineered fuel feedstock described above comprises at least 2 or more sorbents.

It is a further object of the present invention to provide an engineered fuel feedstock, comprising one or more components derived from a processed MSW waste stream and one or more sorbents selected from the group selected from trisodium hydrogendicarbonate dihydrate or sodium sesquicarbonate (Trona), sodium bicarbonate, sodium carbonate, zinc ferrite, zinc copper ferrite, zinc titanate, copper ferrite aluminate, copper aluminate, copper manganese oxide, nickel supported on alumina, zinc oxide, iron oxide (FeO, $Fe_2O_3$, $Fe_3O_4$), copper, copper (I) oxide, copper (II) oxide, ammonium bromide, limestone, lime, iron filings, Fe, $CaCO_3$, $Ca(OH)_2$, $CaCO_3.MgO$, calcium magnesium acetate ($CaMg_2(CH_3COO)_6$), soda, silica, alumina, china clay, kaolinite, bauxite, emathlite, attapulgite, coal ash, hydrated lime, dolomite, egg shells, and Ca-montmorillonite.

In a further embodiment, the engineered fuel feedstock comprises 2 or more sorbents described above. In still further embodiments, the engineered fuel feedstock comprises 2 or more sorbents described above and further comprises a sorbent for mercury reduction. In still further embodiments, the engineered fuel feedstock comprises 2 or more sorbents described above and further comprises a sorbent for $NO_x$ reduction. In some embodiments, the sorbent for mercury reduction is selected from calcium bromide, ammonium bromide, sodium bromide, iodine containing compounds, and chlorine containing compounds known to those of skill in the art. In some embodiments, the sorbent for mercury reduction is calcium bromide. In some embodiments, the sorbent for $NO_x$ reduction is urea. In further embodiments, the engineered fuel feedstock comprises 1 or more sorbents selected from sodium-based sorbents including trisodium hydrogendicarbonate dihydrate (Trona), sodium sesquicarbonate, sodium bicarbonate, and sodium carbonate and 1 or more sorbents selected calcium-based sorbents including calcium carbonate ($CaCO_3$), lime or calcium oxide (CaO), hydrated lime (hydrated lime or calcium hydroxide ($Ca(OH)_2$), calcium magnesium acetate ($CaMg_2(CH_3COO)_6$), dolomite ($CaCO3.MgO$), and further comprises calcium bromide. In a further embodiment, the engineered fuel feedstock comprises 1 or more sorbents selected from sodium-based sorbents including trisodium hydrogendicarbonate dihydrate (Trona), sodium sesquicarbonate, sodium bicarbonate, and sodium carbonate and 1 or more sorbents selected calcium-based sorbents including calcium carbonate ($CaCO_3$), lime or calcium oxide (CaO), hydrated lime (hydrated lime or calcium hydroxide ($Ca(OH)_2$), calcium magnesium acetate ($CaMg_2(CH_3COO)_6$), dolomite ($CaCO_3.MgO$), and further comprises calcium bromide and urea.

In some embodiments, the engineered fuel feedstock comprises sodium bicarbonate, and calcium carbonate ($CaCO_3$). In some embodiments, the engineered fuel feedstock comprises sodium bicarbonate, and calcium carbonate ($CaCO_3$) and further comprises calcium bromide. In some embodiments, the engineered fuel feedstock comprises sodium bicarbonate, and calcium carbonate ($CaCO_3$) and further comprises calcium bromide and urea.

An object of the invention is a method of generating energy comprising using an engineered fuel feedstock comprising one or more components derived from a processed MSW waste stream and at least one sorbent in a furnace or boiler. In some embodiments, the engineered fuel feedstock comprises at least 2 or more sorbents. In a further embodiment of the invention, the energy is electricity. In a further embodiment of the invention, the energy is steam. In a further embodiment of the invention, the energy is heat. In a further embodiment of the invention, the energy is hot water. In a further embodiment of the invention, the furnace or boiler is operated in a combustion mode. In a further embodiment of the invention, the engineered fuel feedstock controls sulfur emissions. In a further embodiment, the engineered fuel feedstock controls mercury emissions. In a further embodiment, the engineered fuel feedstock controls nitrogen-based emissions. In a further embodiment, the engineered fuel feedstock controls chlorine-based emissions. In a further embodiment, the engineered fuel feedstock controls sulfur-based emissions and mercury emissions. In a further embodiment, the engineered fuel feedstock controls sulfur-based emissions, nitrogen-based and mercury emissions. In a further embodiment, the engineered fuel feedstock controls sulfur-based emissions, chlorine-based and mercury emissions. In a further embodiment, the engineered fuel feedstock controls sulfur-based emissions, nitrogen-based, chlorine-based emissions, and mercury emissions. In a further embodiment of the invention, the engineered fuel feedstock controls corrosion. In a further embodiment of the invention, the engineered fuel feedstock maintains emissions below a government regulated requirement. In a further embodiment of the invention, the engineered fuel feedstock improves process performance. In a further embodiment of the invention, the improvement in process performance is reduced slagging and fouling. In a further embodiment of the invention, the improvement in process performance is higher efficiency. In a further embodiment of the invention, the improvement in process performance is increased conversion or utilization of fuel. In a further embodiment of the invention, the improvement is extending the life of the furnace or boiler. In a further embodiment of the invention, the improvement is avoiding retrofit costs. In a further embodiment of the invention, the improvement is reduced operational costs. In a further embodiment of the invention, the improvement is reduced maintenance costs.

An object of the invention is a method of generating energy with reduced stack opacity comprising using an engineered fuel feedstock comprising with one or more components derived from a processed MSW waste stream and at least one sorbent in a reactor with at least one fossil fuel. In some embodiments, the engineered fuel feedstock described above comprises at least 2 or more sorbents. In a further embodiment of the invention, the energy is electricity. In a further embodiment of the invention, the energy is steam. In a further embodiment of the invention, the furnace or boiler is operated in a combustion mode. In a further embodiment of the invention, the engineered fuel feedstock maintains emissions below a government regulated requirement. In a further embodiment of the invention, the engineered fuel feedstock reduces or eliminates stack opacity. In a further embodiment of the invention, the engineered fuel feedstock improves process performance. In a further embodiment of the invention, the improvement in process performance is higher efficiency. In a further embodiment of the invention, the improvement in process performance is increased conversion of fuel. In a further embodiment of the invention, the improvement in process performance is reduced operating temperature. In a further embodiment of the invention, the improvement is extending the life of the furnace or boiler. In a further embodiment of the invention, the improvement is extended life of the individual components of the power plant station. In a further embodiment of the invention, the improvement is extended life for the entire power plant station. In a further embodiment of the invention, the improvement is avoiding retrofit costs. In a further embodiment of the invention, the improvement is reduced operational costs. In a further embodiment of the invention, the improvement is reduced maintenance costs. In a further embodiment of the invention, the improvement is use of less expensive coal with a higher sulfur content and still meet the emission requirements of the CSAPR. In a further embodiment of the invention, the improvement is extending the live of the SCR catalysts. (or extend the lifetime of the aged utility boilers that would otherwise be retired due to inability to comply with regulatory air emission requirements.

An additional object of the invention is a method of reduction of the emission of sulfur, nitrogen, chlorine, mercury or other harmful air pollutants during fossil fuel combustion. In a further embodiment of the invention, the emission of $SO_2$ is reduced. In a further embodiment of the invention, the emission of $SO_3$ is reduced. In a further embodiment of the invention, the emission of $H_2SO_4$ is reduced. In a further embodiment of the invention, the emission of NO is reduced. In a further embodiment of the invention, the emission of $NO_2$ is reduced. In a further embodiment of the invention, the emission of HCl is reduced. In a further embodiment of the invention, the emission of mercury is reduced. In a further embodiment of the invention the stack opacity is decreased. In a further embodiment of the invention the presence of the blue plume is decreased.

In another aspect, the present invention relates to an engineered fuel feedstock, comprising one or more components derived from a processed MSW waste stream, the engineered fuel feedstock having a carbon content of between about 25% to about 59%, a hydrogen content of between about 3% to about 8%, and oxygen content of between about 9% to 44%, an ash content (prior to addition of sorbents) of less than about 10%, and one or more sorbents, and wherein the feedstock contains substantially no glass, metals, grit, and noncombustible wastes. In some embodiments, the engineered fuel feedstock described above comprises at least 2 or more sorbents.

In another aspect, the present invention relates to an engineered fuel feedstock comprising one or more components derived from a processed MSW waste stream, and a calcium based sorbent and a sodium based sorbent. In some embodiments the ratio of sorbent to pollutants is less than about 5, wherein the total moles of calcium in the sorbent plus total moles of sodium in the sorbent divided by the total moles of sulfur present in the engineered fuel feedstock plus total moles of chlorine present in the engineered fuel feedstock is less than 5.

In another aspect, the present invention relates to a process for combustion comprising introducing a first engineered fuel feedstock one or more components derived from a processed MSW waste stream and comprising one or more sorbents and coal to a combustion zone of a combustion reactor, and supplying an oxidant to the combustion zone of the combustion reactor.

In another embodiment, an engineered fuel feedstock is described which comprises least two sorbents and MSW, wherein at least one sorbent is a sodium-based sorbent, at least one sorbent is a calcium-based sorbent, and the MSW comprises about 5% (w/w) to about 50% (w/w) plastic and about 50% (w/w) to about 95% (w/w) fiber and contains substantially no glass, metals, grit, and noncombustible waste. In some embodiments, the volatile portion of the engineered fuel feedstock has a carbon content of about 25% (w/w) to about 59% (w/w) a hydrogen content of about 3% (w/w) to about 8% (w/w) an oxygen content of about 9% (w/w) to about 44% (w/w) wherein the H/C ratio is from about 0.07 to about 0.21, and the O/C ratio is from about 0.19 to about 1.52. In another embodiment, the volatile portion of the engineered fuel feedstock has a carbon content of about 25% (w/w) to about 50% (w/w), a hydrogen content of about 3.0% (w/w) to about 5.3% (w/w), an oxygen content of about 15% (w/w) to about 39% (w/w), wherein the H/C ratio is from about 0.07 to about 0.19, and the O/C ratio is from about 0.36 to about 1.27. In another embodiment, the volatile portion of the engineered fuel feedstock has a carbon content of about 34% (w/w) to about 37% (w/w), a hydrogen content of about 4% (w/w) to about 5% (w/w), an oxygen content of about 27% (w/w) to about 29% (w/w), wherein the H/C ratio is from about 0.12 to about 0.14, and the O/C ratio is from about 0.70 to about 0.90. In other embodiments, the volatile portion of the engineered fuel feedstock has a carbon content of about 31% (w/w) to about 35% (w/w), a hydrogen content of about 3.5% (w/w) to about 5.5% (w/w), an oxygen content of about 25% (w/w) to about 28% (w/w), wherein the H/C ratio is from about 0.12 to about 0.14, and the O/C ratio is from about 0.70 to about 0.90. In another embodiment, the volatile portion of the engineered fuel feedstock has a carbon content of about 28% (w/w) to about 30% (w/w), a hydrogen content of about 3% (w/w), to about 4% (w/w) an oxygen content of about 22% (w/w) to about 24% (w/w), wherein the H/C ratio is from about 0.12 to about 0.14, and the O/C ratio is from about 0.70 to about 0.90. In still other embodiments, the carbon, hydrogen, and/or oxygen contents engineered fuel feedstock were determined by ASTM test methods D5373, D3176, D6373, or a combination thereof.

In some embodiments, the engineered fuel feedstock comprises a sodium-based sorbent which is about 19% (w/w) to about 30% of the total weight of the engineered fuel feedstock. In some embodiments, the sodium-based sorbent is selected from the group consisting of trisodium hydrogendicarbonate dihydrate (Trona), sodium sesquicarbonate, sodium bicarbonate, sodium carbonate, and combinations thereof. In other embodiments, the sodium-based sorbent is sodium bicarbonate. In some embodiments, the engineered fuel feedstock comprises sodium bicarbonate in about 19% (w/w) to about 30% (w/w) of the total weight of the engineered fuel feedstock feed stock. In some embodiments, the engineered fuel feedstock comprises a calcium-based sorbent in about 5% (w/w) to about 12% (w/w) of the total weight of the engineered fuel feedstock. In some embodiments, the calcium-based sorbent is selected from the group consisting of calcium carbonate, calcium oxide, calcium hydroxide, calcium magnesium acetate, calcium bromide, dolomite, and combinations thereof. In some embodiments, the calcium-based sorbent is selected from calcium hydroxide, dolomite, calcium carbonate or mixtures thereof. In still other embodiments, the calcium-based sorbent is calcium hydroxide. In other embodiments, the calcium-based sorbent is calcium carbonate. In other embodiments, the calcium-based sorbent the calcium-based sorbent is dolomite. In some embodiments, the calcium hydroxide comprises about 3% (w/w) to about 10% (w/w) of the total weight of the engineered fuel feedstock. In some embodiments, the calcium carbonate comprises about 8% (w/w) to about 10% (w/w) of the total weight of the engineered fuel feedstock. In some embodiments, the dolomite comprises about 7% (w/w) to about 9% (w/w) of the total weight of the engineered fuel feedstock. In some embodiments, the engineered fuel feedstock comprises sodium bicarbonate and calcium hydroxide.

In some embodiments, the MSW of the engineered fuel feedstock comprises about 10% (w/w) to about 30% (w/w) plastic and about 70% (w/w) to about 90% (w/w) fiber. In some embodiments, the MSW of the engineered fuel feedstock comprises about 20% (w/w) plastic and about 80% (w/w) fiber. In some embodiments, the plastic comprises soft plastic. In some embodiments, the engineered fuel feedstock comprises about 20% (w/w) plastic and about 80% (w/w) fiber, sodium bicarbonate, and calcium hydroxide. In some embodiments, the engineered fuel feedstock further comprises a sorbent for mercury reduction. In some embodiments, the mercury sorbent is a selected from calcium bromide, ammonium bromide, sodium bromide, iodine-containing compounds, and chlorine-containing compounds. In some embodiments, the mercury based sorbent is calcium bromide. In some embodiments, the mercury based sorbent comprises about 0.05% (w/w) to about 0.15% (w/w) of the engineered fuel feedstock. In some embodiments, the engineered fuel feedstock further comprises a sorbent for $NO_x$ reduction. In some embodiments, the sorbent for $NO_x$ reduction is urea and the urea comprises about 1% (w/w) to about 3% (w/w) of the engineered fuel feedstock. In some embodiments, the engineered fuel feedstock comprises a mercury sorbent and an $NO_x$ sorbent. In some embodiments, the mercury sorbent is calcium bromide and the $NO_x$ sorbent is urea. In some embodiments, the engineered fuel feedstock comprises about 25% to about 40% of sorbent. In some embodiments, the engineered fuel feedstock comprises sodium bicarbonate, calcium hydroxide, calcium bromide, and urea. In some embodiments, the engineered fuel feedstock comprises about 30% (w/w) to about 71% (w/w) fiber, about 6% (w/w) to about 38% (w/w) plastic, about 23% (w/w) to about 40% (w/w) sorbents. In some embodiments, the engineered fuel feedstock comprises about 44% (w/w) to about 56% (w/w) fiber, about 11% (w/w) to about 14% (w/w) plastics, about 3% (w/w) to about 10% (w/w) calcium hydroxide, about 19% (w/w) to about 30% (w/w) sodium bicarbonate, about 0.05% (w/w) to about 0.15% (w/w) calcium bromide, and about 1% (w/w) to about 3% (w/w) urea. In some embodiments, the engineered fuel feedstock has an HHV of about 5,000 BTU/lb to about 12,000 BTU/lb. In some embodiments, the engineered fuel feedstock has an ash content of about 13% (w/w) to about 33% (w/w).

In another aspect, a method of generating energy is described which comprises co-firing in a reactor the engineered fuel feedstocks described herein and at least one fossil fuel, wherein the emission of at least one pollutant is less than the emission of said pollutant when the fossil fuel is fired in the absence of the engineered fuel feedstock feed stock. In some embodiments, the energy is electricity. In some embodiments, the energy is steam. In some embodiments, the fossil fuel is coal. In some embodiments, the coal is selected from lignite, sub-bituminous coal, bituminous coal, anthracite coal, and combinations thereof. In some embodiments, the engineered fuel feedstock is in an amount of between about 10% to about 50% by energy. In some embodiments, the engineered fuel feedstock is in an amount of between about 20% to about 40% by energy when co-fired in a reactor with at least one fossil fuel. In another embodiment, the engineered fuel feedstock is in an amount of between about 5% to about 40% by weight when co-fired in a reactor with at least one fossil fuel. In another embodiment, the engineered fuel feedstock is in an amount of between about 15% to about 40% by weight when co-fired in a reactor with at least one fossil fuel. In another embodiment, the engineered fuel feedstock is in an amount of between about 30% to about 35% by weight when co-fired in a reactor with at least one fossil fuel. In another embodiment, the coal contains sulfur, such that the molar ratio of the sulfur in the coal to the calcium in the engineered fuel feedstock is between about 1:1 to about 5:1. In another embodiment, the pollutant is at least one sulfur-based pollutant selected from the group consisting of $SO_2$, $SO_3$, $H_2SO_4$, $H_2S$ or combinations thereof.

In another embodiment, the pollutant is at least one chlorine-based pollutant selected from the group consisting of $Cl_2$, HCl, or combinations thereof. In another embodiment, the pollutant is at least one nitrogen-based pollutant selected from the group consisting of NO, $NO_2$, $N_2O$, HN, HCN, $HNO_3$, or combinations thereof. In another embodiment, the pollutant at least one mercury-based pollutant selected from the group consisting of $Hg^0$, $Hg^{2+}$, $HgCl_2$, or combinations thereof. In another embodiment, the emission of sulfur-based pollutants is reduced by 50% or more. In another embodiment, the emission of sulfur-based pollutants is reduced by 70% or more. In another embodiment, the emission of chlorine-based pollutants is reduced by 50% or more. In another embodiment, the emission of chlorine-based pollutants is reduced by 70% or more. In another embodiment, the emission of nitrogen-based pollutants is reduced by 50% or more. In another embodiment, the emission of nitrogen-based pollutants is reduced by 70% or more. In another embodiment, the emission of mercury-based pollutants is reduced by 50% or more. In another embodiment, the emission of mercury-based pollutants is reduced by 70% or more. In another embodiment, stack opacity is reduced as compared to the stack opacity when the fossil fuel is fired in the absence of the engineered fuel feedstock feed stock.

In another aspect, a method of making an engineered fuel feedstock is described, which comprises processing plastic and sodium-based and calcium-based sorbents with at least about 50% of the plastic to form a plastic-sorbent pellet which is then processed with fiber and any remaining plastic (to reach 100% of the desired plastic) to form fiber-plastic-sorbent-pellets. In some embodiments, the sodium-based sorbent is selected from the group consisting of trisodium hydrogendicarbonate dihydrate (Trona), sodium sesquicarbonate, sodium bicarbonate, sodium carbonate, and combinations thereof. In some embodiments, the engineered fuel feedstock further comprises calcium bromide. In some embodiments, the engineered fuel feedstock further comprises urea. In some embodiments, the engineered fuel feedstock further comprises calcium bromide and urea.

DETAILED DESCRIPTION OF THE INVENTION

Figure 1:
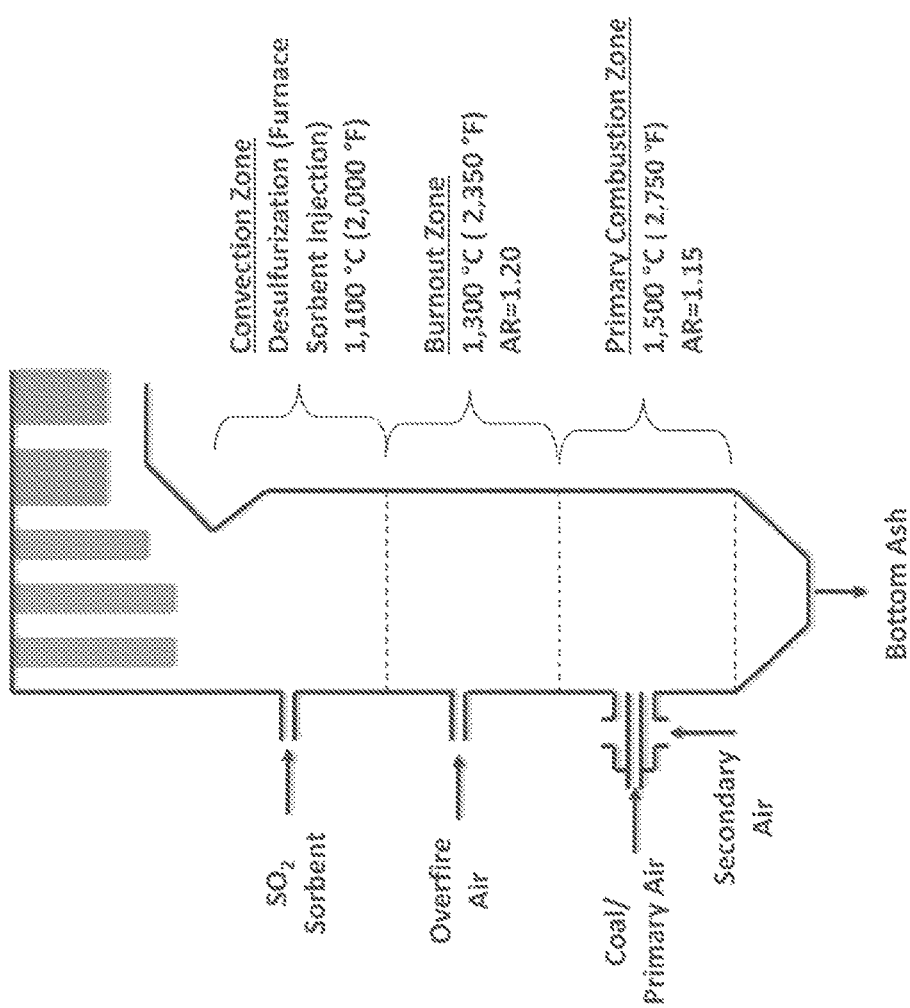
FIG. 1 is a schematic diagram of a typical coal-fired boiler.

The engineered fuel feedstocks (also referred to herein as "feedstocks" or "engineered fuel feedstocks") have any of a number of desired chemical and/or molecular characteristics, including, but not limited to carbon content, hydrogen content, oxygen content, nitrogen content, ash content, moisture content, and HHV content. This engineered fuel feedstock is useful for a variety of chemical conversion processes such as, for example, combustion, and may be used alone or blended with other fuels. Also described herein are processes for producing an engineered fuel feedstock, and methods of employing the same in combustion processes.

Novel engineered fuel feedstocks are provided that comprise one or more components derived from a processed MSW waste stream, such as recycling residue which is the non-recoverable portion of comingled residential, commercial waste streams, and sorbent, which fuels are engineered to have predetermined chemical or molecular characteristics. These novel fuels contain, for example, unique ratios of carbon, hydrogen, and ash, such that, when compared to known fuels, provide a superior combustion profile with respect to pollutants and contain sorbent, which when co-fired with a fossil fuel such as coal are delivered to the combustion chamber in a controlled fashion aid in significantly controlling deleterious emissions from coal.

Novel methods for combusting coal in the presence of engineered fuel feedstocks that comprise one or more components derived from a processed MSW waste stream and sorbent are provided. In certain embodiments of the invention, such methods result in a decrease in the emissions of pollutants including, but not limited to, sulfur, nitrogen, chlorine, or mercury based pollutants.

The following specification and non-limiting examples further illustrate the present invention in greater detail.

Definitions

The term "about" when immediately preceding a numerical value means a range of plus or minus 10% of that value, e.g., "about 50" means 45 to 55, "about 25,000" means 22,500 to 27,500, etc. Furthermore, the phrases "less than about" a value or "greater than about" a value should be understood in view of the definition of the term "about" provided herein.

The term "air equivalence ratio" (AR) means the ratio of the amount of air supplied to the combustion reactor divided by the amount of air required for complete fuel combustion. Air equivalence ratio, "AR," can be represented by the following equation:

$$AR = \frac{\text{Air supplied to the combustion reactor}}{\text{Air required for complete fuel combustion}}$$

The term "boiler" means any apparatus in which a fuel is oxidized in order to generate heat for separate use, usually for heating water to produce steam.

The term "British Thermal Unit" (BTU) means the amount of heat energy needed to raise the temperature of one pound of water by one degree F.

The term "carbon content" means all carbon contained in the fixed carbon (see definition below) as well as in all the volatile matters in the fuel.

The term "commercial waste" means solid waste generated by stores, offices, restaurants, warehouses, and other non-manufacturing, non-processing activities. Commercial waste does not include household, process, industrial or special wastes.

The term "construction and demolition debris" (C&D) means uncontaminated solid waste resulting from the construction, remodeling, repair and demolition of utilities, structures and roads; and uncontaminated solid waste resulting from land clearing. Such waste includes, but is not limited to bricks, concrete and other masonry materials, soil, rock, wood (including painted, treated and coated wood and wood products), land clearing debris, wall coverings, plaster, drywall, plumbing fixtures, nonasbestos insulation, roofing shingles and other roof coverings, asphaltic pavement, glass, plastics that are not sealed in a manner that conceals other wastes, empty buckets ten gallons or less in size and having no more than one inch of residue remaining on the bottom, electrical wiring and components containing no hazardous liquids, and pipe and metals that are incidental to any of the above. Solid waste that is not C&D debris (even if resulting from the construction, remodeling, repair and demolition of utilities, structures and roads and land clearing) includes, but is not limited to asbestos waste, garbage, corrugated container board, electrical fixtures containing hazardous liquids such as fluorescent light ballasts or transformers, fluorescent lights, carpeting, furniture, appliances, tires, drums, containers greater than ten gallons in size, any containers having more than one inch of residue remaining on the bottom and fuel tanks. Specifically excluded from the definition of construction and demolition debris is solid waste (including what otherwise would be construction and demolition debris) resulting from any processing technique, that renders individual waste components unrecognizable, such as pulverizing or shredding.

The term "devolatilization" means a process whereby a fuel is heated and the volatile matter is expelled. Devolatilization increases the relative amount of carbon in the engineered fuel feedstock.

As used herein, sorbent or engineered fuel feedstock pellet or particle "diameter" may refer to the diameter of spherical or semi-spherical pellets or particles. Alternatively, when the pellets or particles as described herein are irregularly shaped or non-spherical, "diameter" may refer to any of the length, width, height, or an proper equivalent diameter (such are hydraulic diameter) of a pellet or particle.

The term "fiber" means materials including, but not limited to, textiles, wood, biomass, papers, fiberboard and cardboard. In addition, the term "fibers" can refer to the aforementioned materials with a bulk density of about 4 pounds per cubic foot, and generally include naturally occurring or man-made products based on woody, cellulostic or lignocellulostic biomass, plants and living stocks. In terms of chemical characteristics, the fiber materials typically have a carbon content of 35-50 wt. % with an average of about 45 wt. %, a hydrogen content of 5-7% wt. % with an average of about 6 wt. %, an oxygen content of 35-45 wt. % with an average of about 40 wt. %, and a higher heating value of about 6,000-9,000 Btu/lb with an average of about 7,500 Btu/lb, all in a dry basis.

The term "fixed carbon" is the solid combustible residue that remains after a fuel is devolatilized. The fixed-carbon content of a fuel is determined by subtracting the amount of moisture, volatile matter, and ash from a sample.

The term "garbage" means putrescible solid waste including animal and vegetable waste resulting from the handling, storage, sale, preparation, cooking or serving of foods. Garbage originates primarily in home kitchens, stores, markets, restaurants and other places where food is stored, prepared or served.

The term "hard plastic", also referred to as rigid plastic, means plastic materials including, but not limited to, high-density polyethylene, polyethylene terephthalate, and polyvinyl chloride. In addition, the term "hard plastic" can refer to the aforementioned materials with a bulk density of about 15-25 pounds per cubic foot and actual material density of about 56-87 pounds per cubic foot.

The term "hazardous waste" means solid waste that exhibits one of the four characteristics of a hazardous waste (reactivity, corrosivity, ignitability, and/or toxicity) or is specifically designated as such by the EPA as specified in 40 CFR part 262.

The term "Heating Value" is defined as the amount of energy released when a fuel is burned completely in a steady-flow process and the products are returned to the state of the reactants. The heating value is dependent on the reference phase of water in the combustion products. If reference $H_2O$ state is in liquid, heating value is called HHV (Higher Heating Value). When reference $H_2O$ is in vapor form, heating value is called LHV (Lower Heating Value).

The term "higher heating value" (HHV) means the caloric value released with complete fuel combustion with product water in liquid state. On a moisture free basis, the HHV of many fuels can be estimated using the following equation:

$$HHV_{Fuel} = 146.58C + 568.78H + 29.4S - 6.58A - 51.53(O+N)$$

wherein C, H, S, A, O and N are carbon content, hydrogen content, sulfur content, ash content, oxygen content and nitrogen content, respectively, all in weight percentage.

The term "mixed plastics" means combination of hard plastic and soft plastic, and can also include other types of plastics.

The term "municipal solid waste" (MSW) means solid waste generated at residences, commercial or industrial establishments, and institutions, and includes all processable wastes along with all components of construction and demolition debris that are processable, but excluding hazardous waste, automobile scrap and other motor vehicle waste, infectious waste, asbestos waste, contaminated soil and other absorbent media and ash other than ash from household stoves. Used tires are excluded from the definition of MSW. Components of municipal solid waste include without limitation plastics, fibers, paper, yard waste, rubber, leather, wood, and also recycling residue, a residual component containing the non-recoverable portion of recyclable materials remaining after municipal solid waste has been processed with a plurality of components being sorted from the municipal solid waste.

As used herein, the term "$NO_x$" means oxides of nitrogen or nitrogen oxides, and includes nitrous acid and nitric acid, and compounds such as NO, $NO_2$, etc.

The term "noncombustible waste" means waste that does not readily combust in reactors and does not give off any meaningful energy during combustion. Noncombustible wastes include but are not limited to: batteries, such as dry cell batteries, mercury batteries and vehicle batteries; refrigerators; stoves; freezers; washers; dryers; bedsprings; vehicle frame parts; crankcases; transmissions; engines; lawn mowers; snow blowers; bicycles; file cabinets; air conditioners; hot water heaters; water storage tanks; water softeners; furnaces; boilers, oil storage tanks; metal furniture; and propane tanks.

As used herein, the term "oxidant" as used herein refers to air, oxygen, or oxygen-enriched air.

As used herein, all percentages are on a weight/weight basis (w/w) unless specified otherwise.

The term "processed MSW waste stream" means that MSW has been processed at, for example, a materials recovery facility, by having been sorted according to types of MSW components. Types of MSW components include, but are not limited to, plastics, including soft plastics and hard plastics, fibers, paper, yard waste, rubber, leather, wood, and also recycling residue, a residual component containing the non-recoverable portion of recyclable materials remaining after municipal solid waste has been processed with a plurality of components being sorted from the municipal solid waste. Processed MSW contains substantially no glass, metals, grit, or noncombustible waste. Grit includes dirt, dust, granular wastes such as coffee grounds and sand, and as such the processed MSW contains substantially no coffee grounds.

The term "processable waste" means wastes that readily combusts. Processable waste includes, but is not limited to, newspaper, junk mail, corrugated cardboard, office paper, magazines, books, paperboard, other paper, rubber, textiles, and leather from residential, commercial, and institutional sources only, wood, food wastes, and other combustible portions of the MSW stream.

The term "recycling residue" means the residue remaining after a recycling facility has processed its recyclables from incoming waste which no longer contains economic value from a recycling point of view.

The term "sludge" means any solid, semisolid, or liquid generated from a municipal, commercial, or industrial wastewater treatment plant or process, water supply treatment plant, air pollution control facility or any other such waste having similar characteristics and effects.

The term "soft plastics" means plastic films, bags and foams, such as low density polyethylene, expanded polystyrene, and extruded polystyrene foam. In addition, the term "soft plastic" can refer to the aforementioned materials with a bulk density of about 1-4 pounds per cubic foot and which are typically two-dimensional or flat in shape.

The term "solid waste" means unwanted or discarded solid material with insufficient liquid content to be free flowing, including, but not limited to rubbish, garbage, scrap materials, junk, refuse, inert fill material, and landscape refuse, but does not include hazardous waste, biomedical waste, septic tank sludge, or agricultural wastes, but does not include animal manure and absorbent bedding used for soil enrichment or solid or dissolved materials in industrial discharges. The fact that a solid waste, or constituent of the waste, may have value, be beneficially used, have other use, or be sold or exchanged, does not exclude it from this definition.

The term "sorbent" generally means a noncombustible material or materials added to the engineered fuel feedstock that either acts as a traditional sorbent and adsorbs a chemical or elemental by-product, or a reagent that reacts with a chemical or elemental by-product, or in other cases, simply as an additive to alter the engineered fuel feedstock characteristics such as ash fusion temperature. The term sorbent means one or more sorbents which when used in the plural can be combined together, or used in combination.

As used herein, the term "$SO_x$" means oxides of sulfur or sulfur oxides, such as SO, $SO_2$, $SO_3$, $SO_4$, etc.

The term "volatile materials" means products, exclusive of moisture, given off by a material as a gas or vapor, when heated or not. Volatile matters include volatile organic compounds that are organic chemical compounds that have high enough vapor pressures under normal conditions to significantly vaporize and enter the atmosphere. Non-limiting examples of volatile materials include alkanes, alkenes, aldehydes, ketones, aromatics, and other light hydrocarbons.

One abundant source of waste useful in the production of engineered fuel feedstock is MSW. Described herein are engineered fuel feedstocks comprising one or more components derived from a processed MSW waste stream. MSW is generated at residences, commercial or industrial establishments and institutions, and includes all processable wastes along with all components of construction and demolition debris that are processable, but excludes hazardous waste, automobile scrap and other motor vehicle waste, infectious waste, asbestos waste, contaminated soil and other absorbent media and ash other than ash from household stoves. It does include garbage, refuse, and other discarded materials that result from residential, commercial, industrial, and community activities. The composition of MSW varies widely depending on time of collection, season of the year of collection, the types of customers from which the MSW is collected on any given day, etc. MSW may contain a very wide variety of waste or discarded material. For instance, the waste may include biodegradable waste, non-biodegradable waste, ferrous materials, non-ferrous metals, paper or cardboard in a wide variety of forms, a wide range of plastics (some of which may contain traces of toxic metals used as catalysts, stabilizers or other additives), paints, varnishes and solvents, fabrics, wood products, glass, chemicals including medicines, pesticides and the like, solid waste of various types and a wide range of other materials. The waste includes household waste and industrial waste. Industrial waste contemplated for use herein is low in toxic or hazardous materials. MSW is processed in order to remove non-processable components and marketable recyclables prior to manufacturing the engineered fuel feedstocks described herein.

Processed MSW has been sorted or inventoried according to types of MSW components. Types of MSW components include, but are not limited to, plastics, fibers, paper, yard waste, rubber, leather, wood, and also recycling residue, a residual component containing the non-recoverable portion of recyclable materials remaining after municipal solid waste has been processed with a plurality of components being sorted from the municipal solid waste. Processed MSW contains substantially no glass, metals, grit, or non-combustible waste. Grit includes dirt, dust, granular wastes such as coffee grounds and sand, and as such the processed MSW contains substantially no coffee grounds. The term "substantially no" as used herein means that no more than about 0.01% of the material is present in the MSW components.

Certain types of MSW, such as plastics can be further categorized. For example, plastics include, but are not limited to, soft plastics and hard plastics. Soft plastics include, but are not limited to plastic films, bags and foams, such as low density polyethylene, expanded polystyrene, and extruded polystyrene foam. Hard plastics include, but are not limited to high-density polyethylene, polyethylene terephthalate, and unplasticized polyvinyl chloride.

Fiber, another component of MSW can include, but is not limited to textiles, wood, biomass, papers, fiberboard and cardboard.

Another type of waste useful in the production of engineered fuel feedstock is fats, oils and greases (also referred to herein as "FOG" or "FOGs"). FOGs are commonly found in such things as meats, sauces, gravy, dressings, deep-fried foods, baked goods, cheeses, butter and the like. Many different businesses generate FOG wastes by processing or serving food, including; eating and drinking establishments, caterers, hospitals, nursing homes, day care centers, schools and grocery stores. Thus, a use as fuel would provide a means of disposal of FOGs without the prevalence of SSOs occurring due to the discharge of FOGs into the waste water. Present methods of discarding FOGs, besides directly into the sewer systems, include landfills. While these types of wastes are generally considered nuisances, they contain a high carbon and hydrogen content, essentially no ash, sulfur and chlorine, and can be transformed into a quality source of fuel. Other types of oils and greases useful in the present invention are petroleum waste products. Nonlimiting examples of petroleum waste products include discarded engine oil.

Yet another type of waste useful in the production of engineered fuel feedstock is biomass waste, also known as biogenic waste. Biomass refers to living and recently dead biological material that can be used as fuel or for industrial production. Most commonly, biomass refers to plant matter grown for use as biofuel, but it also includes plant or animal matter used for production of fibers, chemicals or heat. Biomass may also include biodegradable wastes that can be burned as fuel. It excludes organic material which has been transformed by geological processes into substances such as coal or petroleum. Nonlimiting types of biomass waste include woods, yard wastes, plants, including miscanthus, switch grass, hemp, corn, poplar, willow, sugarcane and oil palm (palm oil), coconut shells, and shells of nuts.

A distinctive feature of biomass is that it contains carbon-14, which is ubiquitous in all living things. Carbon-14 slowly and gradually decays once a living organism dies. After 50,000 years, all the carbon-14 has decayed. Therefore, fossil fuels like coal, natural gas, and oil have no carbon-14. By testing the carbon-14, one can show what fraction of the given fuel, or MSW, is biogenic. This information is important because it allows the plant operator to account for the amount of material that is fired in the furnace that is derived from a renewable source like biomass. Moreover, it allows the regulators to directly measure the amount of carbon that is attributed from the biomass and the amount that is from a fossil fuel source. It also allows the operator to directly calculate the amount of renewable fuel used in the generation of energy to be able to sell or exchange those carbon offsets. The engineered fuel feedstock disclosed in this invention has the ability to adjust the fraction of biomass in order to achieve a desired target of biogenic carbon, which provides the users of the engineered fuel feedstock a quantitative measure as they claim any renewable energy credits.

Yet another type of waste useful in the production of engineered fuel feedstock is sludge. Sludge is a mixture of solid wastes and bacteria removed from the wastewater at various stages of the treatment process. It can be categorized as "primary sludge" and "secondary sludge". Primary sludge is about 4% solids and 96% water. It consists of the material which settles out of wastewater in the primary sedimentation tanks, before bacterial digestion takes place. Secondary or activated sludge has much more liquid, i.e., about 1% solids and 99% water. Secondary sludge consists of bacteria and organic materials on which the bacteria feed. About 30% of the secondary sludge produced is returned to the aeration tanks to assist with the biological process of sewage treatment. The remaining 70% must be disposed of.

The sludge contemplated for use in the present invention is municipal sludge (also referred to as biosolids). Municipal sludge does not include paper mill or other industrial/agricultural sludge. The key determinants of the caloric or BTU value of a particular sludge are its dryness expressed as Total Solids or TS on a wet weight basis (or inversely as water content) and its volatile solids content (Total Volatile Solids or TVS expressed on a dry weight basis). There are two distinct types of sludge: 1) raw sludge (sludge treated only with primary and secondary aerobic clarifiers), and 2) digested sludge (add anaerobic digestion to number 1). Anaerobic sludge is typically 60% TVS and raw sludge is typically 75-80% TVS. The TS of sludge cake (dewatered sludge) varies depending on the method used by the treatment plant to dewater the sludge, and ranges from 10% to 97+%. One pound of Volatile Solids has about 10,000-12,000 BTU, e.g., it requires about 1,200 BTU to drive off one pound of water as steam.

Other types of materials useful in the production of engineered fuel feedstocks as described herein are animal wastes such as manures, animal biomass (meat and bone tissue), poultry litter, and fossil fuels such as coal, coal by products, petroleum coke, black liquor, and carbon black.

The engineered fuel feedstocks described herein comprise one or more sorbents. Virtually any type of sorbent or reagent that adsorbs, or reacts with, deleterious gases or other types of pollutants can be used in the engineered fuel feedstock. Both sodium-based sorbents as well as calcium-based sorbents are useful. Non-limiting examples of sodium-based sorbents include trisodium hydrogendicarbonate dihydrate (Trona), sodium sesquicarbonate, sodium bicarbonate, and sodium carbonate. Non-limiting examples of calcium-based sorbents include calcium carbonate ($CaCO_3$), lime (CaO), hydrated lime ($Ca(OH)_2$), calcium magnesium acetate ($CaMg_2(CH_3COO)_6$), dolomite ($CaCO_3.MgO$), and combinations thereof. These sorbents can be obtained from renewable sources, such as egg shells, or they can be obtained from non-renewable sources like mines. Reagents that reduce mercury levels during combustion include but are not limited to calcium bromide, ammonium bromide, sodium bromide, iodine-containing compounds, and chlorine-containing compounds. A reagent that reduces $NO_x$ levels during combustion is urea.

Further examples of sorbents useful in engineered fuel feedstocks includes, but are not limited to, zinc ferrite, zinc copper ferrite, zinc titanate, copper ferrite aluminate, copper aluminate, copper manganese oxide, nickel supported on alumina, zinc oxide, iron hydroxides, iron oxides (FeO, $Fe_2O_3$, $Fe_3O_4$), copper, copper (I) oxide, copper (II) oxide, nickel oxides, iron filings, Fe, silica, alumina, china clay, kaolinite, bauxite, emathlite, attapulgite, coal ash, egg shells, and Ca-montmorillonite, and combinations thereof.

In yet other embodiments, some waste materials which may be rich in one or more above mentioned elements, such as coal ash or wood ash, cement, iron filings, lime mud, can be used as sorbents. Specifically, coal ash has higher alumina silicates which have additional sorbent capabilities. In some embodiments, the sorbent is a combination of sorbents selected to control a single or multiple pollutants.

In some embodiments, the engineered fuel feedstock comprises about 80% fiber and about 20% plastics. In some embodiments, the plastic component is hard plastic, and in some embodiments, the plastic component is soft plastic. In some embodiments, the plastic component is a combination of both hard and soft plastics herein also referred to as mixed plastics. In some embodiments, the engineered fuel feedstock is comprises about 80% fiber and about 20% soft plastics.

In some embodiments of the invention, the engineered fuel feedstock comprises about 50% to about 95% fiber and about 5% to about 50% plastic, including all ranges and subranges therebetween. In some embodiments, the engineered fuel feedstock comprises: about 60% to about 80% fiber and about 20 to about 40% plastic; or about 70% to about 95% fiber and about 5 to about 30% plastic; or about 70% to about 80% fiber and about 20 to about 30% plastic; or about 75% to about 85% fiber to about 15 to about 25% plastic. In some embodiments the engineered fuel feedstock comprises: about 80% to about 95% fiber and about 5% to about 20% plastic; about 50% to about 60% fiber and about 40% to about 50% plastic; or about 60% to about 70% fiber and about 30% to about 40% plastic. In a particular embodiment of the invention, the engineered fuel feedstock is comprised of about 80% fiber and about 20% plastic. In a particular embodiment of the invention, the engineered fuel feedstock is comprised of about 85% fiber and about 15% plastic. In a particular embodiment of the invention, the engineered fuel feedstock is comprised of about 75% fiber and about 25% plastic. In a particular embodiment of the invention, the engineered fuel feedstock is comprised of about 70% fiber and about 30% plastic.

In a particular embodiment of the invention, the engineered fuel feedstock is comprised of about 50% to about 95% fiber and about 5% to about 50% soft plastic, including all ranges and subranges therebetween, e.g., about 50% to about 60% fiber and about 40% to about 50% soft plastic; about 60% to about 70% fiber and about 30% to about 40% soft plastic; about 70% to about 80% fiber and about 20% to about 30% soft plastic; about 80% to about 90% fiber and about 10% to about 20% soft plastic; and about 90% to about 95% fiber and about 5% to about 10% soft plastic. In a particular embodiment of the invention, the engineered fuel feedstock is comprised of about 80% fiber and about 20% soft plastic. In a particular embodiment of the invention, the engineered fuel feedstock is comprised of about 85% fiber and about 15% soft plastic. In a particular embodiment of the invention, the engineered fuel feedstock is comprised of about 75% fiber and about 25% soft plastic. In a particular embodiment of the invention, the engineered fuel feedstock is comprised of about 70% fiber and about 30% soft plastic.

In a particular embodiment of the invention, the engineered fuel feedstock is comprised of about 50% to about 95% fiber and about 5% to about 50% hard plastic, including all ranges and subranges therebetween, e.g., about 50% to about 60% fiber and about 40% to about 50% hard plastic; about 60% to about 70% fiber and about 30% to about 40% hard plastic; about 70% to about 80% fiber and about 20% to about 30% hard plastic; about 80% to about 90% fiber and about 10% to about 20% hard plastic; and about 90% to about 95% fiber and about 5% to about 10% hard plastic. In a particular embodiment of the invention, the engineered fuel feedstock is comprised of about 80% fiber and about 20% hard plastic. In a particular embodiment of the invention, the engineered fuel feedstock is comprised of about 85% fiber and about 15% hard plastic. In a particular embodiment of the invention, the engineered fuel feedstock is comprised of about 75% fiber and about 25% hard plastic. In a particular embodiment of the invention, the engineered fuel feedstock is comprised of about 70% fiber and about 30% hard plastic.

In a particular embodiment of the invention, the engineered fuel feedstock is comprised of about 50% to about 95% fiber and about 5% to about 50% mixed plastic, including all ranges and subranges therebetween, e.g., about 50% to about 60% fiber and about 40% to about 50% mixed plastic; about 60% to about 70% fiber and about 30% to about 40% mixed plastic; about 70% to about 80% fiber and about 20% to about 30% mixed plastic; about 80% to about 90% fiber and about 10% to about 20% mixed plastic; and about 90% to about 95% fiber and about 5% to about 10% mixed plastic. In a particular embodiment of the invention, the engineered fuel feedstock is comprised of about 80% fiber and about 20% mixed plastic. In a particular embodiment of the invention, the engineered fuel feedstock is comprised of about 85% fiber and about 15% mixed plastic. In a particular embodiment of the invention, the engineered fuel feedstock is comprised of about 75% fiber and about 25% mixed plastic. In a particular embodiment of the invention, the engineered fuel feedstock is comprised of about 70% fiber and about 30% mixed plastic.

Any of the foregoing embodiments of engineered fuel feedstocks comprising fiber and hard, fiber and soft, or fiber and mixed plastic, can be processed further to comprise one or more sorbents. In some embodiments, the engineered fuel feedstock can be processed further to comprise 2 or more sorbents. In some embodiments, the engineered fuel feedstock can be processed further to comprise three or more sorbents. In some embodiments, the engineered fuel feedstock can be processed further to comprise 4 sorbents.

Unless otherwise indicated, all values given for the composition of the engineered fuel feedstock (e.g., oxygen, carbon, and hydrogen content, ash content, volatile matter content, HHV) are after the addition of sorbent.

Accordingly, in one aspect, the present invention provides an engineered fuel feedstock, comprising one or more components derived from a processed MSW waste stream and one or more sorbents, the engineered fuel feedstock having a carbon content of between about 25% and about 59%, a hydrogen content of between about 3% and about 7%, a oxygen content of between about 9% and about 44%, and an ash content of between about 5% to about 25%. In some embodiments the ash content is less than 10%. In some embodiments, an engineered fuel feedstock as described herein has a HHV of between about 5,000 BTU/lb and about 14,500 BTU/lb. In some embodiments, the engineered fuel feedstock has a volatile matter content of about 75% to about 95%. In some embodiments, the engineered fuel feedstock has a moisture content of less than about 30%. In some embodiments, the engineered fuel feedstock has a moisture content of between about 10% and about 30%. In other embodiments, the engineered fuel feedstock has a moisture content of between about 10% and about 20%. In still further embodiments, the engineered fuel feedstock has a moisture content of about 1% and about 10%. The engineered fuel feedstock contains substantially no glass, metal, grit and noncombustible waste.

In any of the foregoing embodiments, the engineered fuel feedstock can have a carbon content of from about 25% to about 59%, inclusive of all ranges and subranges therebetween, e.g., from about 25% to about 30%, from about 30% to about 35%, from about 35% to about 40%, from about 40% to about 45%, from about 45% to about 50%, from about 50% to about 55%, from about 55% to about 59%, from about 25% to about 40%, from about 30% to about 45%, from about 35% to about 50%, and from about 40% to about 55%. In some embodiments, the carbon content is about 25%, about 28%, about 30%, about 34%, about 38%, about 42%, about 46%, about 51%, about 56%, or about 59%.

In any of the foregoing embodiments, the engineered fuel feedstock can have a hydrogen content of between about 3% and about 7%, inclusive of all ranges and subranges therebetween, e.g., between about 3% and about 4%, between about 4% and about 5%, between about 5% and about 6%, between about 6% and about 7%, between about 3% and about 5%, between about 4% and about 6%, and between about 5% and about 7%. In some embodiments, the hydrogen content is about 3%, 4%, 5%, 6%, or 7%.

In any of the foregoing embodiments, the engineered fuel feedstock can have an oxygen content of between about 9% and about 44%, inclusive of all ranges and subranges therebetween, e.g., between about 9% and about 20%, between about 20% and about 30%, between about 30% and about 40%, between about 40% and about 44%, between about 16% and about 40%, between about 18% and about 40%. In some embodiments, the oxygen content is about 9%, about 10%, about 11%, about 12%, about 14%, about 16%, about 18%, about 20%, about 22%, about 25%, about 28%, about 30%, about 33%, about 37%, about 41%, or about 44%.

In any of the foregoing embodiments, the engineered fuel feedstock can have a moisture content of less than about 10%, including less than about 9%, less than about 8%, less than about 7%, less than about 6%, less than about 5%, less than about 4%, less than about 3%, less than about 2%, and less than about 1%. In some embodiments, the engineered fuel feedstock has no detectable moisture content.

In any of the foregoing embodiments, the engineered fuel feedstock can have an ash content between about 5% and about 25%, inclusive of all ranges and subranges therebetween, e.g., between about 5% and about 20%, about 6% and about 15%, about 7% and about 10%. In some embodiments, the ash content is about 1%, about 2%, about 3%, about 5%, about 7%, about 9, or about 10%.

In any of the foregoing embodiments, the engineered fuel feedstock can have a HHV of between about 5,000 BTU/lb and about 14,500 BTU/lb, inclusive of all ranges and subranges therebetween, e.g., between about 5,000 BTU/lb and about 6,000 BTU/lb, between about 6,000 BTU/lb and about 7,000 BTU/lb, between about 7,000 BTU/lb and about 8,000 BTU/lb, between about 8,000 BTU/lb and about 9,000 BTU/lb, between about 9,000 BTU/lb and about 10,000 BTU/lb, and between about 10,000 BTU/lb and about 11,000 BTU/lb, between about 11,000 BTU/lb and about 12,000 BTU/lb, between about 12,000 BTU/lb and about 13,000 BTU/lb, between about 13,000 BTU/lb and about 14,500 BTU/lb, between about 5,000 BTU/lb and about 8,000 BTU/lb, between about 6,000 BTU/lb and about 9,000 BTU/lb, and between about 7,000 BTU/lb and about 10,000 BTU/lb, between about 8,000 BTU/lb and about 11,000 BTU/lb. In some embodiments, the engineered fuel feedstock can have a HHV of about 5,000 BTU/lb, about 6,000 BTU/lb, about 7,000 BTU/lb, about 8,000 BTU/lb, about 9,000 BTU/lb, about 10,000 BTU/lb, about 11,000 BTU/lb, about 12,000 BTU/lb, about 13,000 BTU/lb, or about 14,000 BTU/lb.

In some embodiments, the engineered fuel feedstock has a volatile matter content of about 75% to about 95%, inclusive of all ranges and subranges therebetween, e.g., about 75% to about 80%, about 80% to about 90%, about 90% to about 95%.

In any of the foregoing embodiments, the engineered fuel feedstock can have a ratio of H/C from about 0.07 to about 0.21; inclusive of all ranges and subranges therebetween, e.g., from about 0.07 to about 0.09; from about 0.09 to about 0.11, about from about 0.11 to about 0.13; from about 0.13 to about 0.15, from about 0.15 to about 0.17, about from about 0.17 to about 0.19; from about 0.19 to about 0.21. In some embodiments, the engineered fuel feedstock can have a ratio of H/C of about 0.07, about 0.08, about 0.09, about 0.10, about 0.11 about 0.12, about 0.13, about 0.14, about 0.15, about 0.16, about 0.17, about 0.18, about 0.19, about 0.20; or about 0.21.

In any of the foregoing embodiments, the engineered fuel feedstock can have an O/C ratio from about 0.2 to about 1.52 inclusive of all ranges and subranges therebetween, e.g., from about 0.2 to about 0.3; from about 0.3 to about 0.4; from about 0.4 to about 0.5; from about 0.5 to about 0.6; from about 0.6 to about 0.7; from about 0.7 to about 0.8, from about 0.9 to about 1.0; from about 1.0 to about 1.1; from about 1.1 to about 1.2; from about 1.3 to about 1.4; from about 1.4 to about 1.5; from about 0.2 to about 0.8, from about 0.3 to about 1.0, from about 0.3 to about 1.3, from about 0.3 to about 1.4, from about 0.4 to about 1.3, or from about 0.4 to about 1.5. In some embodiments, the engineered fuel feedstock can have an O/C ratio of about 0.3, about 0.4, about 0.5, about 0.6, about 0.7, about 0.8, about 0.9, or about 1.0.

In some embodiments, the sorbent is in an amount of between about 0.1% (weight sorbent/weight engineered fuel feedstock and sorbent) (w/w) and 50% (w/w), inclusive of all ranges and subranges therebetween, e.g. between about 1% (w/w) and about 10% (w/w), about 1% (w/w) and about 20% (w/w), about 1% (w/w) and about 30% (w/w), about 1% (w/w) and about 40% (w/w), about 10% (w/w) and about 20% (w/w), about 10% (w/w) and about 30% (w/w), about 10% (w/w) and about 40% (w/w), about 10% (w/w) and about 50% (w/w), about 20% (w/w) and about 30% (w/w), about 20% (w/w) and about 40% (w/w), about 20% (w/w) and about 50% (w/w), about 30% (w/w) and about 40% (w/w), about 30% (w/w) and about 50% (w/w), or about 40% (w/w) and about 50% (w/w). In certain embodiments the sorbent is present at about 5% (w/w), about 10% (w/w), about 15% (w/w), about 20% (w/w), about 25% (w/w), about 30% (w/w), about 35% (w/w), about 40% (w/w), about 45% (w/w), or about 50% (w/w).

In some embodiments, the sorbent is in an amount that is determined by stoichiometry requirements for specific chemical reactions, based on which sulfur or chlorine derived pollutant is removed. In some embodiments, the sorbent is in an amount that is stoichiometrically about 10% to about 500% greater than the amount of sulfur or chlorine derived pollutant to be removed, inclusive of all ranges and subranges therebetween, e.g., between about 10% to about 100% greater, about 100% to about 200% greater, or about 200% to about 300% greater, or about 300% to about 400% greater, or about 400% to about 500% greater. In some embodiments, the sorbent is in an amount that about 500 to about 2000 times greater than the mercury derived pollutant to be removed, inclusive of all ranges and subranges therebetween, e.g., between about 500 to about 1000 times greater, about 1000 to about 1500 times greater, or about 1500 to about 2000 times greater. In some embodiments, the sorbent is in an amount that is stoichiometrically about 10% to about 500% greater than the amount of other pollutants to be removed, inclusive of all ranges and subranges therebetween, e.g., between about 10% to about 100% greater, about 100% to about 200% greater, or about 200% to about 300% greater, or about 300% to about 400% greater, or about 400% to about 500% greater. In further embodiments, two or more sorbents can be added with each other in an amount as described above.

In certain embodiments, the engineered fuel feedstock comprises about 52% fiber, about 13% soft plastics, about 8.5% calcium hydroxide, about 23% sodium bicarbonate, about 0.13% calcium bromide, and about 2.3% urea. In some embodiments, the engineered fuel feedstock after addition of the sorbent has a carbon content of about 34%. In some embodiments, the engineered fuel feedstock after addition of the sorbent has a hydrogen content of about 4.5%. In some embodiments, the engineered fuel feedstock after addition of the sorbent has a oxygen content of between about 27%. In some embodiments, the engineered fuel feedstock after addition of the sorbent has a ratio of H/C of about 0.12. In some embodiments, the engineered fuel feedstock after addition of the sorbent has a ratio of O/C of about 0.68. In some embodiments, the engineered fuel feedstock after addition of the sorbent has an ash content of about 50%. In some embodiments, the engineered fuel feedstock after addition of the sorbent has an moisture content of about 5%. In some embodiments, the engineered fuel feedstock after addition of the sorbent has a HHV of about 6,118 BTU/lb.

In some embodiments, the engineered fuel feedstock and sorbent comprises about 51% fiber, about 13% soft plastics, about 8.2% calcium hydroxide, about 26% sodium bicarbonate, about 0.12% calcium bromide, and about 2.2% urea. In some embodiments, the engineered fuel feedstock after addition of the sorbent has a carbon content of about 33%. In some embodiments, the engineered fuel feedstock after addition of the sorbent has a hydrogen content of about 4%. In some embodiments, the engineered fuel feedstock after addition of the sorbent has a oxygen content of between about 26%. In some embodiments, the engineered fuel feedstock after addition of the sorbent has a ratio of H/C of about 0.12. In some embodiments, the engineered fuel feedstock after addition of the sorbent has a ratio of O/C of about 0.7. In some embodiments, the engineered fuel feedstock after addition of the sorbent has an ash content of about 52%. In some embodiments, the engineered fuel feedstock after addition of the sorbent has an moisture content of about 5%. In some embodiments, the engineered fuel feedstock after addition of the sorbent has a HHV of about 5,895 BTU/lb.

In some embodiments, the engineered fuel feedstock and sorbent comprises about 52% fiber, about 13% soft plastics, about 10% calcium hydroxide, about 23% sodium bicarbonate, about 0.13% calcium bromide, and about 2.2% urea. In some embodiments, the engineered fuel feedstock after addition of the sorbent has a carbon content of about 33%. In some embodiments, the engineered fuel feedstock after addition of the sorbent has a hydrogen content of about 4%. In some embodiments, the engineered fuel feedstock after addition of the sorbent has a oxygen content of between about 27%. In some embodiments, the engineered fuel feedstock after addition of the sorbent has a ratio of H/C of about 0.12. In some embodiments, the engineered fuel feedstock after addition of the sorbent has a ratio of O/C of about 0.7. In some embodiments, the engineered fuel feedstock after addition of the sorbent has an ash content of about 51%. In some embodiments, the engineered fuel feedstock after addition of the sorbent has an moisture content of about 5%. In some embodiments, the engineered fuel feedstock after addition of the sorbent has a HHV of about 6,000 BTU/lb.

In some embodiments, the engineered fuel feedstock and sorbent comprises about 50% fiber, about 12% soft plastics, about 6.4% calcium hydroxide, about 29% sodium bicarbonate, about 0.12% calcium bromide, and about 2.1% urea. In some embodiments, the engineered fuel feedstock after addition of the sorbent has a carbon content of about 32.%. In some embodiments, the engineered fuel feedstock after addition of the sorbent has a hydrogen content of about 4.23%. In some embodiments, the engineered fuel feedstock after addition of the sorbent has a oxygen content of between about 26%. In some embodiments, the engineered fuel feedstock after addition of the sorbent has a ratio of H/C of about 0.12. In some embodiments, the engineered fuel feedstock after addition of the sorbent has a ratio of O/C of about 0.7. In some embodiments, the engineered fuel feedstock after addition of the sorbent has an ash content of about 52%. In some embodiments, the engineered fuel feedstock after addition of the sorbent has an moisture content of about 5%. In some embodiments, the engineered fuel feedstock after addition of the sorbent has a HHV of about 5,780 BTU/lb.

In some embodiments, the engineered fuel feedstock comprises about 80% fiber, about 10% soft plastics, about 10% hard plastics, about 7% calcium hydroxide, about 23% sodium bicarbonate, about 0.06% calcium bromide, and about 1.4% urea. In some embodiments, the engineered fuel feedstock after addition of the sorbent has a carbon content of about 39%. In some embodiments, the engineered fuel feedstock after addition of the sorbent has a hydrogen content of about 5%. In some embodiments, the engineered fuel feedstock after addition of the sorbent has a oxygen content of between about 30%. In some embodiments, the engineered fuel feedstock after addition of the sorbent has a ratio of H/C of about 0.13. In some embodiments, the engineered fuel feedstock after addition of the sorbent has a ratio of O/C of about 0.8. In some embodiments, the engineered fuel feedstock after addition of the sorbent has an ash content of about 25%. In some embodiments, the engineered fuel feedstock after addition of the sorbent has an moisture content of about 2.62%. In some embodiments, the engineered fuel feedstock after addition of the sorbent has a HHV of about 6,600 BTU/lb.

In one embodiment, the engineered fuel feedstock comprises about 52% fiber, about 13% soft plastics, about 8.5% calcium hydroxide, about 23% sodium bicarbonate, about 0.13% calcium bromide, and about 2.3% urea, a carbon content of about 34%, a hydrogen content of about 4.5%, a oxygen content of about 27%, a ratio of H/C of about 0.12, a ratio of O/C of about 0.69, an ash content of about 50%, a moisture content of about 5%, and a HHV of about 6,000 BTU/lb.

In one embodiments, the engineered fuel feedstock comprises about 50% fiber, about 12.7% soft plastics, about 8.2% calcium hydroxide, about 26.1% sodium bicarbonate, about 0.12% calcium bromide, about 2.2% urea, a carbon content of about 33%, a hydrogen content of about 4.31%, a oxygen content of about 26%, a ratio of H/C of about 0.119, a ratio of O/C of about 0.69 an ash content of about 51%, a moisture content of about 5%, an HHV of about 5,895 BTU/lb.

In some embodiments, the engineered fuel feedstock and sorbent comprises about 52% fiber, about 13% soft plastics, about 10.1% calcium hydroxide, about 23% sodium bicarbonate, about 0.13% calcium bromide, about 2.2% urea, a carbon content of about 33%, a hydrogen content of about 4.4%, a oxygen content of about 27%, a ratio of H/C of about 0.119, a ratio of O/C of about 0.69, an ash content of about 51%, a moisture content of about 5%, and a HHV of about 6,011 BTU/lb.

In some embodiments, the engineered fuel feedstock and sorbent comprises about 50% fiber, about 12% soft plastics, about 6.4% calcium hydroxide, about 29% sodium bicarbonate, about 0.12% calcium bromide, about 2.1% urea, a carbon content of about 32%, a hydrogen content of about 4.2%, an oxygen content of about 26%, a ratio of H/C of about 0.119, a ratio of O/C of about 0.69, an ash content of about 52%, a moisture content of about 5%, and a HHV of about 5,780 BTU/lb.

Table 1 below summarizes the compositions of multiple examples of the engineered fuel feedstocks containing sorbent. A minimum value and maximum are provided to form a range of values for each of the properties of the given engineered fuel. By way of example, Ex. 03 has a fiber content of about 53%, a plastic content of about 13%, and a sorbent content of about 34%. Based on the composition of Ex. 03, the carbon content is about 27% to about 44%, the hydrogen content is about 3.2% to about 5.3%, the oxygen content is about 16% to about 34%, the hydrogen to carbon ratio is about 0.07 to about 0.19, and oxygen to carbon ratio is about 0.36 to about 1.26, the ash content from the fiber and plastic components is about 6% to about 26%, and a high heating value is about 5,000 BTU's per pound to about 7,400 BTU's per pound. Note the ash content listed in the table does not include any contribution from the sorbent portion of the engineered fuel. Depending on the exact sorbent used, the sorbent itself could have an ash content of 60% to 95%.

TABLE 1

Range of Properties of Engineered Fuels Feedstocks

|  |  | Fiber, wt % | Plastic, wt % | Sorbent, wt % |  | Carbon, wt % | Hydrogen, wt % | Oxygen, wt % | H/C | O/C | Ash (Fiber and Plastic), wt % | HHV, BTU/lb |
|---|---|---|---|---|---|---|---|---|---|---|---|---|
| Ex. 03 |  | 53 | 13 | 34 | Min | 27 | 3.2 | 16 | 0.07 | 0.36 | 6 | 5,000 |
|  |  |  |  |  | Max | 44 | 5.3 | 34 | 0.19 | 1.26 | 26 | 7,400 |
| Ex. 04 |  | 51 | 13 | 36 | Min | 26 | 3.0 | 15 | 0.07 | 0.36 | 6 | 5,000 |
|  |  |  |  |  | Max | 42 | 5.1 | 33 | 0.20 | 1.27 | 25 | 7,100 |
| Ex. 05 |  | 52 | 13 | 35 | Min | 27 | 3.1 | 16 | 0.07 | 0.37 | 6 | 5,000 |
|  |  |  |  |  | Max | 43 | 5.2 | 34 | 0.19 | 1.26 | 26 | 7,200 |
| Ex. 06 |  | 50 | 13 | 37 | Min | 25 | 3.0 | 15 | 0.07 | 0.37 | 6 | 5,000 |
|  |  |  |  |  | Max | 41 | 5.0 | 33 | 0.20 | 1.32 | 25 | 7,000 |
| Ex. 07 |  | 60 | 15 | 25 | Min | 31 | 3.6 | 18 | 0.07 | 0.36 | 6 | 5,600 |
|  |  |  |  |  | Max | 50 | 6.0 | 39 | 0.19 | 1.26 | 29 | 7,000 |

Table 2 below summarizes the compositions of multiple examples of the engineered fuel feedstocks containing sorbents. Provided is the average value for each of the properties of the given engineered fuel. By way of example, Ex. 03 has a fiber content of about 53%, a plastic content of about 13%, and a sorbent content of about 34%. Based on the composition of Ex. 03, the carbon content is about 34%, the hydrogen content is about 4.5%, the oxygen content is about 27%, the hydrogen to carbon ratio is about 0.12, and oxygen to carbon ratio is about 0.69, the ash content from the fiber and plastic components is about 16%, and a high heating value is about 6,100 BTU's per pound.

TABLE 2

Average Properties of Engineered Fuel Feedstocks

| | Fiber, wt % | Plastic, wt % | Sorbent, wt % | Carbon, wt % | Hydrogen, wt % | Oxygen, wt % | H/C | O/C | Ash (Fiber and Plastic), wt % | HHV, BTU/lb |
|---|---|---|---|---|---|---|---|---|---|---|
| Ex. 03 | 52 | 13 | 34 | 34 | 4.5 | 27 | 0.12 | 0.69 | 16 | 6,100 |
| Ex. 04 | 51 | 13 | 37 | 33 | 4.3 | 26 | 0.12 | 0.69 | 15 | 5,900 |
| Ex. 05 | 52 | 13 | 35 | 33 | 4.4 | 27 | 0.12 | 0.69 | 16 | 6,000 |
| Ex. 06 | 50 | 12 | 38 | 32 | 4.2 | 26 | 0.12 | 0.69 | 14 | 5,800 |
| Ex. 07 | 60 | 15 | 25 | 39 | 5.1 | 31 | 0.13 | 0.79 | 16 | 7,000 |

Other engineered fuel feedstocks can be made by the methods described herein and can have the following range of properties as summarized in Table 3 below. A minimum value and maximum are provided to form a range of values for each of the properties of the given engineered fuel feedstocks. By way of example, Ex. 10 can have a fiber content of about 30%, a plastic content of about 30%, and a sorbent content of about 40%. Based on the composition of Ex. 03, the carbon content can be about 30% to about 46%, the hydrogen content can be about 3.2% to about 6.2%, the oxygen content can be about 9% to about 25%, the hydrogen to carbon ratio can be about 0.07 to about 0.21, and oxygen to carbon ratio can be about 0.20 to about 0.83, the ash content from the fiber and plastic components can be about 3% to about 18%, and a high heating value can be about 5,900 BTU's per pound to about 8,700 BTU's per pound. Note the ash content listed in the table does not include any contribution from the sorbent portion of the engineered fuel. Depending on the exact sorbent used, the sorbent itself could have an ash content of 60% to 95%.

TABLE 3

Possible Range of Properties of Engineered Fuel Feedstocks

| | Fiber, wt % | Plastic, wt % | Sorbent, wt % | | Carbon, wt % | Hydrogen, wt % | Oxygen, wt % | H/C | O/C | Ash (Fiber and Plastic), wt % | HHV, BTU/lb |
|---|---|---|---|---|---|---|---|---|---|---|---|
| Ex. 10 | 30 | 30 | 40 | Min | 30 | 3.2 | 9 | 0.07 | 0.20 | 3 | 5,900 |
| | | | | Max | 46 | 6.2 | 25 | 0.21 | 0.83 | 18 | 8,700 |
| Ex. 11 | 41 | 19 | 40 | Min | 27 | 3.0 | 12 | 0.07 | 0.29 | 4 | 5,000 |
| | | | | Max | 42 | 5.3 | 29 | 0.20 | 1.07 | 21 | 7,500 |
| Ex. 12 | 31 | 31 | 38 | Min | 31 | 3.3 | 9 | 0.07 | 0.20 | 11 | 6,000 |
| | | | | Max | 47 | 6.4 | 25 | 0.21 | 0.81 | 19 | 9,000 |
| Ex. 13 | 44 | 18 | 38 | Min | 27 | 3.1 | 13 | 0.07 | 0.30 | 4 | 5,100 |
| | | | | Max | 43 | 5.4 | 30 | 0.20 | 1.11 | 23 | 7,600 |
| Ex. 14 | 33 | 33 | 34 | Min | 33 | 3.5 | 10 | 0.07 | 0.20 | 3 | 6,400 |
| | | | | Max | 51 | 6.8 | 27 | 0.21 | 0.82 | 20 | 9,600 |
| Ex. 15 | 52 | 14 | 34 | Min | 27 | 3.2 | 16 | 0.07 | 0.36 | 26 | 5,000 |
| | | | | Max | 44 | 5.3 | 34 | 0.20 | 1.26 | 16 | 7,500 |
| Ex. 16 | 35 | 35 | 30 | Min | 35 | 3.7 | 11 | 0.07 | 0.20 | 4 | 6,800 |
| | | | | Max | 54 | 7.2 | 29 | 0.21 | 0.83 | 21 | 10,200 |
| Ex. 17 | 59 | 11 | 30 | Min | 28 | 3.3 | 18 | 0.07 | 0.39 | 6 | 5,000 |
| | | | | Max | 46 | 5.4 | 38 | 0.19 | 1.36 | 28 | 7,500 |
| Ex. 18 | 37 | 37 | 26 | Min | 37 | 3.9 | 11 | 0.07 | 0.19 | 4 | 7,200 |
| | | | | Max | 57 | 7.6 | 30 | 0.21 | 0.81 | 22 | 10,700 |
| Ex. 19 | 60 | 14 | 26 | Min | 30 | 3.5 | 18 | 0.07 | 0.37 | 6 | 5,500 |
| | | | | Max | 49 | 5.9 | 39 | 0.20 | 1.30 | 29 | 8,200 |
| Ex. 20 | 38 | 38 | 23 | Min | 39 | 4.0 | 12 | 0.07 | 0.20 | 4 | 7,500 |
| | | | | Max | 59 | 7.9 | 32 | 0.20 | 0.82 | 23 | 11,200 |
| Ex. 21 | 71 | 6 | 23 | Min | 29 | 3.6 | 21 | 0.07 | 0.44 | 7 | 5,100 |
| | | | | Max | 48 | 5.5 | 44 | 0.19 | 1.52 | 33 | 7,600 |

Certain engineered fuel feedstocks that include sorbent can be made by the methods described herein and can have the following average properties as summarized in Table 4 below. Provided is the average value for each of the properties of the given engineered fuel feedstocks. By way of example, Ex. 10 can have a fiber content of about 30%, a plastic content of about 30%, and a sorbent content of about 40%. Based on the composition of Ex. 10, the carbon content can be about 37%, the hydrogen content can be about 4.8%, the oxygen content can be about 77%, the hydrogen to carbon ratio can be about 0.13, and oxygen to carbon ratio can be about 0.42, the ash content from the fiber and plastic components can be about 11%, and a high heating value can be about 6,100 BTU's per pound.

TABLE 4

Average Properties of Engineered Fuels

| | Fiber, wt % | Plastic, wt % | Sorbent, wt % | Carbon, wt % | Hydrogen, wt % | Oxygen, wt % | H/C | O/C | Ash (Fiber and Plastic), wt % | HHV, BTU/lb |
|---|---|---|---|---|---|---|---|---|---|---|
| Ex. 10 | 30 | 30 | 40 | 37 | 4.8 | 17 | 0.13 | 0.42 | 11 | 7,200 |
| Ex. 11 | 54 | 6 | 40 | 29 | 3.8 | 27 | 0.13 | 0.80 | 16 | 5,000 |
| Ex. 12 | 31 | 31 | 38 | 38 | 4.9 | 17 | 0.13 | 0.42 | 11 | 7,400 |
| Ex. 13 | 56 | 6 | 38 | 30 | 4.0 | 28 | 0.13 | 0.80 | 16 | 5,200 |
| Ex. 14 | 33 | 33 | 34 | 41 | 5.3 | 18 | 0.13 | 0.42 | 12 | 7,900 |
| Ex. 15 | 63 | 3 | 34 | 31 | 4.1 | 32 | 0.13 | 0.86 | 17 | 5,200 |
| Ex. 16 | 35 | 35 | 30 | 43 | 5.6 | 20 | 0.13 | 0.42 | 12 | 8,400 |
| Ex. 17 | 67 | 4 | 30 | 33 | 4.4 | 34 | 0.13 | 0.86 | 18 | 5,600 |
| Ex. 18 | 37 | 37 | 25 | 46 | 6.0 | 21 | 0.13 | 0.42 | 13 | 8,900 |
| Ex. 19 | 60 | 15 | 26 | 38 | 5.1 | 31 | 0.13 | 0.67 | 17 | 6,900 |
| Ex. 20 | 38 | 38 | 23 | 47 | 6.1 | 21 | 0.13 | 0.42 | 14 | 9,200 |
| Ex. 21 | 46 | 31 | 23 | 45 | 5.8 | 25 | 0.13 | 0.50 | 15 | 8,500 |

In some embodiments, the engineered fuel feedstock when combusted produces less harmful emissions as compared to the combustion of coal. In some embodiments, the engineered fuel feedstock when combusted produces less sulfur emissions as compared to the combustion of coal. In some embodiments, the engineered fuel feedstock when combusted produces less nitrogen emissions as compared to the combustion of coal. In some embodiments, the engineered fuel feedstock when combusted produces less mercury emission as compared to the combustion of coal. In some embodiments, the engineered fuel feedstock when combusted produces less HCl emission as compared to the combustion of coal. In some embodiments, the engineered fuel feedstock is designed to avoid the emission of, $SO_x$, $NO_x$, CO, $CO_2$, and halogen gases.

In some embodiments, the engineered fuel feedstock is designed to have reduced emission profiles with respect to greenhouse gases (GHGs) as compared to the GHGs emitted from the combustion of coal. In some embodiments, the engineered fuel feedstock is designed to have reduced emission profiles with respect to GHGs emitted from the combustion of biomasses such as for example, wood, switch grass and the like.

In some embodiments, the engineered fuel feedstock is in a loose, non-densified form. In other embodiments, the engineered fuel feedstock is in a densified form. In some embodiments, the densified form is a cube. In some embodiments, the densified form is rectangular. In other embodiments, the densified form is cylindrical. In some embodiments, the densified form is spherical. In some embodiments, the densified form is a briquette. In other embodiments, the densified form is a pellet. In some embodiments, the densified form is a honeycomb. In some embodiments, the densified fuel is sliced into sheets of different thickness. In some embodiments, the thickness is between about 3/16 inches to about 3/4 inches.

In other embodiments, the present engineered fuel feedstock may be ground or pulverized to provide a distribution of particle sizes such that at least 50% of the engineered fuel feedstock particles pass through a 3 mm screen. In some embodiments, the engineered fuel feedstock is ground or pulverized such that at least 90% of the particles pass through a 1 mm screen. In certain embodiments, the engineered fuel feedstock may have a normal particle size distribution, with an average particle size of from about 700 µm to about 800 µm.

In some embodiments, the engineered fuel feedstock is rendered inert. In some embodiments, the engineered fuel feedstock comprises at least one additive that renders the engineered fuel feedstock inert. In some embodiments, an additive can be blended into the processed MSW waste stream that can render the resulting pellet inert. Some types of wet MSW contain a relatively high number of viable bacterial cells that can generate heat and hydrogen gas during fermentation under wet conditions, for example during prolonged storage or transportation. An additive such as calcium hydroxide can be added to the MSW for the prevention of the rotting of food wastes and for the acceleration of drying of solid wastes. In some embodiments, the additive that renders the engineered fuel feedstock inert is CaO. Other non limiting examples of additives are calcium sulfoaluminate and other sulfate compounds, as long as they do not interfere with the downstream processes in which the engineered fuel feedstock is used.

Alternatively, the MSW can be rendered biologically inert through any known method for inactivating biological material. For example, X-rays can be used to deactivate the MSW before processing, or after processing. Drying can be used to remove the water necessary for organisms such as microbes to grow. Treatment of the MSW with high heat and optionally also under pressure (e.g. autoclaving) can also render the MSW biologically inert. In one embodiment, the excess heat generated by the reciprocating engines or turbines fueled by the engineered pellets can be redirected through the system and used to render the MSW inert. In other embodiments, the engineered fuel feedstock is rendered inert through means such as microwave radiation.

Methods of Making Engineered Fuel Feedstocks

The engineered fuel feedstock described herein comprises one or more components derived from a processed MSW waste stream and sorbent and can be made by any process known to those of skill in the art. In particular, the processes described in U.S. patent application Ser. No. 12/492,096, the contents of which are incorporated herein by reference in its entirety, can be used to make a variety of engineered fuel feedstocks that do not contain a sorbent. U.S. patent application Ser. No. 12/492,096 describes engineered fuel feedstocks having less than 2% sulfur and less than 1% chlorine, more preferably less than 1.68% sulfur and 0.5% chlorine. In the present invention, amounts of sulfur and chlorine may be higher in the engineered fuel feedstock than those described in U.S. patent application Ser. No. 12/492,096 due to the presence of the sorbent which counteracts the production of sulfur and chlorine pollutants during combustion.

The engineered fuel feedstocks described herein are made from MSW components, including fibers, such as paper, cardboard, magazines, and plastics, using procedures described in U.S. patent application Ser. No. 12/492,096. Sorbents can be added to the engineered fuel feedstocks during any suitable processing stage. For example, one or more sorbents can be added to one or more MSW components to produce a sorbent-MSW component, which can then be further processed with additional MSW components, additional sorbent-MSW components, or sorbents. In certain embodiments, sorbents can be mixed with granulated plastic (hard plastic, soft plastic, or mixed plastic) and pelletized in a pelletizer. After cooling, the plastic-sorbent pellet is pulverized to produce sorbent-plastic components. These sorbent-plastic components are then mixed with a fiber-based component and in some cases additional plastic-based components. This mixture can be then pelletized, granulated and pulverized to produce the final engineered fuel feedstock. In some cases when a low weight percentage sorbent is used it can be added in solution form or dry form to the MSW component.

The MSW can be processed by any method that allows for identification and separation of the component parts according to material type, such as by plastics, fibers, textiles, paper in all its forms, cardboard, rubber, yard waste, food waste, and leather. Methods of separation such as those disclosed in U.S. Pat. No. 7,431,156 and U.S. Patent Application Publication Nos. 2006/0254957, 2008/0290006, and 2008/0237093, the disclosures of which are incorporated herein by reference in their entirety, can be used for separating the components of waste.

The MSW can also be processed by any method that allows for identification and separation of the component parts according to their chemical or molecular characterisitcs, and sorted and stored broadly into two, three, four or five classes. Methods of separation such as those disclosed in U.S. Patent Application Publication No. 2010/0018113, the disclosure of which is hereby incorporated herein by reference in their entirety, can be used for separating the components of waste.

In some embodiments, the component or components of the engineered fuel feedstock are mixed. In some of the embodiments, the mixed components are reduced in size using known techniques such as shredding, grinding, crumbling and the like. Methods for the reduction in size of MSW components is well known and for example are described in U.S. Pat. No. 5,888,256, the disclosure of which is incorporated herein by reference in its entirety. In other embodiments, the individual components are first reduced in size prior to mixing with other components. In some embodiments, the mixed components of the engineered fuel feedstock are densified using known densification methods such as, for example, those described in U.S. Pat. No. 5,916,826, the disclosure of which is incorporated herein by reference in its entirety. In some embodiments, the densification forms pellets by the use of a pelletizer, such as a Pasadena hand press, capable of exerting up to 40,000 force-pounds. In some other embodiments, the densification can be in other forms including briquettes, cubes, rectangular-shaped, cylindrical-shaped, spherical-shaped, honeycomb or sliced into sheets of different thickness. One of ordinary skill would recognize that this list is for illustrative purposes and other densification shapes are possible and contemplated within the scope of this invention.

In some embodiments, the engineered fuel feedstock described herein is biologically, chemically and toxicologically inert. The terms biologically inert, chemically inert, and toxicologically inert mean that the engineered fuel feedstock described herein does not exceed the EPA's limits for acceptable limits on biological, chemical and toxicological agents contained within the engineered fuel feedstock. The terms also include the meaning that the engineered fuel feedstock does not release toxic products after production or upon prolonged storage. The engineered fuel feedstock does not contain, for example pathogens or live organisms, nor contain the conditions that would promote the growth of organisms after production or upon prolonged storage. For example, the engineered fuel feedstock in any form described herein can be designed so as to have a moisture content sufficient so as not to promote growth of organisms. The engineered fuel feedstock can be designed to be anti-absorbent, meaning it will not absorb water to any appreciable amount after production and upon prolonged storage. The engineered fuel feedstock is also air stable, meaning it will not decompose in the presence of air to give off appreciable amounts of volatile organic compounds. The engineered fuel feedstock described herein may be tested according to known methods in order to determine whether they meet the limits allowed for the definition of inert. For example, 40 CFR Parts 239 through 259 promulgated under Title 40—Protection of the Environment, contains all of the EPA's regulations governing the regulations for solid waste. The EPA publication SW-846, entitled Test Methods for Evaluating Solid Waste, Physical/Chemical Methods, is OSW's official compendium of analytical and sampling methods that have been evaluated and approved for use in complying with 40 CFR Parts 239 through 259, in relation to solid waste, which is incorporated herein by reference in its entirety.

In additional embodiments of the invention, an engineered fuel feedstock having the molecular characteristics of any of the engineered fuel feedstock described herein, and which comprises about 1 to about 50% (w/w) sorbent is produced by a process comprising: a) receiving a plurality of MSW waste feeds at a material recovery facility; b) inventorying the components of the plurality of MSW waste feeds of step a) as they pass through a material recovery facility based on the chemical or molecular characteristics of the components; c) comparing the chemical or molecular characteristics of the components of the plurality of MSW waste feeds inventoried in step b) with the chemical or molecular characteristics of the engineered fuel feedstock; d) adding a sorbent; e) optionally adding additional engineered fuel feedstock components which contain chemical or molecular characteristics, whose sum together with the inventoried components of step b) equal the chemical or molecular characteristics of the engineered fuel feedstock.

In further embodiments of the invention, an engineered fuel feedstock is produced by a process comprising: a) separating a plurality of MSW waste feeds at a material recovery facility into a plurality of MSW waste components based on chemical or molecular characteristics; b) selecting chemical or molecular characteristics for an engineered fuel feedstock having the molecular characteristics of any of the engineered fuel feedstock described herein; c) selecting MSW waste components from step a) whose sum of chemical or molecular characteristics equals the chemical or molecular characteristics selected in step b); d) optionally adding other fuel components to the selections of step c) if the chemical or molecular characteristics of the MSW waste components selected in step c) do not equal the chemical or molecular characteristics of the selection of step b); e) selecting an amount and type of sorbent; and f) mixing the components of steps c) and e), and optionally of step d).

In some embodiments, the size of the mixture of step f) is reduced to help homogenize the engineered fuel feedstock.

In some embodiments, a size and shape is determined for a densified form of the mixture of step f) or the size-reduced mixture of step e). In some embodiments, the mixture of step f) is densified. In other embodiments, the size-reduced mixture of step f) is densified.

In still other embodiments of the invention, an engineered fuel feedstock is described that is produced by a process comprising: a) separating a plurality of MSW waste feeds at a material recovery facility into a plurality of MSW waste components based on chemical or molecular characteristics; b) selecting chemical or molecular characteristics for an engineered fuel feedstock having a carbon content of between about 50% to about 90%, a hydrogen content of between about 2.5% and about 7%, an oxygen content between about 2.5% to about 40%, and an ash content of less than 10%, or an engineered fuel feedstock having the molecular characteristics of any of the engineered fuel feedstock described herein; c) selecting MSW waste components from step a) whose sum of chemical or molecular characteristics equals the chemical or molecular characteristics selected in step b); d) optionally adding other fuel components to the selections of step c) if the chemical or molecular characteristics of the MSW waste components selected in step c) do not equal the chemical or molecular characteristics of the selection of step b); e) selecting an amount and type of sorbent; and f) mixing the components of steps c) and e), and optionally of step d).

In some embodiments, the size of the mixture of step f) is reduced to help homogenize the engineered fuel feedstock. In some embodiments, a size and shape is determined for a densified form of the mixture of step f) or the size-reduced mixture of step e). In some embodiments, the mixture of step f) is densified. In other embodiments, the size-reduced mixture of step f) is densified.

In another aspect, a method of producing an engineered fuel feedstock from a processed MSW waste stream is described which comprises the steps of: a) selecting a plurality components from a processed MSW waste stream which components in combination have chemical or molecular characteristics comprising the molecular characteristics of any of the engineered fuel feedstock described herein; b) combining and mixing together the selected components of step a) to form a engineered fuel feedstock; c) comparing the resulting chemical or molecular characteristics of the engineered fuel feedstock of step b) with the chemical or molecular characteristics of step a); d) optionally adding other fuel components to the selected components of step b) if the chemical or molecular characteristics of the MSW waste components selected in step b) do not equal the chemical or molecular characteristics of step a); and e) selecting and adding a sorbent.

In some embodiments, the size of the mixture of step b) or step d) is reduced to help homogenize the engineered fuel feedstock engineered fuel feedstock. In some embodiments, a size and shape is determined for a densified form of the mixture of step b) or the size-reduced mixtures of steps b) or d). In other embodiments, the size-reduced mixture of step e) is densified to a density of about 10 lbs/ft$^3$ to about 75 lbs/ft$^3$.

In another aspect, a method of producing a engineered fuel feedstock is described, the method comprising: a) receiving a plurality of MSW waste streams; b) selecting for the engineered fuel feedstock chemical or molecular characteristics of any of the engineered fuel feedstock described herein; c) inventorying the components of the plurality of MSW waste streams based on the chemical or molecular characteristics of the components; d) comparing the chemical or molecular characteristics of the inventoried components of the plurality of MSW waste streams of step c) with the selected chemical or molecular characteristics of step b); e) optionally adding additional fuel components with the required chemical or molecular characteristics to inventoried components of step c) to meet the desired chemical or molecular characteristics of step b) for the engineered fuel feedstock; and f) selecting and adding a sorbent.

In some embodiments, the engineered fuel feedstock of steps c) or e) is mixed. In some embodiments, the engineered fuel feedstock of steps c) or e) is reduced in size. In some embodiments, the engineered fuel feedstock of steps c) or e) are densified. In some embodiments, the size-reduced engineered fuel feedstock of steps c) or e) are densified. In some embodiments, the engineered fuel feedstock is densified to about 10 lbs/ft$^3$ to about 75 lbs/ft$^3$.

In certain embodiments of the invention, after the MSW has been processed and sorted or inventoried according to types of MSW components, at least one component is granulated separately. In certain embodiments of the invention, these components include, but are not limited to, plastics, such as soft plastics or hard plastics, and fibers. In yet other embodiments of the invention, at least one sorbent is mixed with at least one plastic-based component from the MSW and the mixture is pelletize by any suitable method known in the art. In certain embodiments, the plastic-based component is a soft plastic. In yet another embodiment of the invention, the plastic-based component is a hard-plastic. In a further embodiment of the invention, the sorbent is pelletized with both soft plastic and hard plastic. In a particular embodiment, the plastic-based component and sorbent are pelletized in a pelletizer. The pellets are pulverized to produce fine inseparable sorbent-plastic particles. In certain embodiments, the pellets are pulverized after cooling. The sorbent-plastic particles are then mixed with additional components from the MSW. In certain embodiments at least one additional component may be fiber-based components. In yet other embodiments, at least one additional component may be plastic-based. In a further embodiment, the sorbent-plastic particles are mixed with at least one fiber-based component and at least one plastic-based component. In certain embodiments of the invention, this mixture of sorbent-plastic particles and additional MSW components are then pelletized by any suitable means known in the art. In certain embodiments, the pellets are then granulated and pulverized. The granulated and pulverized pellets can be used an engineered fuel feedstock. The MSW-based components and sorbents can be combined in order to meet the chemical or molecular characteristics of any the engineered fuel feedstock/feedstocks of the present invention.

In certain embodiments of the present invention, the engineered fuel feedstock can be co-fired with other fuels such as fossil fuels, including, but not limited to coal, as a means to control emissions. In certain embodiments the engineered fuel feedstock is in an amount of between about 10% (energy from the engineered fuel feedstock/total energy of all co-fired fuels) to 50% (energy from the engineered fuel feedstock/total energy of all co-fired fuels), inclusive of all ranges and subranges therebetween, e.g. between about 10% and about 20%, about 10% and about 30%, about 10% and about 40%, about 10% and about 50%, about 20% and about 30%, about 20% and about 40%, about 20% and about 50%, about 30% and about 40%, about 30% and about 50%, about 40% and about 50%, and about 50% to about 60% (energy from the engineered fuel feedstock/total energy of all co-fired fuels). In yet other embodiments of the invention the engineered fuel feedstock is in an amount of about 10%, about 15%, about 20%, about 25%, 30%, about 35%, about 40%, about 45%, 50%, (energy from the engineered fuel feedstock/total energy of all co-fired fuels).

In certain embodiments of the invention the engineered fuel feedstock comprising one or more components derived from a processed MSW waste stream and a calcium based sorbent are co-fired with another energy source, such as, but not limited to fossil fuels, such as coal, comprising sulfur, such that the ratio of sulfur in the other energy source to calcium in the engineered fuel feedstock is between 0:1 and 5:1, including all ranges and subranges therebetween, e.g. 1:1, 2:1, 3:1, and 4:1.

In certain embodiments of the invention the engineered fuel feedstock comprising one or more components derived from a processed MSW waste stream and a combination of calcium and sodium based sorbents are co-fired with another energy source, such as, but not limited to fossil fuels, such as coal, comprising sulfur, such that the ratio of sulfur in the other energy source to a combination of calcium and sodium in the engineered fuel feedstock is between 0:1 and 5:1, including all ranges and subranges therebetween, e.g. 1:1, 2:1, 3:1, and 4:1.

The engineered fuel feedstock can be co-fired with any suitable type of coal known to a skilled artisan. In certain embodiments the coal can be lignite, or brown coal, sub-bituminous coal, bituminous coal, anthracite coal, or combinations thereof.

In some embodiments, the engineered fuel feedstock is densified to form a briquette. In other embodiments, the engineered fuel feedstock is densified to form of a pellet.

Because the sorbent is part of the engineered fuel feedstock, there is no need to have the sorbent handling systems that are normally required for dry sorbent injection systems (storage, delivery, atomizing, etc.).

Also, the products of the sorbent/pollutant reaction mostly remain in the bottom ash for fluidized bed boilers, the dust load on downstream dust collectors (i.e., electrostatic precipitator, baghouse, particulate matter scrubber) would be reduced, resulting savings in capital, operation and maintenance costs otherwise required for these devices.

In pulverized coal boilers, the products of the sorbent/pollutant reaction mostly remain in the fly ash, where existing downstream collectors become more effective at removing pollutants that would otherwise pass through and out the stack. Adsorbing more flue gas pollutants in the sorbent eliminates the need for additional capital expenditures for wet scrubbers to comply with increasingly stringent emissions standards.

In further embodiments of the invention, the co-firing of the sorbent-containing engineered fuel feedstock of the current invention would allow power plants to comply with the EPA's CSAPR. In a particular embodiment of the invention, a power plant co-firing of the sorbent-containing engineered fuel feedstock of the current invention would reduce $SO_2$ emissions to about 73% or more of 2005 emission levels.

In a particular embodiment of the invention, a power plant co-firing of the sorbent-containing engineered fuel feedstock of the current invention with at least one fossil fuel would reduce $SO_2$ emissions by about 50% or more as compared to the fossil-fuel in the absence of sorbent-containing engineered fuel feedstock. In a particular embodiment of the invention, the $SO_2$ emissions would be reduced by about 60% or more. In a particular embodiment of the invention, the $SO_2$ emissions would be reduced by about 70% or more. In a particular embodiment of the invention, the $SO_2$ emissions would be reduced by about 80% or more. In a particular embodiment of the invention, the $SO_2$ emissions would be reduced by about 90% or more.

In a particular embodiment of the invention, a power plant co-firing of the sorbent-containing engineered fuel feedstock of the current invention with at least one fossil fuel would reduce sulfur-based emissions by about 50% or more as compared to the fossil-fuel in the absence of sorbent-containing engineered fuel feedstock. In a particular embodiment of the invention, the sulfur-based emissions would be reduced by about 60% or more. In a particular embodiment of the invention, the sulfur-based emissions would be reduced by about 70% or more. In a particular embodiment of the invention, the sulfur-based emissions would be reduced by about 80% or more. In a particular embodiment of the invention, the sulfur-based emissions would be reduced by about 90% or more.

In a particular embodiment of the invention, a power plant co-firing of the sorbent-containing engineered fuel feedstock of the current invention with coal would reduce $SO_2$ emissions by about 50% or more as compared to coal in the absence of sorbent-containing engineered fuel feedstock. In a particular embodiment of the invention, the sulfur-based emissions would be reduced by about 60% more. In a particular embodiment of the invention, the sulfur-based emissions would be reduced by about 70% more. In a particular embodiment of the invention, the sulfur-based emissions would be reduced by about 80% more. In a particular embodiment of the invention, the sulfur-based emissions would be reduced by about 90% more.

In a particular embodiment of the invention, a power plant co-firing of the sorbent-containing engineered fuel feedstock of the current invention with coal would reduce sulfur-based emissions by about 50% or more as compared to coal in the absence of sorbent-containing engineered fuel feedstock. In a particular embodiment of the invention, the sulfur-based emissions would be reduced by about 60% more. In a particular embodiment of the invention, the sulfur-based emissions would be reduced by about 70% more. In a particular embodiment of the invention, the sulfur-based emissions would be reduced by about 80% more. In a particular embodiment of the invention, the sulfur-based emissions would be reduced by about 90% more.

Under the New Source Performance Standards (NSPS) issued by the EPA, incorporated herein by reference in its entirety for all purposes, most existing coal-fired electric utility units must meet certain opacity limits, e.g., a 20% opacity limit on a six minute basis (Norfleet, S. K. "Demonstrating Compliance with Low-Level Opacity Limits", EPRI CEMS Users Group Meeting, Columbus, Ohio, May 3-5, 2006, incorporated herein by reference in its entirety for all purposes). In certain embodiments of the invention, a power plant co-firing of the sorbent-containing engineered fuel feedstock of the current invention with coal would meet such limits, including the 20% opacity limit on a six minute basis.

At the temperatures in the primary combustion zone, sintering of certain sorbents may occur. Such sintering may block channels or pores in the sorbent particles, effectively reducing the surface area of the sorbent, with concomitant reduction of pollutant adsorption and fixing via reaction with the sorbent. However, since sorbent particles are integrated within the present engineered fuel feedstocks, sorbent particles within the engineered fuel feedstock particles may be effectively shielded from the high temperature in the primary combustion zone as the fuel burns and passes further up the reactor. The effective shielding of sorbent has a further advantage in that the sorbent is exposed to high enough temperature to promote rapid calcining, but dead burning (structural changes in the lattice or matrix structure of the sorbent) is avoided because the sorbent is rapidly carried upward from the primary combustion zone into a lower-temperature environment before experiencing the high temperatures of the primary combustion zone. Accordingly, sorbent carried upward is calcined but most is not sintered or melted, and can continue to absorb sulfur or other contaminants as the sorbent particles are released from the engineered fuel feedstock particles and travel through the combustion reactor.

In some embodiments, the engineered fuel feedstock employed in the mixture introduced to the primary combustion zone can be selected to have a relatively high moisture content. The relatively high moisture content can aid in lowering the effective temperature experienced by the sorbent in the engineered fuel feedstock particles, via evolution of such moisture from the fuel and conversion of the water to steam. The size of the engineered fuel feedstock particles can also be selected so that sorbent exposure to high temperature can be delayed. Specifically, larger engineered fuel feedstock particles may not burn completely or may fragment in the primary combustion zone, and such partially combusted or fragmented fuel engineered fuel feedstock particles may be carried upward in the combustion reactor to a lower temperature zone in the reactor, preventing sintering and/or melting of at least some of the sorbent particles contained in the engineered fuel feedstock.

Exemplary Advantages of the Invention

Below is a description of some representative advantages of the engineered fuel feedstock with sorbent and methods described herein. While particular advantages are described below, it will be apparent to those skilled in the art that various other advantages arise from this invention without departing from the spirit and scope of the disclosure.

1. Emission Controls—Efficient, Cost Effective, Emission Controls

Integration of sorbents with the engineered fuel feedstock is a powerful way to control emission of hazardous air pollutants (HAPs) from thermal conversion processes. During combustion, $SO_x$ pollutants are formed in the flame. With sorbents uniformly distributed within the fuel, intimate contact and sufficient retention time can be readily achieved, and therefore leading to high sorbent utilization efficiency and HAPs control efficiency.

Sorbent containing engineered feedstock can be designed to meet air emission targets without post-conversion gas treatment devices when the engineered fuel feedstock is solely used. For existing facilities where a fossil or biomass fuel (such as coal, wood, hog fuel, animal wastes, etc.) is being used, the engineered fuel feedstock can be designed to substitute a portion of the existing fuel, as described herein, and have ability to control air emissions from both the engineered fuel feedstock and the substituted fuel. Co-firing of engineered fuel feedstocks with other fuels can provide combustion processes to meet increasingly stringent environmental regulations in a cost effective and yet efficient retrofit approach, to meet emission reduction goals without extensive capital investments to install new post-combustion emission control processes.

Furthermore, sorbent contained within the engineered fuel feedstock allows for beneficial use of materials that would otherwise likely have to be avoided because of their inherent nature of causing environmental or operational problems, such as PVC, hog fuel, animal wastes and low rank coals. It is impractical to assume that these environmental and/or operationally harmful but valuable fuel materials could be thoroughly removed from a waste stream, even if a dedicated sorting and separation process could be provided. However, by employing sorbent in an engineered fuel feedstock and co-firing with coal, such otherwise unsuitable materials can be employed in combustion processes. Using sorbents in the engineered fuel feedstock therefore not only ensures these contaminants do not cause environmental and/or operational problems, but also allows beneficial use of these materials and therefore avoids extensive pre-sorting and separation.

2. Corrosion Prevention/Minimization

By controlling the level of $SO_3$ at the entrance to the air heater to 3 ppm or less with an engineered fuel feedstock with sorbent, there will be a substantial reduction in the sulfuric acid dew point. For example, at 60 ppm $SO_3$, a concentration not unusual when burning a high-sulfur coal with a selective SCR system in service, the acid dew point is about 310° F. Also note that at 30 ppm $SO_3$-a concentration typical when burning a high-sulfur coal without an SCR system in service or using an SCR system with a very low oxidation catalyst, or firing a medium-sulfur coal with an SCR system—the acid dew point is roughly 295° F. At 3 ppm $SO_3$, the acid dew point is about 255° F. Because the $SO_3$ gas will not condense until cooled to its dew point, the potential for corrosion can be reduced considerably by use of engineered fuel feedstock. By preventing corrosion to the system equipment, significant savings can be achieved. For example, it is not unusual for a utility to spend several million dollars every few years to repair corrosion damage and/or replace damaged components.

Because of the nature of some types of coal and biomass based fuels, i.e., high chlorine and alkali metal contents, equipment corrosion (i.e., super-heater tubes, economizer, air heater, etc.) has been the major challenge in operating biomass based fuel boilers and power plants. High temperature chlorine corrosion in biomass and waste firing boilers has been causing frequent and extended plant downtime for steam tubes repair and replacement, which not only requires expensive labor and materials, but also results in extra costs resulted from loses in power revenue and costs in waste-by pass to landfill.

Combining sorbents with the present engineered fuel feedstock would capture and retain the corrosive components in the ash, and therefore prevent them from entering into the gas stream and avoid them interacting with the downstream equipment. As equipment corrosion is prevented or minimized, the plant capacity will be increased (e.g., less down time for repairs), which brings significant economic benefits such as reduced operation and maintenance costs and increased power revenue.

3. Improved Process Operation

Operational issues such as slagging and corrosion can be greatly minimized with the present engineered fuel feedstocks having additives to change, adjust or improve the fuel ash characteristics such as fusion temperature. Adding suitable additives, such as MgO and/or aluminum silicates like materials, even coal ashes, would be able to convert the biomass ash to coal-like ash, which has a high fusion temperature and is not expected to cause slagging at operation temperatures.

4. Improved Process Performance

Co-firing coal and an engineered fuel feedstock with sorbent to control $SO_3$ emissions lowers the acid dew point. As the acid dew point is lowered, the air heater can be operated at a reduced outlet gas temperature. As discussed above, the air heater can be operated at least 35° to 55° F. lower, so more energy can be recovered from the flue gas stream. The increased energy recovery can effectively increase power plant efficiency by over 1%, which represents a significant savings in fuel cost and/or increase in power revenue.

Compared to the typical coal fired power plants which typically have electrical efficiencies of 30-40%, biomass and waste derived fuel fired power plants only produce electricity with efficiencies of about 20%. One limiting factor that contributes to this difference is that biomass and waste derived fuels have high chlorine and alkali metal contents, which limit the boilers to operate at relatively low steam temperature and pressure (e.g., 750° F., and 650-800 psig) to control and minimize the high temperature corrosion (which increases exponentially when flue gas temperatures are higher than approximately 2,000° F.). These compares to approximately 1,000° F. and 3,500 psig for coal fired power plants. Accordingly, co-firing a mixture of coal and engineered fuel feedstock as described herein may provide a balance of operational performance and pollution control.

5. Extending the Coal Power Plant Lifetime

With air emission standards continuing to become more and more stringent (e.g., EPA's new transport rule), owners of the vast majority of coal-fired power plants in the United States will need to make a critical decision, either invest in retrofitting to control emissions and to meet the new standards, or simply shutdown the power plant to avoid that expense. (see Proposed Transport Rule 75 FR 45210). Unlike duct dry sorbent injection, and flue gas reheating, the use of engineered fuel feedstocks does not require additional equipment or systems, thereby avoiding significant, associated costs in capital investments, operation and maintenance, and parasitic power and/or energy consumption. For a typical 500 MW coal fired plant, the retrofit cost to install flue gas desulfurization system in order to comply with the regulation would cost an estimated $75 million dollars with an additional approximately $6.8 million dollars in annual operation and maintenance (based on Energy Information Administration's (EIA) average Flue Gas Desulfurization (FGD) cost data). Clearly, the use of engineered fuel feedstocks of the present invention will not only avoid the above retrofit cost, but would also allow the plant to extend its operational life. More importantly, the reliability of controlling boiler emissions by use of an engineered fuel feedstock with sorbents is not matched by any previously known techniques involving capital equipment. Furthermore, with engineered fuel feedstocks containing corrosion preventive sorbents and additives, high temperature corrosion can be prevented or minimized.

6. Employ Existing Coal Power Plant Process Equipment

A key advantage to the present engineered fuel feedstocks and methods employing such fuels is that the engineered fuel feedstocks can be used to displace coal or other conventional fuels with minimal capital investment for new process equipment. For example, in some embodiments of the present combustion processes, the present engineered fuel feedstocks may function as a drop-in substitute for coal in a primary combustion process, or in place of a conventional reborn fuel. Furthermore, the present engineered fuel feedstocks and processes are designed to leverage existing process equipment in combustion reactors rather than replace them, and accordingly, the present methods can be employed without the need for new process units.

While particular embodiments described herein have been illustrated and described herein, it will be apparent to those skilled in the art that various other changes and modifications can be made without departing from the spirit and scope of the disclosure. It is therefore intended to cover in the appended claims all such changes and modifications that are within the scope of this invention.

EXAMPLES

Pulverized Coal Boiler Experiments

Figure 2:
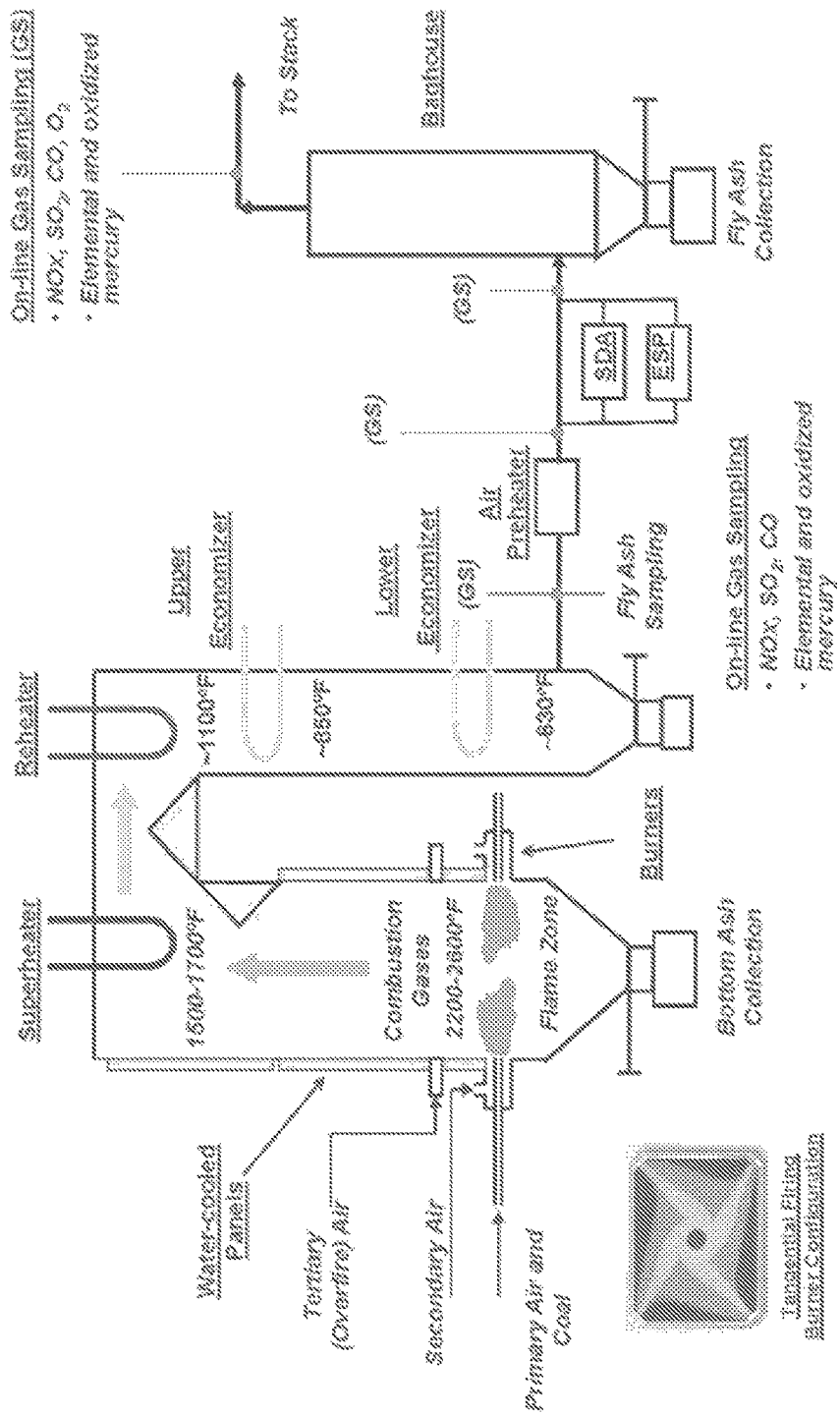
FIG. 2 is a schematic flow diagram of a pilot-scale coal combustion system.

Data in the following examples were obtained from tests that were conducted using a 250,000 Btu/hr balanced-draft coal combustion system designed to replicate a pulverized coal-fired utility boiler. A schematic of the coal combustion system is shown in FIG. 2. The combustion system was set up to simulate a tangential-fired boiler. The fuel feed system consists of screw-based feeders and pneumatic transport to four burners inserted in the corners of a refractory-lined firebox. During co-firing, the engineered fuel feedstock was added to the pulverized coal at the screw feeder. The combustion system is equipped with appropriately sized heat-recovery surfaces such that the time/temperature profile of a utility boiler is replicated. These surfaces comprise water-cooled panels that simulate the waterwall, an air-cooled superheater, reheater, two economizers and preheater. The combustion system is equipped with two baghouses, and an electrostatic precipitator. A variety of sensors measures temperatures as well as pollutant levels in various locations within the combustion system.

Figure 3:
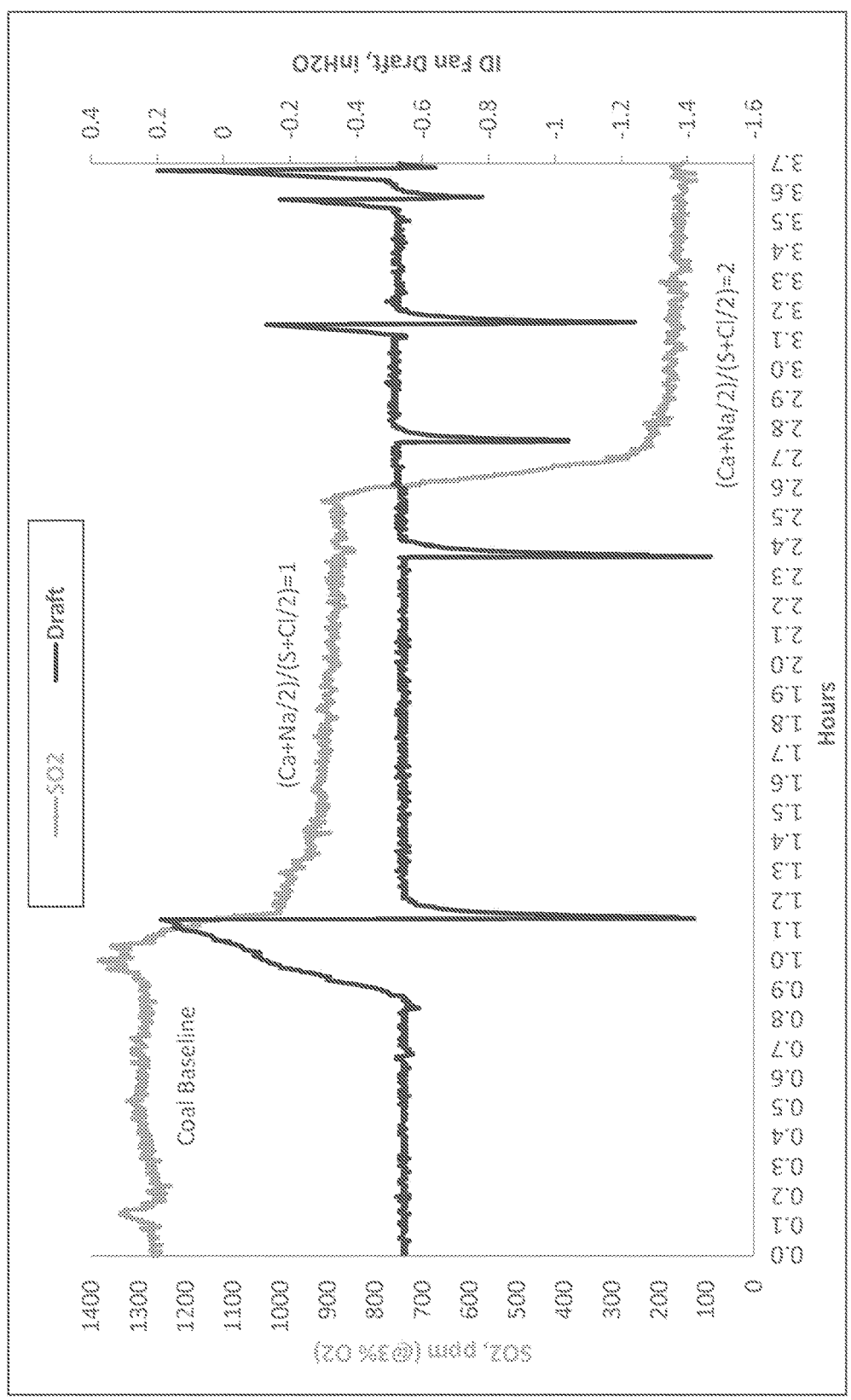
FIG. 3 is a graph showing $SO_2$ removal versus induced fan draft for different amounts of Na-based sorbents.

In FIG. 3, a baseline was established by firing coal only in the combustion system, and the $SO_2$ concentration was measured. Next a Na-based sorbent, sodium bicarbonate was added to the pulverized coal prior to being fed into the combustion system. At a molar ratio of one mole of Na-based sorbent to one mole of sulfur and chlorine-based pollutant, stable operation was maintained for the time period observed, with a marginal decrease in $SO_2$ concentration. Increasing the molar ratio of Na-based sorbent to sulfur and chlorine-based pollutant to two to one further increased the $SO_2$ removal, however, the induced draft at the baghouse became increasingly unstable due to fouling.

Figure 4:
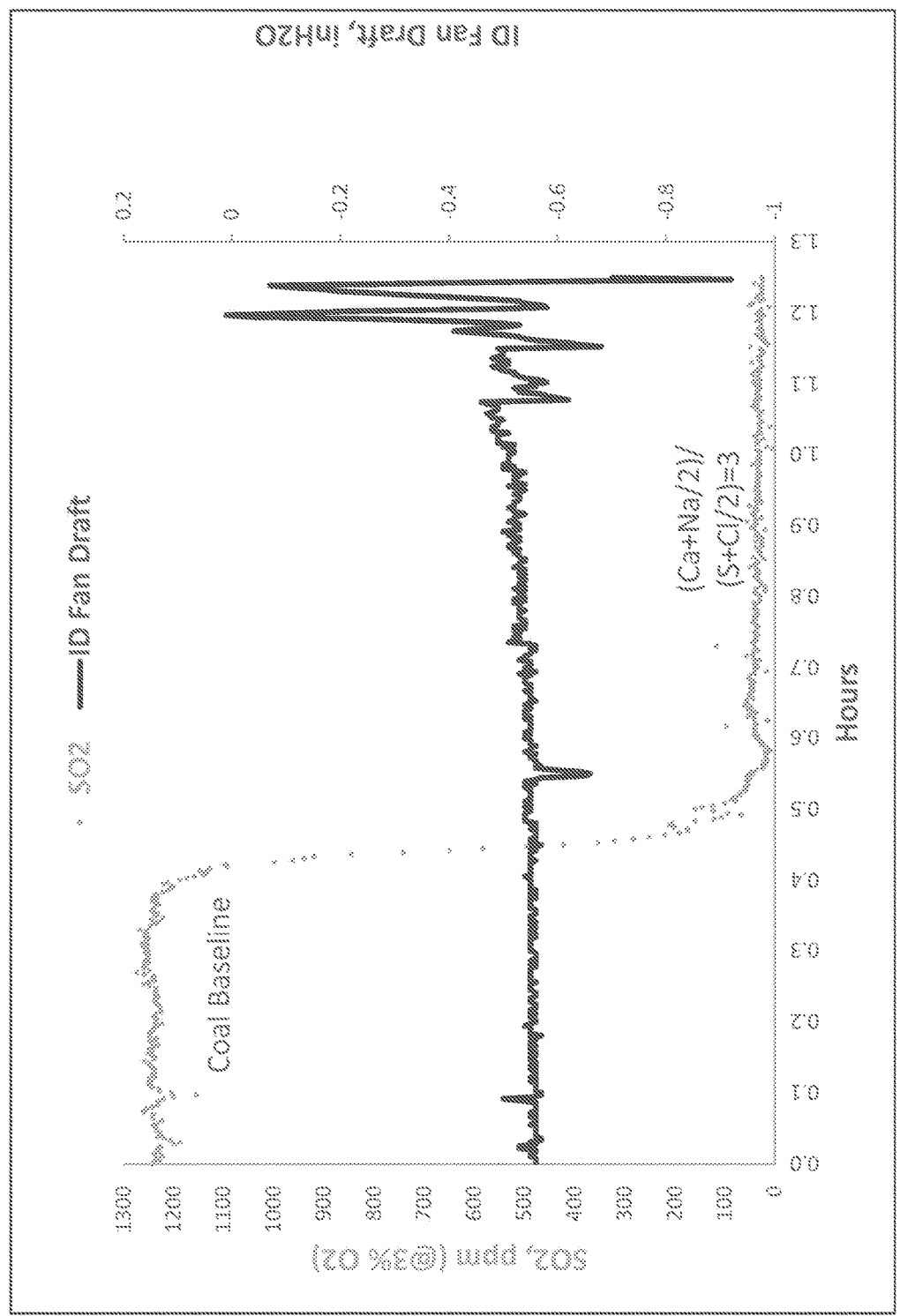
FIG. 4 is a graph showing $SO_2$ removal versus induced fan draft for Na-based sorbents.

In FIG. 4, the coal baseline was reestablished followed by feeding the Na-based sorbent, sodium bicarbonate, at a molar ratio three to one Na-sorbent to sulfur and chlorine-based pollutant. Increasing the Na-based sorbent loading further increased the $SO_2$ removal, however, the induced draft at the baghouse became increasingly unstable as a result of fouling. High loadings of Na-base sorbent are capable of significantly reducing $SO_2$ in the flue gas, but are prone to causing fouling at the baghouse.

Figure 5:
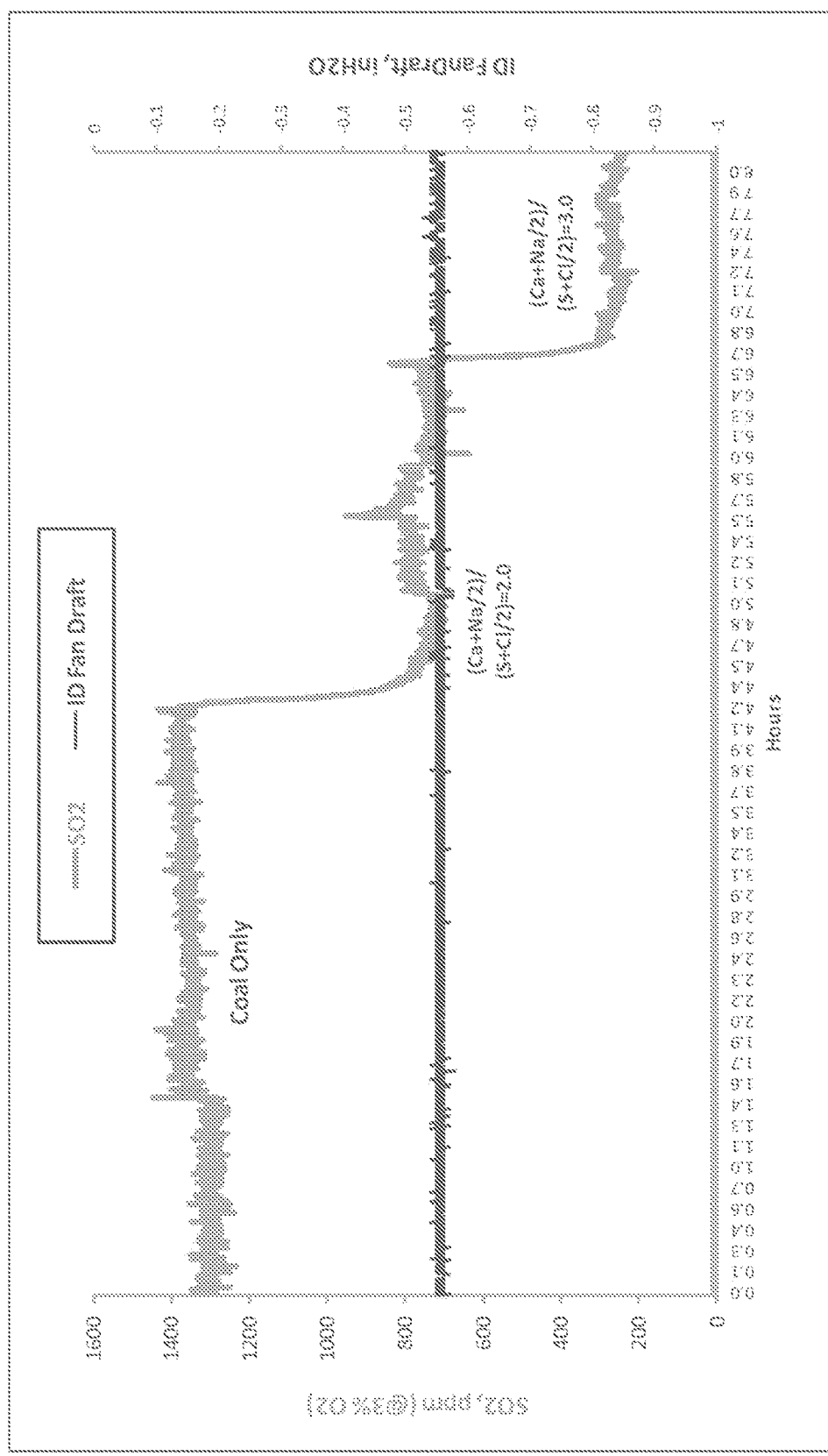
FIG. 5 is a graph showing $SO_2$ removal versus induced fan draft for different amounts of Ca/Na-based sorbents.

A Na-based sorbent was combined with a Ca-based sorbent in FIG. 5. One mole of standard hydrated lime was combined with one mole of sodium bicarbonate for every one mole of sulfur and chorine-based pollutant in the coal resulting in a total molar ratio of two to one sorbent to pollutant. $SO_2$ in the flue gas dropped to about one half that of the coal only baseline. By increasing the total molar ratio to three to one, additional $SO_2$ removal was possible while maintaining stable operation.

Figure 6:
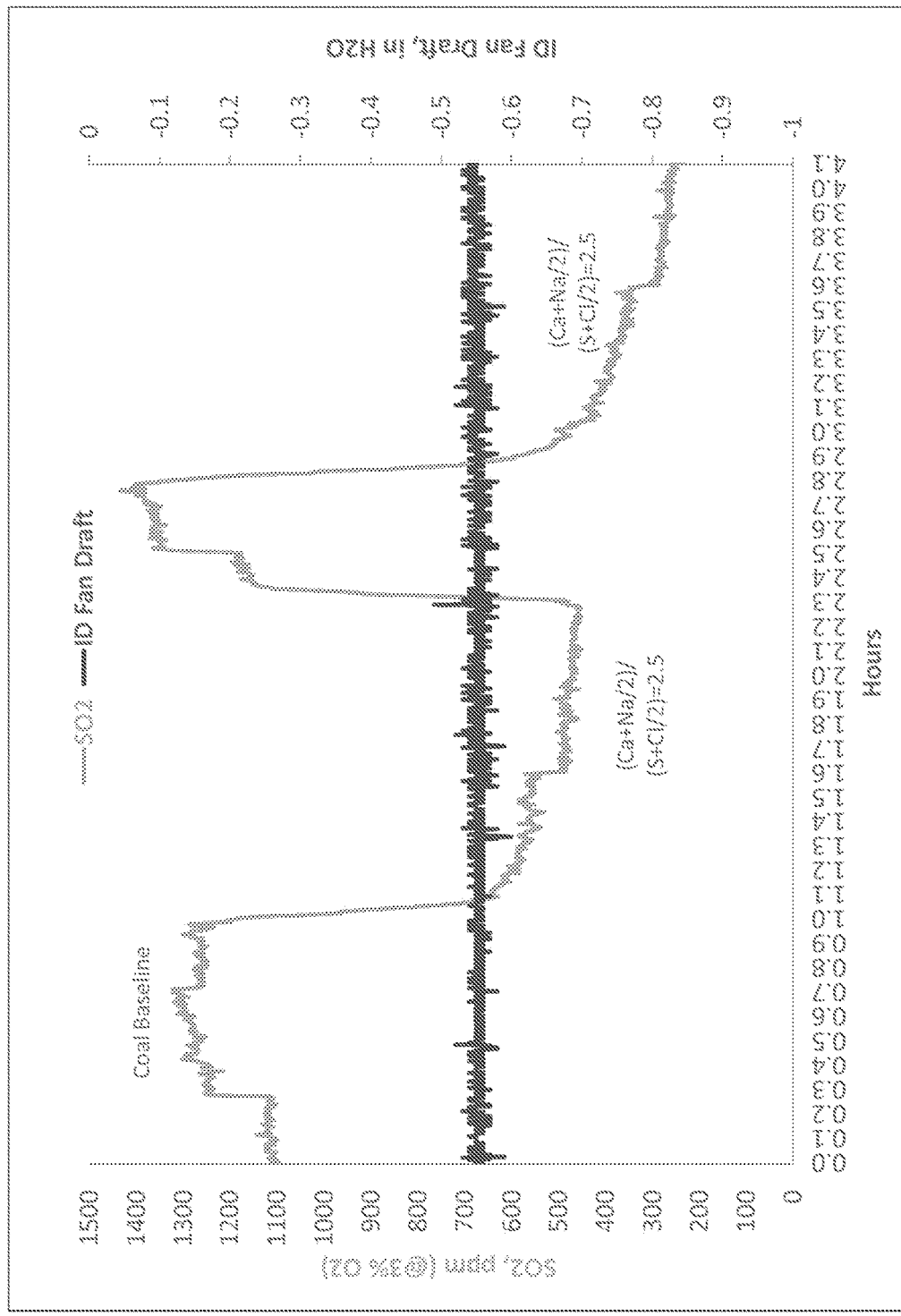
FIG. 6 is a graph showing $SO_2$ removal versus induced fan draft for different amounts of Ca/Na-based sorbents.

In FIG. 6, the sorbent of FIG. 5 was retested at a total molar ratio of two and one half to one. Stable operation was maintained and the amount of $SO_2$ removal was in between that of the conditions shown in FIG. 5. Next, the Na-based sorbent was switch to Trona and the Ca-based sorbent was switched to calcium magnesium acetate at the same total molar ratio of two and one half to one of sorbent to pollutant. This combination of Na-based and Ca-based sorbents also resulted in a stable induced draft at the baghouse while further reducing the $SO_2$ concentration in the flue gas.

Table 5 below summarize the results from a number of tests involving Ca-based sorbents, Na-based sorbents, and combinations thereof. While Na-based sorbents are effective at removing $SO_2$, operational problems prevent Na-based sorbents from being used alone. On the other hand, use of only Ca-based sorbents provide stable operation, but they are not as effective as Na-based sorbents at reducing $SO_2$ emissions. It has been found that combinations of Na-based and Ca-based provide effective $SO_2$ removal while maintaining operational stability.

of 4.3 to one of Na-based sorbent to sulfur and chlorine-based pollutant, the $SO_2$ concentration in the flue gas dropped significantly, however, instability in the induced fan began to result due to fouling at the baghouse. Further testing at co-firing energy ratios of 90:10 and 80:20 also resulted operational instability.

Figure 8:
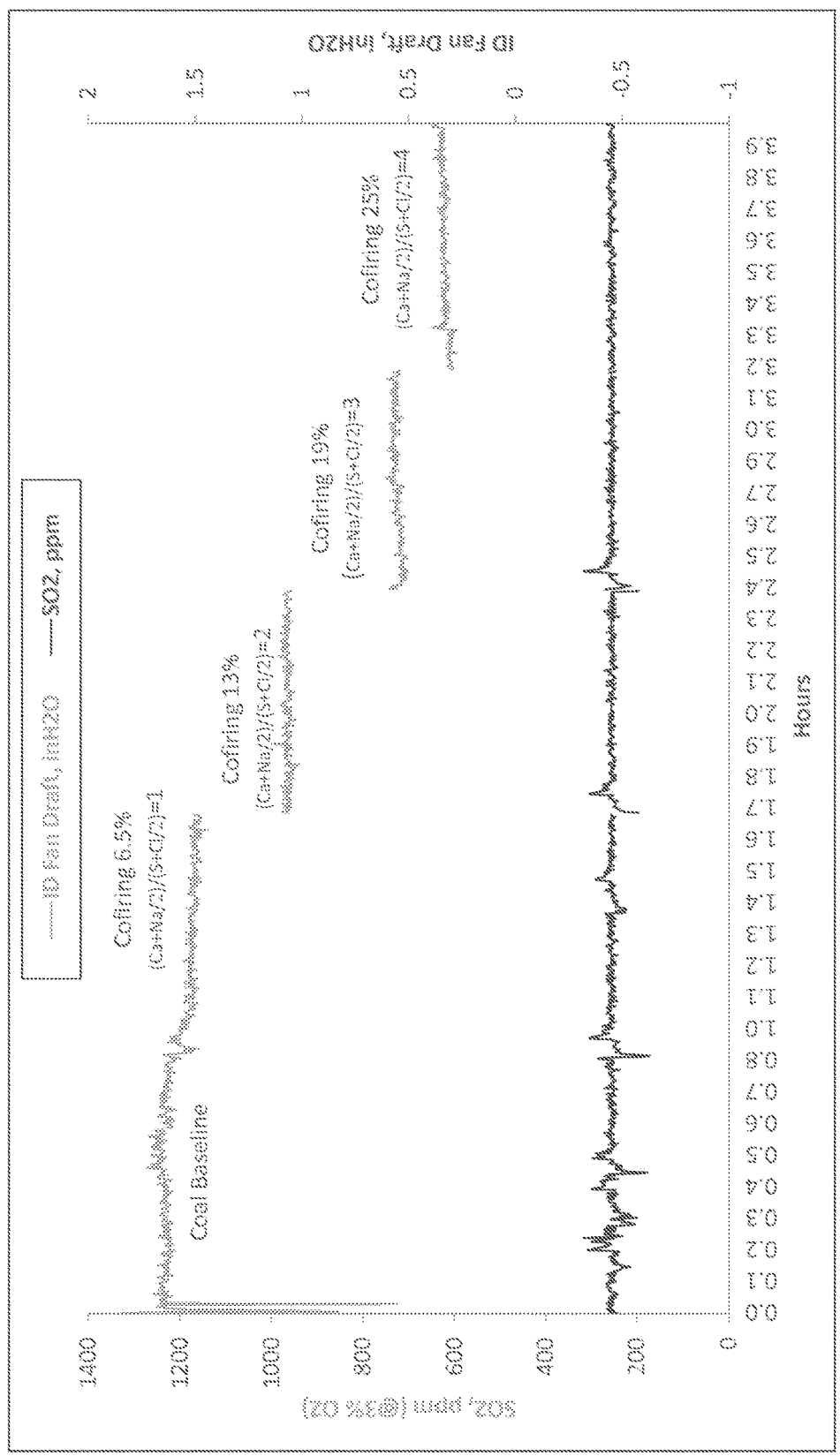
FIG. 8 is a graph showing $SO_2$ removal versus induced fan draft for co-firing engineered fuel feedstock with different amounts of Ca-based sorbents.

In FIG. 8, engineered fuel feedstocks that include a Ca-based sorbent were co-fired with coal to measure the $SO_2$ pollutant removal. Molar ratios were varied between one and four moles of Ca-based sorbent to one mole of sulfur and chlorine-based pollutant. Co-firing energy ratios changed from about 6.5% to about 25% of engineered fuel feedstock that includes sorbent to coal. During the testing, the induced draft fan remained constant indicating operational stability. However, the amount of $SO_2$ removed by the Ca-based sorbent remained well below the level of performance of the engineered fuel feedstocks that include Na-based sorbents.

In Table 6, trials were conducted with an engineered fuel feedstock that includes sorbent. The engineered fuel feed-

TABLE 5

Sodium and Calcium Based Sorbents and Combinations Thereof

| Sorbent | (Ca + Na/2)/(S + Cl/2), mole/mole | Wt % | $SO_2$ Reduction | $NO_x$ Reduction | CO Reduction | Stable Operation |
|---|---|---|---|---|---|---|
| Standard Hydrated Lime (high surface area) | 2.0 | 10 | 7% | 12% | 21% | Yes |
| | 3.0 | 14 | 17% | 11% | 4% | Yes |
| | 4.0 | 18 | 21% | 12% | −35% | Yes |
| Pre-milled Trona | 1.0 | 7 | 13% | 12% | 18% | No |
| | 2.1 | 13 | 53% | 8% | 39% | No |
| | 3.0 | 18 | 97% | −14% | 60% | No |
| Sodium Bicarbonate | 1.0 | 7 | 23% | −33% | 4% | No |
| | 2.0 | 14 | 85% | −51% | 25% | No |
| | 3.0 | 19 | 97% | 10% | −20% | No |
| Standard Hydrated Lime and Sodium Bicarbonate | 2.0 | 11 | 45% | −33% | 80% | Yes |
| | 2.5 | 13 | 55% | −6% | 40% | Yes |
| | 3.0 | 15 | 79% | −64% | 10% | Yes |
| Trona and Calcium Magnesium Acetate | 2.5 | 20 | 68% | −5% | 22% | Yes |

Co-Firing Engineered Fuel Feedstock and Sorbents

Figure 7:
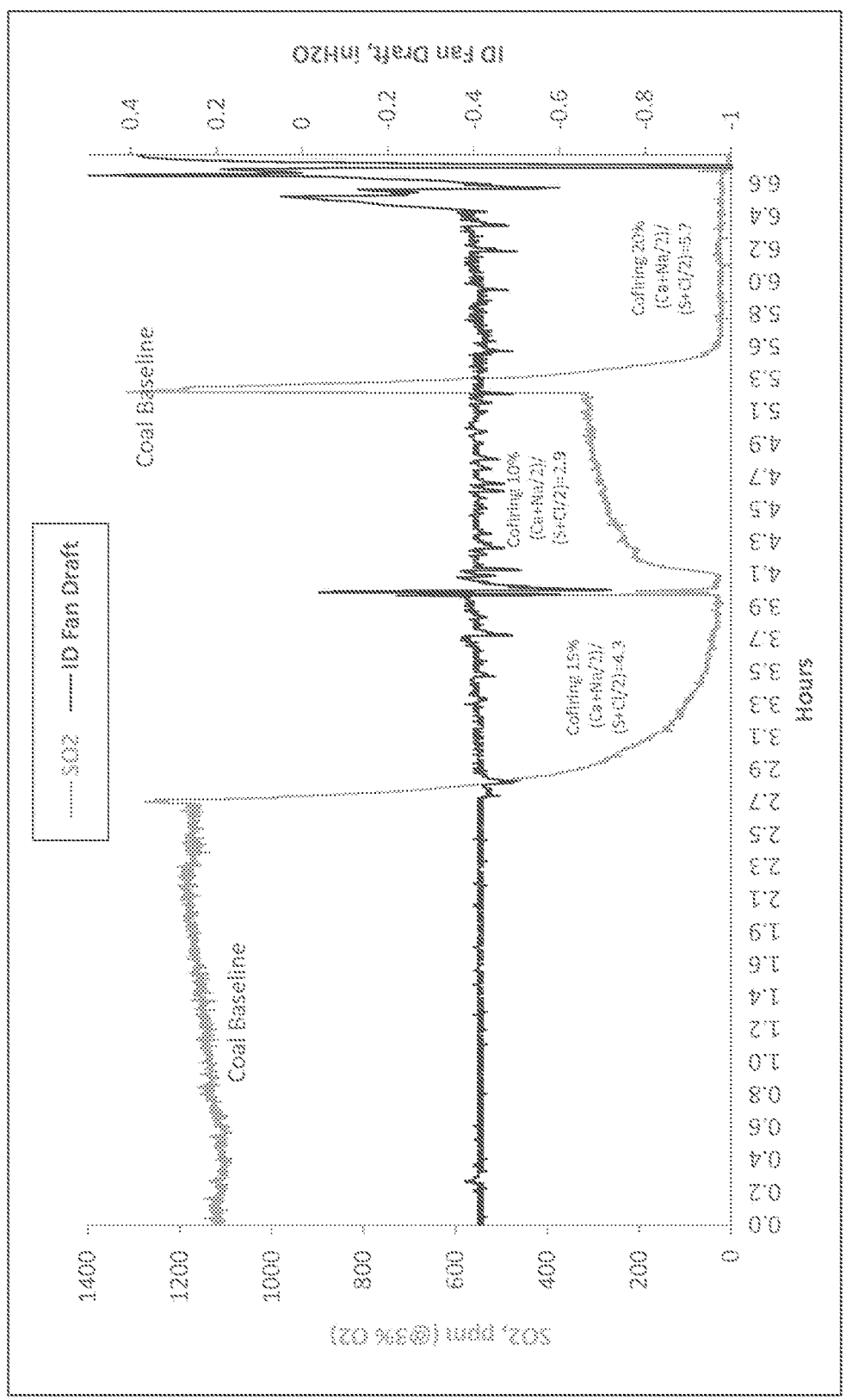
FIG. 7 is a graph showing $SO_2$ removal versus induced fan draft for co-firing engineered fuel feedstock with different amounts of Na-based sorbents.

In FIG. 7, an engineered fuel feedstock that includes a Na-based sorbent was co-fired with coal. After a baseline concentration of $SO_2$ was established from firing only coal, an engineered fuel feedstock that includes a Na-based sorbent was combined with the coal and fed into the combustion system at an energy ratio of 85% coal to 15% engineered fuel feedstock that includes sorbent. At a molar ratio stock was comprised of 80% fiber with 20% mixed plastics. The sorbent for each trial was comprised of a Ca-based sorbent, standard hydrated lime, a Na-based sorbent, sodium bicarbonate, a mercury sorbent, calcium bromide, and a nitrous oxide reducing sorbent, urea.

TABLE 6

Engineered Fuel Formulations

| Example | Fibers, wt | Plastics, wt | Total Sorbent, wt | Standard Hydrated Lime, wt | Sodium Bicarbonate, wt | Calcium Bromide, wt | Urea, wt |
|---|---|---|---|---|---|---|---|
| Ex. 03 | 52% | 13% | 34% | 9% | 23% | 0.13% | 2.3% |
| Ex. 04 | 51% | 13% | 37% | 8% | 26% | 0.12% | 2.2% |
| Ex. 05 | 52% | 13% | 35% | 10% | 23% | 0.13% | 2.2% |
| Ex. 06 | 50% | 12% | 38% | 6% | 29% | 0.12% | 2.1% |
| Ex. 07 | 60% | 15% | 25% | 7% | 23% | 0.06% | 1.4% |

Figure 9:
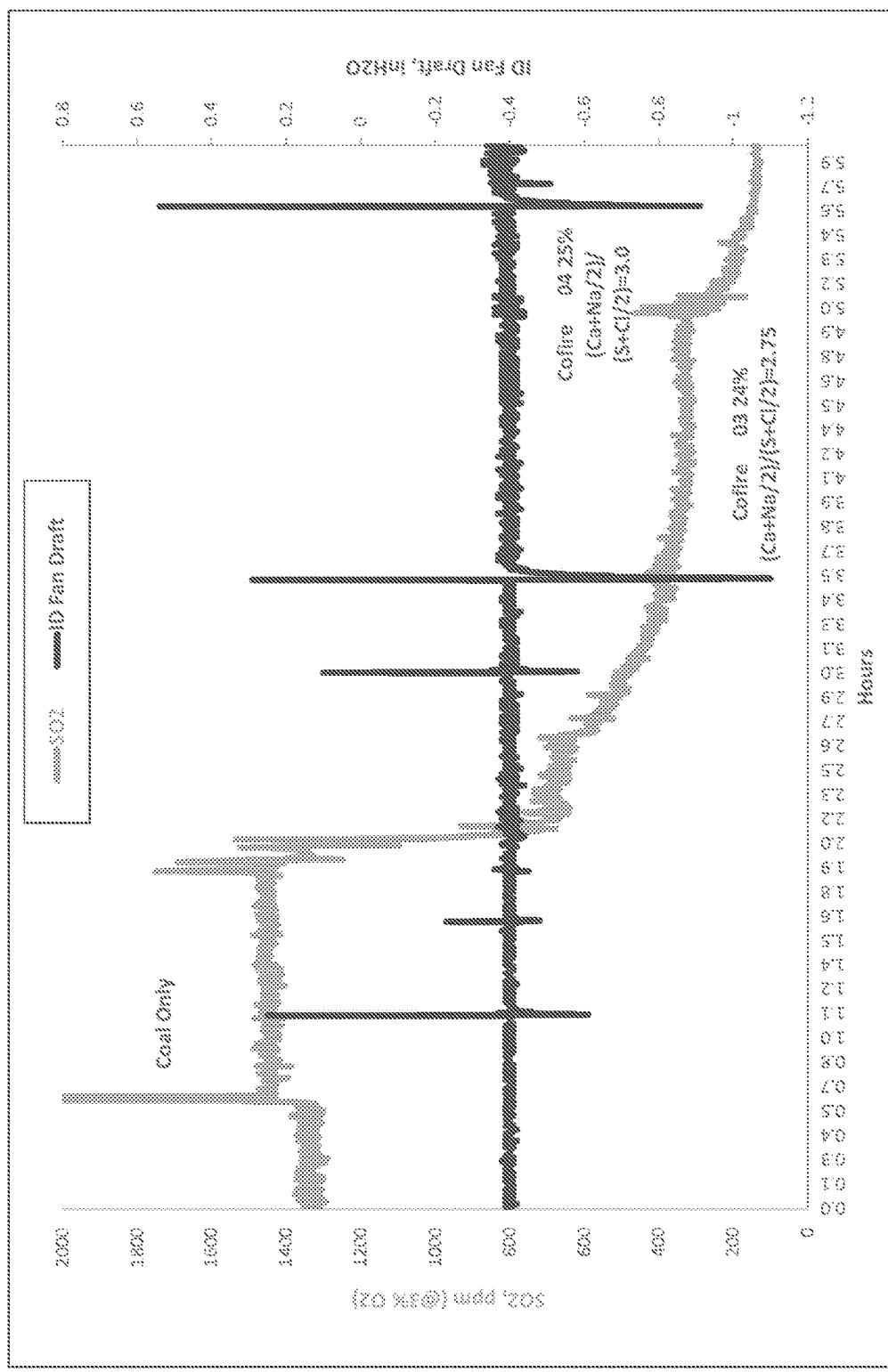
FIG. 9 is a graph showing $SO_2$ removal versus induced fan draft for co-firing engineered fuel feedstock with Ca/Na-based sorbents.
Figure 10:
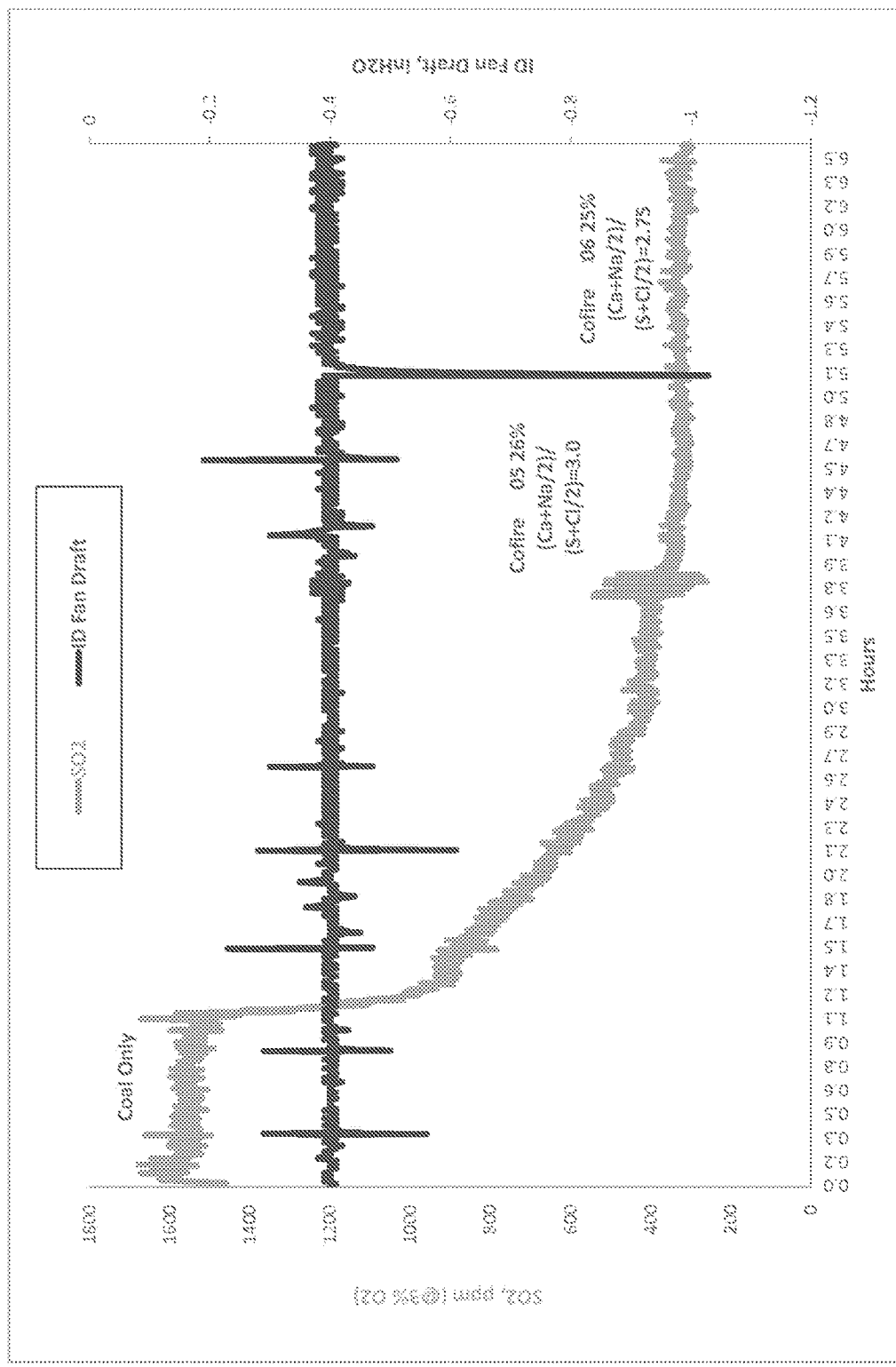
FIG. 10 is a graph showing $SO_2$ removal versus induced fan draft for co-firing engineered fuel feedstock with Ca/Na-based sorbents.

FIG. 9 and FIG. 10 show the results of the engineered fuel feedstock that includes sorbent co-fired with coal. For each trial, as baseline of the SO$_2$ concentration in the flue gas was established by firing with coal only. The molar ratio of total Ca-based and Na-based sorbent to sulfur and chlorine-based pollutant was varied from 2.75 to one to three to one. The co-firing energy from the engineered fuel feedstock that includes sorbent in each trial varied from 24% to 26% of the boiler's total energy requirement. In each case, SO$_2$ levels were decreased while maintaining operational stability.

Table 7 below summarizes the average results obtained during the trials shown in FIG. 9 and FIG. 10.

TABLE 7

Engineered Fuel Average Trial Results

| | Coal Baseline | Ex. 03 | Ex. 04 | Coal Baseline | Ex. 05 | Ex. 06 |
|---|---|---|---|---|---|---|
| Cofiring ratio, energy, % | — | 24 | 25 | — | 26 | 25 |
| Flame temperature, F. | 2,340 | 2,096 | 2,129 | 2,345 | 2,288 | 2,380 |
| Flue gas O$_2$, % | 3.7 | 7.3 | 7.4 | 4 | 7.3 | 7 |
| (Ca + Na/2)/(S + Cl/2) | — | 2.75 | 3 | — | 3 | 2.75 |
| SO$_2$, ppm | 1,487 | 328 | 137 | 1,547 | 413 | 329 |
| N$_2$O, ppm | 2.1 | 0.37 | 0.43 | 6.12 | 0.5 | 0.4 |
| Total Hg, µg/m$^3$ | 3.3 | 1 | 1 | 1.66 | 0.17 | 0.7 |
| Oxidized Hg, µg/m$^3$ | 1.3 | 0.5 | 0.9 | 1.47 | 0.16 | 0.69 |
| Elemental Hg, µg/m$^3$ | 2 | 0.5 | 0.1 | 0.19 | 0.01 | 0.01 |

Figure 11:
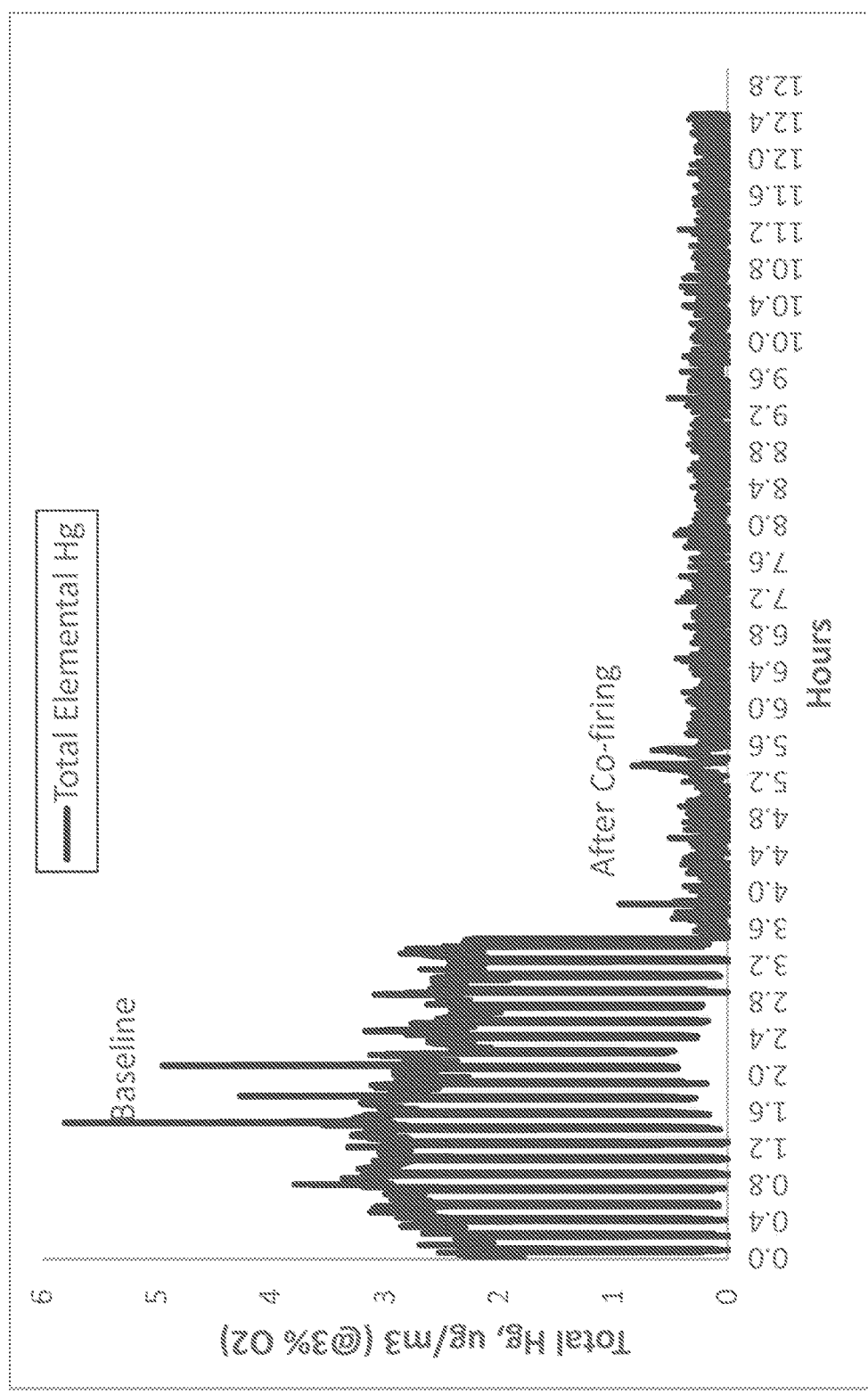
FIG. 11 is a graph showing total mercury reduction from co-firing engineered fuel feedstocks with sorbents.
Figure 12:
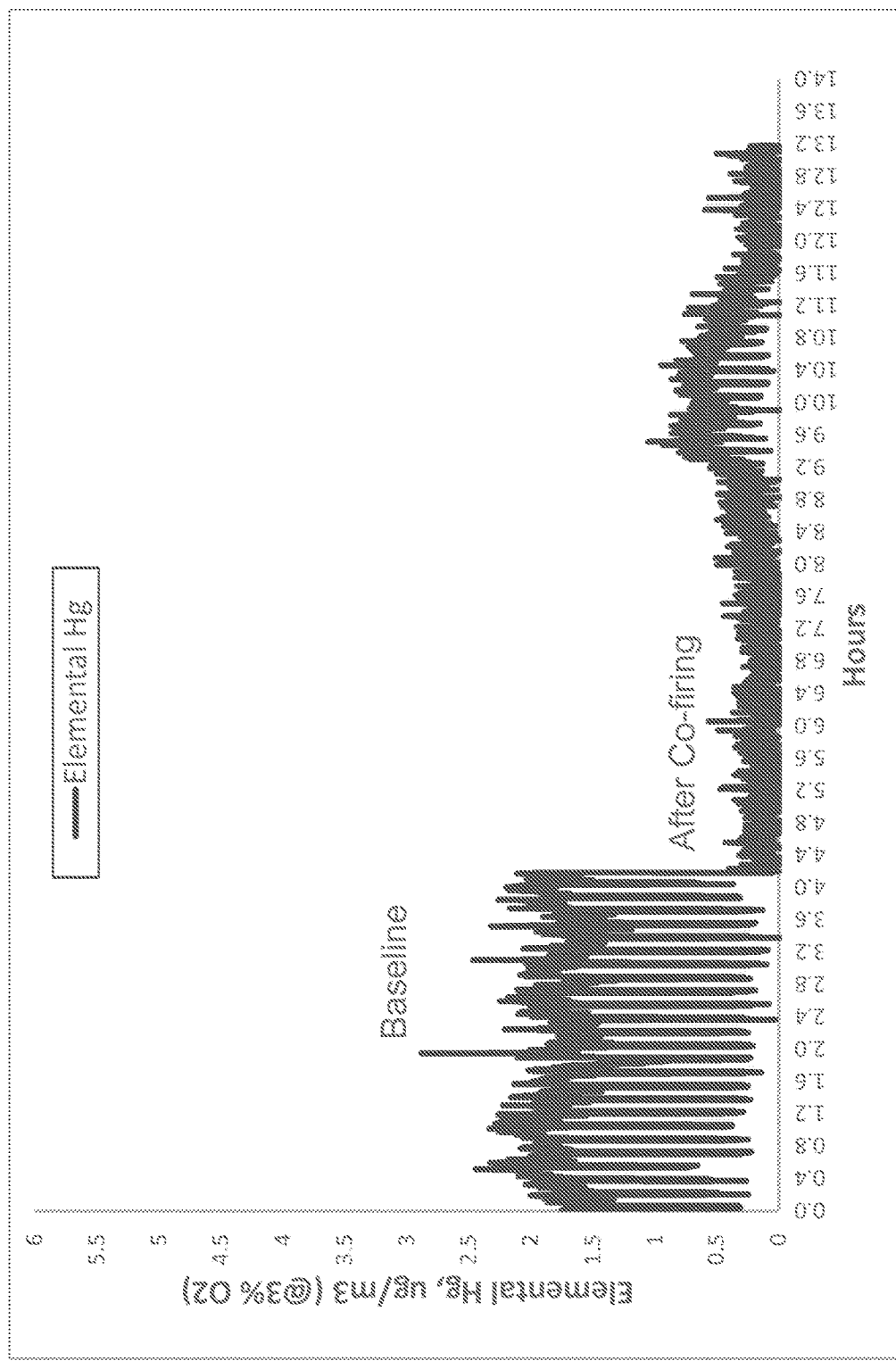
FIG. 12 is a graph showing elemental mercury reduction from co-firing engineered fuel feedstocks with sorbents.

In FIG. 11 and FIG. 12, baselines of total and element mercury emissions were measured by firing only coal. Next, an engineered fuel feedstock that includes calcium bromide sorbent was added to the coal and fed into the combustion system. Both total and element mercury levels dropped to less than about 1 microgram per cubic meter for the duration of the co-firing.

Table 8 below summarizes the mercury reduction test results using different amounts of sorbents and co-firing ratios. Both a low sulfur and a high sulfur coal were co-fired with the engineered fuel feedstock that includes sorbent. A mercury reduction of more than 90% was possible while co-firing a high-sulfur coal with an engineered fuel feedstock that includes calcium bromide sorbent.

Fluidized Bed Reactor Examples

The engineered fuel feedstock of Table 9 used in the following tests below was made from MSW components, including fibers, such as paper, cardboard, magazines, and soft plastics, using procedures described in U.S. patent application Ser. No. 12/492,096. The sorbent, Ca(OH)$_2$, was mixed with granulated soft plastic (20% (w/w) soft plastic, 80% (w/w) Ca(OH)$_2$) and pelletized in a pelletizer. After cooling, the soft plastic-sorbent pellet was pulverized to produce sorbent-plastic particles. These sorbent-plastic particles were then mixed with fibers-based component and soft-plastic based components (37.5% (w/w) sorbent-plastic particles, 56% (w/w) fiber, 6.5% (w/w) soft plastic). This mixture was then pelletized, granulated and pulverized to produce the final engineered fuel feedstock used in the following experiment.

TABLE 8

Mercury Reduction Test Results

| Plastic (prior to sorbent), wt | Fiber (prior to sorbent), wt | Total Sorbent, wt | Lime, wt | Standard Hydrated Lime, wt | Dolomite, wt | Sodium Bicarbonate, wt | Calcium Bromide, wt | Urea, wt | Cofiring Ratio, wt | Total Hg, µg/m3 | Elemental Hg, µg/m3 | Total Hg Reduction, % |
|---|---|---|---|---|---|---|---|---|---|---|---|---|
| High-S Coal Baseline | | | | | | | | | | 6.00 | 4.2 | |
| 80% | 20% | 31% | | 7% | | 28% | 0.06% | 1.4% | 15% | 0.86 | 0.13 | 86% |
| 80% | 20% | 33% | | 3% | 8% | 20% | 0.06% | 1.6% | 36% | 0.58 | 0.76 | 90% |
| 80% | 20% | 31% | | 7% | | 23% | 0.06% | 1.4% | 35% | 2.53 | 0.89 | 58% |
| 80% | 20% | 31% | | 7% | | 23% | 0.03% | 1.4% | 35% | 4.51 | 1.47 | 25% |
| 80% | 20% | 32% | | 7% | | 23% | 0.03% | 1.6% | 35% | 4.33 | 0.66 | 28% |
| 80% | 20% | 44% | | 5% | 8% | 29% | 0.06% | 1.6% | 31% | 0.54 | 0.52 | 91% |
| 80% | 20% | 33% | 9% | | | 22% | 0.06% | 2.2% | 35% | 0.80 | 0.73 | 95% |
| 80% | 20% | 34% | | 8.5% | | 23% | 0.13% | 2.3% | 41% | 0.75 | 0.48 | 88% |
| 80% | 20% | 37% | | 8.2% | | 26% | 0.12% | 2.2% | 41% | 0.74 | 0.87 | 88% |
| 80% | 20% | 35% | | 10.1% | | 23% | 0.13% | 2.2% | 44% | 0.13 | 0.16 | 98% |
| 80% | 20% | 38% | | 6.4% | | 29% | 0.12% | 2.1% | 42% | 0.54 | 0.88 | 91% |
| Low-S Coal Baseline | | | | | | | | | | 6.13 | 0.45 | |
| 80% | 20% | 38% | | 7% | | 23% | 0.05% | 1.2% | 35% | 2.90 | 0.47 | 53% |
| 80% | 20% | 38% | | 7% | | 23% | 0.05% | 1.6% | 35% | 9.11 | 1.06 | 49% |
| 80% | 20% | 38% | | 7% | | 23% | 0.03% | 1.2% | 35% | 2.29 | 0.87 | 63% |
| 80% | 20% | 33% | | 7% | | 24% | 0.13% | 2.3% | 32% | 3.55 | 3.20 | 42% |

TABLE 9

Analysis of the Engineered Fuel Feedstock that Includes Sorbent, As Received, (wt. %)

| | Eng. Fuel with Sorbent |
|---|---|
| Moisture, wt % | 3 |
| Volatile matter, wt % | 61.8 |
| Ash, wt % | 31.2 |
| Fixed carbon, wt % | 4 |
| Carbon, wt % | 33.3 |
| Hydrogen, wt % | 5.6 |
| Nitrogen, wt % | 0.54 |
| Sulfur, wt % | 0.02 |
| Chlorine, wt % | 0.5 |
| Oxygen, wt % | 28.84 |
| HHV, Btu/lb | 5,781 |

The engineered fuel feedstock that includes a sorbent is then mixed with coal at varying percentages of energy as showing in Table 10. A full characterization of the coal before co-firing is shown in Table 11.

TABLE 10

Relative Weights and Percentages of the Engineered Fuel Feedstock and Coal Tested in Table 12.

| | Test #2 | | Test #3 | | Test #4 | | Test #5 | |
|---|---|---|---|---|---|---|---|---|
| Energy % from eng. fuel with sorbent | 7.4% | | 13.7% | | 19.3% | | 24.2% | |
| Ca/S | 1.00 | | 2.00 | | 3.00 | | 4.00 | |
| | Wt (lb/h) | Wt (w/w) | Wt (lb/h) | Wt (w/w) | Wt (lb/h) | Wt (w/w) | Wt (lb/h) | Wt (w/w) |
| Coal feed, lb/h | 7.5 | 85% | 7.0 | 75% | 6.5 | 66% | 6.1 | 59% |
| Eng. fuel, lb/h | 1.3 | 15% | 2.4 | 25% | 3.3 | 34% | 4.2 | 41% |
| Total feed, lbs/h | 8.7 | | 9.3 | | 9.8 | | 10.3 | |
| Total S, lb/h | 0.16 | | 0.15 | | 0.14 | | 0.14 | |

TABLE 11

Analysis of the Coal (As Received) (wt. %)

| | Coal |
|---|---|
| Moisture, wt % | 4 |
| Volatile matter, wt % | 28.2 |
| Ash, wt % | 9.2 |
| Fixed carbon, wt % | 58.6 |
| Carbon, wt % | 72 |
| Hydrogen, wt % | 5 |
| Nitrogen, wt % | 1.7 |
| Sulfur, wt % | 2.2 |
| Chlorine, wt % | 0.01 |
| Oxygen, wt % | 9.89 |
| HHV, Btu/lb | 12,400 |

The experiments were performed in an internally insulated (refractory material) fluidized bed reactor with an inner diameter of 0.2 m and a height of approximately 1.0 m. The experiments were performed with inert sand particles ($d_p$=290 μm and $U_{mf}$=0.08 m/s) as the bed material and an expanded bed height of 0.5 m. The bed was fluidized with air, injected through the distributor, and the fuel (coal or coal+engineered fuel feedstock) was injected with air through a horizontal sparger. The tip of the sparger was located at a distance of approximately 0.1 m above the distributor. Prior to the injection of fuel, the fluidized bed reactor was heated to 1000° C. with a natural gas burner connected to the windbox and by injecting propane directly in the bed. Once the bed temperature had reached 1000° C., the natural gas burner and propane injection were stopped and the fuel injection (coal or coal+engineered fuel feedstock) was initiated to start the experiments. The experiments were conducted at a superficial gas velocity of 0.4 m/s. The temperature was measured at 10 different axial positions with thermocouples. Gas was sampled at the centerline of the reactor with a heated sampling line (120° C.) located at a distance of 1.3 m above the fuel injection location. The sampled gas was analyzed by a MKS FT-IR (Multigas 2030) connected in series to measure the volume fraction of the following species: $O_2$, CO, $CO_2$, NO, $NO_2$, $SO_2$, and $SO_3$.

Figure 13:
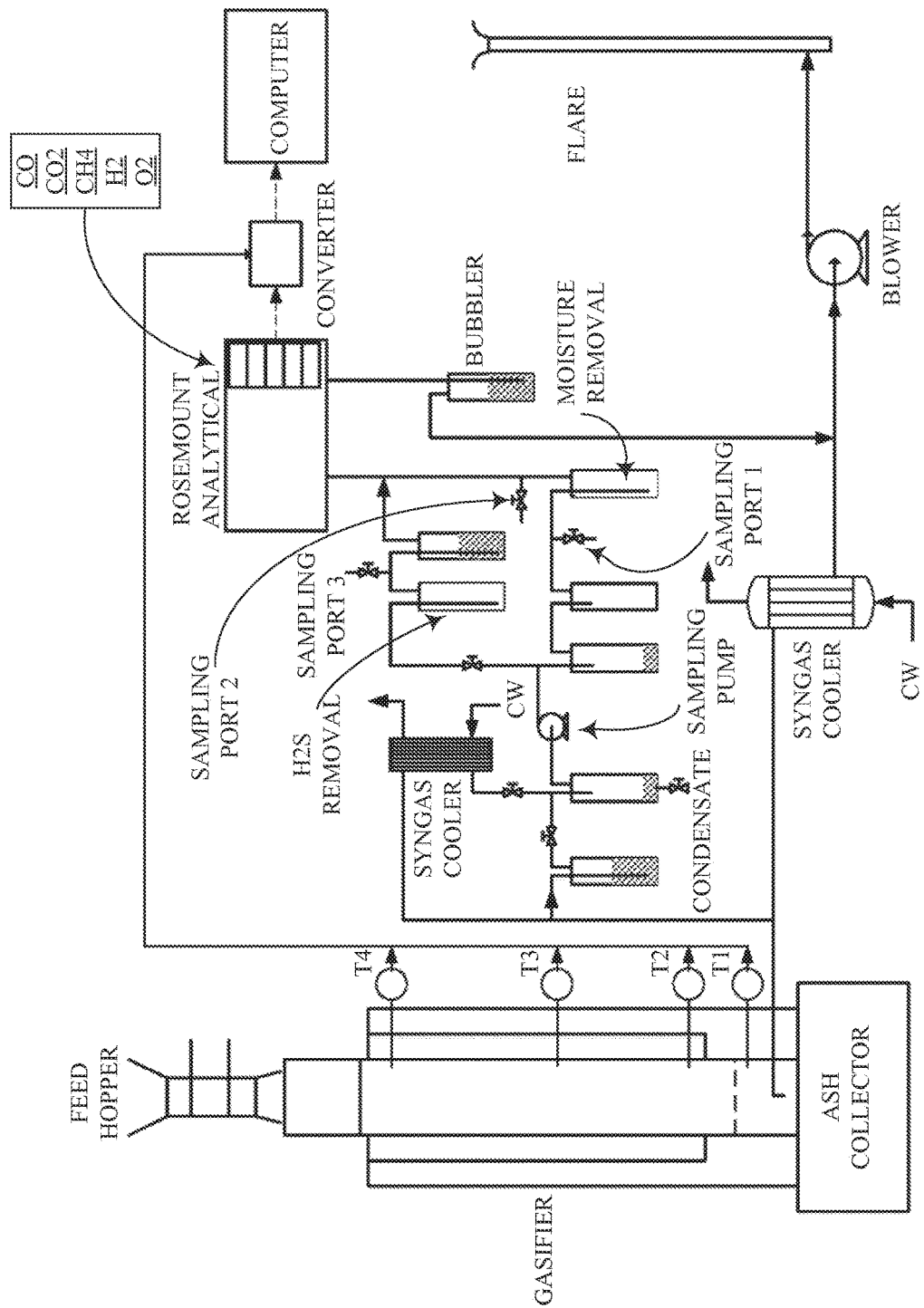
FIG. 13 is a schematic diagram of a gasifier.

A schematic representation of the experimental set up is shown in FIG. 13. The results are shown in Table 12.

TABLE 12

Results from Co-firing Experiment

| Ca/S | Co-firing ratio, energy % | Co-firing ratio, wt % | SO2, ppm | SO2, % | SO3, ppm | SO3, % | O2, % | CO2, % |
|---|---|---|---|---|---|---|---|---|
| 0 | 0% | 0% | 816 | 100.0% | 8.8 | 100.0% | 12.0 | 8.48 |
| 1 | 7% | 15% | 584 | 71.6% | 6.4 | 72.7% | 11.3 | 9.59 |
| 2 | 14% | 25% | 482 | 59.0% | 4.4 | 50.0% | 13.4 | 7.34 |
| 3 | 19% | 34% | 450 | 55.2% | 3.6 | 40.9% | 11.9 | 8.69 |
| 4 | 24% | 41% | 345 | 42.2% | 1.2 | 13.6% | 12.4 | 8.28 |
| | | | | | | mean | 12.2 | 8.5 |

While particular embodiments described herein have been illustrated and described, it would be obvious to those skilled in the art that various other changes and modifications can be made without departing from the spirit and scope of the disclosure. It is therefore intended to cover in the appended claims all such changes and modifications that are within the scope of this invention.

We claim:

1. A method of making an engineered fuel feedstock, comprising:
   processing a plastic and a sorbent to form a plastic-sorbent composition;
   processing the plastic-sorbent composition with a fiber to form a fiber-plastic-sorbent-composition; and
   processing the fiber-plastic-sorbent-composition to form the engineered fuel feedstock, wherein the sorbent comprises a sodium-based sorbent and a calcium-based sorbent.

2. The method of claim 1, wherein the sorbent further comprises a sorbent for mercury reduction.

3. The method of claim 1, wherein the sodium-based sorbent and the calcium-based sorbent are in an amount that is stoichiometrically about 10% to about 500% greater than the amount of a sulfur or a chlorine derived pollutant to be removed.

4. The method of claim 1, wherein the engineered fuel feedstock comprises about 10% (w/w) to about 30% (w/w) plastic and about 70% (w/w) to about 90% (w/w) fiber.

5. The method of claim 1, wherein the plastic is a mixed plastic, and the engineered fuel feedstock comprises about 50% (w/w) to about 95% (w/w) fiber and about 5% (w/w) to about 50% (w/w) mixed plastic.

6. The method of claim 1, wherein the engineered fuel feedstock comprises about 30% (w/w) to about 71% (w/w) fiber, about 6% (w/w) to about 38% (w/w) plastic, and about 23% (w/w) to about 40% (w/w) sorbent.

7. The method of claim 1, wherein the engineered fuel feedstock has an HHV of about 5,000 BTU/lb to about 14,500 BTU/lb.

8. The method of claim 1, wherein the engineered fuel feedstock has an ash content of about 13% (w/w) to about 33% (w/w).

9. A method of making an engineered fuel feedstock, comprising:
   processing at least about 50% (w/w) of a plastic and a sorbent to form a plastic-sorbent composition, the sorbent comprising a sodium-based sorbent and a calcium-based sorbent;
   processing the plastic-sorbent composition with a fiber and remaining plastic to form a fiber-plastic-sorbent-composition; and
   processing the fiber-plastic-sorbent-composition to form the engineered fuel feedstock.

10. The method of claim 9, wherein the sodium-based sorbent is selected from the group consisting of trisodium hydrogendicarbonate dihydrate (Trona), sodium sesquicarbonate, sodium bicarbonate, sodium carbonate, and combinations thereof.

11. The method of claim 10, wherein the sodium-based sorbent is sodium bicarbonate.

12. The method of claim 9, wherein the calcium-based sorbent is selected from the group consisting of calcium carbonate, calcium oxide, calcium hydroxide, calcium magnesium acetate $(CaMg_2(CH_3COO)_6)$, calcium bromide, dolomite $(CaCO_3.MgO)$, and combinations thereof.

13. The method of claim 12, wherein the calcium-based sorbent is calcium hydroxide.

14. The method of claim 9, further comprising a sorbent for mercury reduction.

15. The method of claim 14, where the mercury based sorbent comprises about 0.05% (w/w) to about 0.15% (w/w) of the engineered fuel feedstock.

16. The method of claim 15, wherein the sorbent for mercury reduction is calcium bromide.

17. The method of claim 9, further comprising a sorbent for $NO_x$ reduction.

18. The method of claim 17, wherein the sorbent for $NO_x$ reduction is urea.

19. The method of claim 18, wherein the urea comprises about 1% (w/w) to about 3% (w/w) of the engineered fuel feedstock.

20. A method of making an engineered fuel feedstock, comprising:
   processing a plastic and a sorbent to form a plastic-sorbent composition, the sorbent comprising a sodium-based sorbent, a calcium-based sorbent, and a sorbent for mercury reduction;
   processing the plastic-sorbent composition with a fiber to form a fiber-plastic-sorbent -composition; and
   processing the fiber-plastic-sorbent-composition to form the engineered fuel feedstock, wherein the engineered fuel feedstock comprises about 30% (w/w) to about 71% (w/w) fiber, about 6% (w/w) to about 38% (w/w) plastic, and about 23% (w/w) to about 40% (w/w) sorbent.

* * * * *